US012682225B2

(12) United States Patent
Brandstetter et al.

(10) Patent No.:  US 12,682,225 B2
(45) Date of Patent:  Jul. 14, 2026

(54) CLIFFORD NEURAL LAYERS FOR MULTIVECTOR SYSTEM MODELING

(71) Applicant: Microsoft Technology Licensing, LLC, Redmond, WA (US)

(72) Inventors: Johannes Brandstetter, Amsterdam (NL); Max Welling, Bussum (NL); Jayesh Kumar Gupta, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 763 days.

(21) Appl. No.: 18/087,357

(22) Filed: Dec. 22, 2022

(65) Prior Publication Data

US 2024/0095506 A1 Mar. 21, 2024

Related U.S. Application Data

(60) Provisional application No. 63/404,810, filed on Sep. 8, 2022.

(51) Int. Cl.
*G06N 3/063* (2023.01)
*G06N 20/10* (2019.01)

(52) U.S. Cl.
CPC ............. *G06N 3/063* (2013.01); *G06N 20/10* (2019.01)

(58) Field of Classification Search
None
See application file for complete search history.

(56) References Cited

PUBLICATIONS

International Preliminary Report on Patentability Chapter 1 received for PCT Application No. PCT/US23/030027, mailed on Mar. 20, 2025, 09 pages.
Hestenes, David, "New Foundations for Classical Mechanics", Second Edition, (c) 2002, Kluwer Academic Publishers, (2002), 718 Pages.
Hitzer, Eckhard, "Quaternion and Clifford Fourier Transforms", In Publication of Chapman and Hall/CRC, Sep. 21, 2021, 49 Pages.
Alfarraj, et al., "Geometric algebra generation of molecular surfaces", In Journal of the Royal Society Interface, vol. 19, Issue 189, Apr. 13, 2021, 26 Pages.
Arcomano, et al., "A Machine Learning-Based Global Atmospheric Forecast Model", In Journal of Geophysical Research Letters, vol. 47, Issue 9, May 16, 2022, pp. 1-9.
Ba, et al., "Layer Normalization", In repository of arXiv:1607.06450v1, Jul. 21, 2016, pp. 1-14.
Bar-Sinai, et al., "Learning data-driven discretizations for partial differential equations", In Proceedings of the National Academy of Sciences, vol. 116, Issue 31, Jul. 30, 2019, pp. 15344-15349.

(Continued)

*Primary Examiner* — Alan Chen
(74) *Attorney, Agent, or Firm* — Schwegman Lundberg & Woessner, P.A.

(57) ABSTRACT

Generally discussed herein are devices, systems, and methods for machine learning (ML) modeling of a system that operates on a multivector object. A method includes receiving, by an ML model, the multivector object as an input that represents a state of the multivector system. The method includes operating, by the ML model and using a Clifford layer that includes neurons that implement a multivector (Continued)

*100* kernel, on the multivector input to generate a multivector output that represents the state of the multivector system responsive to the multivector input.

17 Claims, 14 Drawing Sheets

(56)                    References Cited

PUBLICATIONS

Bhatnagar, et al., "Prediction of Aerodynamic Flow Fields using Convolutional Neural Networks", In Journal of Computational Mechanics, vol. 64, Issue 2, Jun. 12, 2019, pp. 525-545.
Brackx, et al., "History of Quaternion and Clifford-Fourier Transforms and Wavelets", In Journal of Quaternion and Clifford Fourier transforms and wavelets, vol. 27, Jun. 24, 2013, pp. 1-17.
Brandstetter, et al., "Clifford Neural Layers for PDE Modeling", In repository of arXiv:2209.04934v1, Sep. 8, 2022, pp. 1-43.
Brandstetter, et al., "Lie Point Symmetry Data Augmentation for Neural PDE Solvers", In repository of arXiv:2202.07643v2, May 29, 2022, 15 Pages.
Brandstetter, et al., "Message Passing Neural PDE Solver", In repository of arXiv:2202.03376v2, Mar. 26, 2022, pp. 1-27.
Brenner, et al., "The Mathematical Theory of Finite Element Methods", In Publication of Springer, Jan. 2008, 301 Pages.
Bronstein, et al., "Geometric Deep Learning: going beyond Euclidean data", In Journal of IEEE Signal Processing Magazine, vol. 34, Issue 4, Jul. 2017, pp. 1-22.
Bronstein, et al., "Geometric deep learning: Grids, groups, graphs, geodesics, and gauges", In repository of arXiv:2104.13478v2, May 2, 2021, 160 Pages.
Buchholz, Sven, "A theory of neural computation with Clifford algebras", Retrieved from: https://macau.uni-kiel.de/servlets/MCRFileNodeServlet/macau_derivate_00002936/tr-0504-bericht.pdf, May 2005, 146 Pages.
Buchholz, et al., "Introduction to neural computation in Clifford algebra", In Journal of Geometric Computing with Clifford Algebras, Jun. 1, 2001, pp. 291-314.
Chen, et al., "Residual Fourier Neural Operator for Thermochemical Curing of Composites", In repository of arXiv:2111.10262v1, Nov. 15, 2021, pp. 1-15.
Clement, Kleinstreuer, "Engineering fluid dynamics: An Interdisciplinary Systems Approach", In publication of Cambridge University Press, Feb. 28, 1997, 4 Pages.
Cohen, et al., "A general theory of equivariant CNNs on homogeneous spaces", In Journal of Advances in Neural Information Processing Systems, vol. 32, Dec. 8, 2019, pp. 1-12.
Cohen, et al., "Group Equivariant Convolutional Networks", In Proceedings of 33rd International Conference on Machine Learning, Jun. 11, 2016, 10 Pages.
Cohen, et al., "Steerable CNNs", In repository of arXiv:1612.08498v1, Dec. 27, 2016, pp. 1-14.
Cooley, et al., "An Algorithm for the Machine Calculation of Complex Fourier Series", In Journal of Mathematics of Computation, vol. 19, Issue 90, Apr. 1, 1965, 6 Pages.
Ebling, et al., "Clifford convolution and pattern matching on vector fields", In Proceedings of IEEE Visualization, Oct. 24, 2003, 8 Pages.
Ebling, et al., "Clifford Fourier transform on vector fields", In proceedings of IEEE Transactions on Visualization and Computer Graphics vol. 11, Issue 4, May 23, 2005, pp. 1-12.
Ebling, Julia, "Visualization and Analysis of Flow Fields based on Clifford Convolution", Retrieved from: https://core.ac.uk/download/pdf/226125853.pdf, Jul. 17, 2006, 178 Pages.
Ell, et al., "Hypercomplex Fourier Transforms of Color Images", In Proceedings of IEEE Transactions on Image Processing, vol. 16, Issue 1, Dec. 19, 2006, pp. 22-35.

Ell, Todd Anthony, "Hypercomplex Spectral Transformations", In Thesis Submitted to the University of Minnesota, Jun. 1992, 124 Pages.
Ell, et al., "Quaternion Fourier transforms for signal and image processing", Jun. 23, 2014, 160 Pages.
Ell, et al., "Quaternion-Fourier transforms for analysis of two-dimensional linear time-invariant partial differential systems", In Proceedings of 32nd IEEE Conference on Decision and Control, Dec. 15, 1993, pp. 1830-1841.
Frerix, et al., "Variational data assimilation with a learned inverse observation operator", In Proceedings of International Conference on Machine Learning, Jul. 1, 2021, 10 Pages.
Kunihiko, et al., "Neocognitron: A Self-organizing Neural Network Model for a Mechanism of Visual Pattern Recognition", In Journal of Competition and Cooperation in Neural Nets, Feb. 15, 1982, 460 Pages.
Satorras et al., "Combining Generative and Discriminative Models for Hybrid Inference", In Advances in Neural Information Processing Systems, Dec. 8, 2019, pp. 1-11.
Gaudet, et al., "Deep Quaternion Networks", In IEEE International Joint Conference on Neural Networks, Jul. 8, 2018, 8 Pages.
Geneva, et al., "Modeling the dynamics of PDE systems with physicsconstrained deep auto-regressive networks", In Journal of Computational Physics, vol. 403, Oct. 23, 2020, pp. 1-63.
Glorot, et al., "Understanding the difficulty of training deep feedforward neural networks", In Proceedings of the thirteenth international conference on artificial intelligence and statistics, Mar. 31, 2010, pp. 249-256.
Greenfeld, et al., "Learning to Optimize Multigrid PDE Solvers", In Proceedings of International Conference on Machine Learning, May 24, 2019, 9 Pages.
Guan, et al., "Fourier neural operator networks: A fast and general solver for the photoacoustic wave equation", In repository of arXiv:2108.09374, Aug. 20, 2021, 14 Pages.
Guibas, et al., "Adaptive Fourier Neural Operators: Efficient Token Mixers for Transformers", In repository of arXiv:2111.13587v2, Mar. 27, 2022, pp. 1-15.
Guo, et al., "Convolutional Neural Networks for Steady Flow Approximation", In Proceedings of the 22nd ACM SIGKDD International Conference on Knowledge Discovery and Data Mining, Aug. 13, 2016, 10 Pages.
Han, et al., "Solving High-Dimensional Partial Differential Equations Using Deep Learning", In Proceedings of the National Academy of Sciences, vol. 115, Issue 34, Aug. 21, 2018, pp. 8505-8510.
He, et al., "Deep Residual Learning for Image Recognition", In Proceedings of the IEEE conference on computer vision and pattern recognition, Jun. 27, 2016, pp. 770-778.
He, et al., "Delving Deep into Rectifiers: Surpassing Human-Level Performance on ImageNet Classification", In Proceedings of the IEEE international conference on computer vision, Dec. 7, 2015, pp. 1026-1034.
Hel-Or, et al., "Canonical Decomposition of Steerable Functions", In Journal of Mathematical Imaging and Vision, vol. 9, Issue 1, Jul. 1998, pp. 83-95.
Hendrycks, et al., "Gaussian Error Linear Units (Gelus)", In repository of arXiv:1606.08415v4, Jul. 8, 2020, pp. 1-9.
Hermann, et al., "Deep-Neural-Network Solution of the Electronic Schrödinger Equation", In Journal of Nature Chemistry, vol. 12, Issue 10, Oct. 12, 2020, pp. 891-897.
Hestenes, David, "Oersted Medal Lecture 2002: Reforming the Mathematical Language of Physics", In Journal American Journal of Physics, vol. 71, Issue 2, Jan. 10, 2003, pp. 1-43.
Hestenes, David, "Vectors, Spinors, and Complex Numbers in Classical and Quantum Physics", In the American Journal of Physics, vol. 39, Issue 9, Sep. 1971, pp. 1013-1027.
Hitzer, et al., "Quaternion and Clifford Fourier transforms and wavelets", In Publication of Springer, Jun. 24, 2013, 358 Pages.
Hitzer, Eckhard, "The Clifford Fourier Transform in Real Clifford Algebras", In Proceedings of 19th International Conference on the Application of Computer Science and Mathematics in Architecture and Civil Engineering, Jul. 4, 2012, pp. 1-11.
Hochreiter, et al., "Long Short-Term Memory", In Journal of Neural Computation, vol. 9, Issue 8, Nov. 15, 1997, pp. 1735-1780.

(56) References Cited

PUBLICATIONS

Hoffmann, et al., "AlgebraNets", In repository of arXiv:2006. 07360v2, Jun. 16, 2020, pp. 1-15.

Holl, et al., "Phiflow: A Differentiable PDE Solving Framework for Deep Learning via Physical Simulations", In proceedings of NeurIPS Workshop, vol. 2, Dec. 6, 2020, pp. 1-5.

Hsieh, et al., "Learning Neural PDE Solvers with Convergence Guarantees", In repository arXiv:1906.01200v1, Jun. 4, 2019, pp. 1-41.

Hu, et al., "Squeeze-and-Excitation Networks", In Proceedings of the IEEE Conference on Computer Vision and Pattern Recognition, Jun. 18, 2018, pp. 7132-7141.

Hwang, et al., "Solving PDE-Constrained Control Problems using Operator Learning", In Proceedings of the AAAI Conference on Artificial Intelligence, vol. 36, Issue 4, Jun. 28, 2022, pp. 4504-4512.

Ioffe, et al., "Batch Normalization: Accelerating Deep Network Training by Reducing Internal Covariate Shift", In Proceedings of the 32nd International Conference on Machine Learning, Jul. 6, 2015, 9 Pages.

Jenner, et al., "Steerable Partial Differential Operators for Equivariant Neural Networks", In repository of arXiv:2106.10163v3, Apr. 23, 2022, pp. 1-48.

Jia, Yan-Bin, "Quaternions and Rotations", In Com S 477.577 notes, Sep. 10, 2013, pp. 1-12.

Jin, et al., "NSFnets (Navier-Stokes Flow nets): Physics-informed neural networks for the incompressible Navier-Stokes equations", In Journal of Computational Physics, vol. 426, Feb. 1, 2021, pp. 1-42.

Keisler, Ryan, "Forecasting Global Weather with Graph Neural Networks", In repository of arXiv:2202.07575v1, Feb. 15, 2022, pp. 1-16.

Klower, et al., "SpeedyWeather/SpeedyWeather.jl", Retrieved from: https://github.com/SpeedyWeather/SpeedyWeather.jl, Dec. 23, 2022, 3 Pages.

Kochkova, et al., "Machine learning-accelerated computational fluid dynamics", In Proceedings of the National Academy of Sciences, vol. 118, Issue 21, May 25, 2021, pp. 1-8.

Kondor, et al., "On the Generalization of Equivariance and Convolution in Neural Networks to the Action of Compact Groups", In proceedings of International Conference on Machine Learning, Jul. 3, 2018, 9 Pages.

Kovachki, et al., "On Universal Approximation and Error Bounds for Fourier Neural Operators", In Journal of Machine Learning Research, Nov. 2021, pp. 1-75.

Krizhevsky, et al., "ImageNet Classification with Deep Convolutional Neural Networks", In Journal of Advances in Neural Information Processing Systems, 2012, pp. 1-9.

Kuipers, Jack B., "Quaternions and Rotation Sequences: A Primer with Applications to Orbits, Aerospace, and Virtual Reality", In proceedings of Princeton university press, Sep. 1, 1999, pp. 127-143.

Kuroe, Yasuaki, "Models of Clifford recurrent neural networks and their dynamics", In Proceedings of the International Joint Conference on Neural Networks, Jul. 31, 2011, pp. 1035-1041.

Laporte, et al., "FDTD: A 3D electromagnetic FDTD simulator written in Python with optional GPU support", Retrieved from: https://github.com/flaport/fdtd, Dec. 5, 2022, 19 Pages.

Lecun, et al., "Gradient-Based Learning Applied to Document Recognition", In Proceedings of the IEEE, vol. 86, Issue 11, Nov. 1998, pp. 1-46.

Li, et al., "Fourier Neural Operator for Parametric Partial Differential Equations", In repository of arXiv:2010.08895v3, May 17, 2021, pp. 1-16.

Li, et al., "Fourier Neural Operator with Learned Deformations for PDEs on General Geometries", In repository of arXiv:2207. 05209v1, Jul. 11, 2022, pp. 1-17.

Li, et al., "Markov Neural Operators for Learning Chaotic Systems", In repository of arXiv:2106.06898v1, Jun. 13, 2021, pp. 1-18.

Li, et al., "Physics-Informed Neural Operator for Learning Partial Differential Equations", In repository of arXiv:2111.03794v2, Nov. 14, 2022, pp. 1-23.

Li, et al., "Transformer for Partial Differential Equations' Operator Learning", In repository of arXiv:2205.13671v2, Oct. 2, 2022, pp. 1-29.

Lienen, et al., "Learning the Dynamics of Physical Systems from Sparse Observations with Finite Element Networks", In repository of arXiv:2203.08852v1, Mar. 16, 2022, pp. 1-21.

Liu, et al., "A Learning-Based Multiscale Method and Its Application to Inelastic Impact Problems", In Journal of the Mechanics and Physics of Solids, vol. 158, Jan. 1, 2022, pp. 1-22.

Loan, Charles Van, "Computational Frameworks for the Fast Fourier Transform", In Publication of Society for Industrial and Applied Mathematics, Jan. 1, 1992, 13 Pages.

Lotzsch, et al., "Learning the Solution Operator of Boundary Value Problems using Graph Neural Networks", In repository of arXiv:2206. 14092v1, Jun. 28, 2022, 12 Pages.

Lu, et al., "A Comprehensive and Fair Comparison of Two Neural Operators (With Practical Extensions) Based on Fair Data", In Journal of Computer Methods in Applied Mechanics and Engineering, vol. 393, Apr. 1, 2022, pp. 1-42.

Lu, et al., "Learning Nonlinear Operators Via Deeponet Based on the Universal Approximation Theorem of Operators", In Journal of Nature Machine Intelligence, vol. 3, Issue 3, Mar. 2021, pp. 218-229.

Ma, et al., "Physics-driven Learning of the Steady Navier-Stokes Equations using Deep Convolutional Neural Networks", In repository of arXiv:2106.09301v1, Jun. 17, 2021, pp. 1-29.

Maulik, et al., "Efficient high-dimensional variational data assimilation with machine-learned reduced-order models", In Journal of Geoscientific Model Development, vol. 15, Issue 8, May 2, 2022, pp. 3433-3445.

Mayr, et al., "Boundary Graph Neural Networks for 3d Simulations", In repository of arXiv:2106.11299v4, Nov. 28, 2022, 22 Pages.

Melnyk, et al., "Embed Me If You Can: A Geometric Perceptron", In Proceedings of the IEEE/CVF International Conference on Computer Vision, Oct. 10, 2021, pp. 1276-1284.

Mirowski, Philip, "More Heat Than Light: Economics as Social Physics, Physics as Nature's Economics", In publication of Cambridge University Press, Nov. 29, 1991, 3 Pages.

Moxey, et al., "Hypercomplex Correlation Techniques for Vector Images", In Journal of IEEE Transactions on Signal Processing, vol. 51, Issue 7, Jun. 25, 2003, pp. 1941-1953.

Nguyen, et al., "Quaternion Graph Neural Networks", In Asian Conference on Machine Learning, Nov. 28, 2021, 16 Pages.

Parcollet, et al., "A survey of quaternion neural networks", In Journal of Artificial Intelligence Review, vol. 53, Issue 4, Apr. 2020, pp. 2957-2982.

Parcollet, et al., "Quaternion Convolutional Neural Networks for End-to-End Automatic Speech Recognition", In Repository of arXiv:1806.07789v1, Jun. 20, 2018, 5 Pages.

Parcollet, et al., "Quaternion Convolutional Neural Networks for Heterogeneous Image Processing", In IEEE International Conference on Acoustics, Speech and Signal Processing, May 12, 2019, 5 Pages.

Parcollet, et al., "Quaternion Recurrent Neural Networks", In repository of arXiv:1806.04418v3, Jan. 7, 2019, pp. 1-19.

Pathak, et al., "FourCastNet: A Global Data-driven High-resolution Weather Model using Adaptive Fourier Neural Operators", In repository of arXiv:2202.11214v1, Feb. 22, 2022, pp. 1-28.

Pearson, Justin, "Clifford Networks", In Publication of Complex-Valued Neural Networks, Jan. 2003, 26 Pages.

Pearson, et al., "Neural Networks in the Clifford Domain", In Proceedings of IEEE International Conference on Neural Networks, Jun. 28, 1994, pp. 1465-1469.

Pestourie, et al., "Physicsenhanced deep surrogates for PDEs", In repository of arXiv:2111.05841v2, Nov. 3, 2022, pp. 1-32.

Pfaff, "Learning Mesh-Based Simulation with Graph Networks", In repository of arXiv:2010.03409v4, Jun. 18, 2021, pp. 1-18.

(56) References Cited

PUBLICATIONS

Pfau, et al., "Ab Initio Solution of the Many-Electron Schrödinger Equation With Deep Neural Networks", In Journal of Physical Review Research, vol. 2, Issue 3, Sep. 10, 2020, 21 Pages.

Rahman, et al., "Generative Adversarial Neural Operators", In Repository of arXiv:2205.03017v2, Oct. 12, 2022, pp. 1-19.

Rahman, et al., "U-NO: U-shaped Neural Operators", In Repository of arXiv:2204.11127v2, May 26, 2022, pp. 1-16.

Raissi, et al., "Hidden Fluid Mechanics: Learning Velocity and Pressure Fields From Flow Visualizations", In Journal of Science, vol. 367, Issue 6481, Feb. 28, 2020, pp. 1-9.

Raissi, et al., "Physics-Informed Neural Networks: A Deep Learning Framework for Solving Forward and Inverse Problems Involving Nonlinear Partial Differential Equations", In Journal of Computational Physics, vol. 378, Feb. 1, 2019, pp. 686-707.

Rao, et al., "Global filter networks for image classification", In Journal of Advances in Neural Information Processing Systems, vol. 34, Dec. 6, 2021, pp. 1-14.

Rasp, et al., "Data-Driven Medium-Range Weather Prediction With a Resnet Pretrained on Climate Simulations: A New Model for Weatherbench", In Journal of Advances in Modeling Earth Systems, vol. 13, Issue 2, Feb. 13, 2021, pp. 1-12.

Renaud, Pierre, "Clifford Algebras Lecture Notes on Applications in Physics", In publication submitted to University of Canterbury, Nov. 20, 2020, 253 Pages.

Ronneberger, et al., "U-Net: Convolutional Networks for Biomedical Image Segmentation", In the International Conference on Medical Image Computing and Computer-Assisted Intervention, Oct. 5, 2015, pp. 234-241.

Sanchez-Gonzalez, et al., "Learning to Simulate Complex Physics with Graph Networks", In proceedings of International Conference on Machine Learning, Nov. 21, 2020, 10 Pages.

Sandler, et al., "Mobilenetv2: Inverted residuals and linear bottlenecks", In Proceedings of the IEEE Conference on Computer Vision and Pattern Recognition, Jun. 18, 2018, pp. 4510-4520.

Sangwine, et al., "Colour image filters based on hypercomplex convolution", In Journal of IEE Proceedings in Vision, Image and Signal Processing, vol. 147, Issue 2, Apr. 1, 2000.

Schwichtenberg, Jakob, "Physics from symmetry", In publication of Springer, Jun. 4, 2015, 294 Pages.

Shi, et al., "LordNet: Learning to Solve Parametric Partial Differential Equations without Simulated Data", In Repository of arXiv:2206. 09418v1, Jun. 19, 2022, 13 Pages.

Sirignano, et al., "DGM: A deep learning algorithm for solving partial differential equations", In Journal of Computational Physics, Aug. 23, 2018, pp. 1-31.

Sønderby, et al., "Metnet: A neural weather model for precipitation forecasting", In repository of arXiv:2003.12140v2, Mar. 30, 2020, pp. 1-17.

Stachenfeld, et al., "Learned Coarse Models for Efficient Turbulence Simulation", In repository of arXiv:2112.15275v3, Apr. 22, 2022, pp. 1-27.

Steane, Andrew M., "An Introduction to Spinors", In repository of arXiv:1312.3824v1, Dec. 13, 2013, pp. 1-23.

Suter, Jaap, "Geometric Algebra Primer", Retrieved from: https:// heyokatc.com/pdfs/MISC/Geometric_Algebra_Primer_-Suter-2003. pdf, Mar. 12, 2003, 66 Pages.

Tan, et al., "Efficientnet: Rethinking model scaling for convolutional neural networks", In Proceedings of 36th International Conference on Machine Learning, May 24, 2019, 10 Pages.

Thuerey, et al., "PhiFlow: A differentiable PDE solving framework for machine learning", Retrieved from: https:// github.com/tum-pbs/ PhiFlow, Dec. 19, 2022, 3 Pages.

Thuerey, et al., "Physics-based Deep Learning", In repository of arXiv:2109.05237v3, Apr. 25, 2022, 287 Pages.

Trabelsi, et al., "Deep Complex Networks", In repository of arXiv:1705. 09792v4, Feb. 16, 2018, pp. 1-19.

Trindade, et al., "Clifford Algebras, Quantum Neural Networks and Generalized Quantum Fourier Transform", In repository of arXiv:2206. 01808v1, Jun. 3, 2022, 27 Pages.

Ulyanov, et al., "Improved Texture Networks: Maximizing Quality and Diversity in Feed-Forward Stylization and Texture Synthesis", In Proceedings of the IEEE conference on computer vision and pattern recognition, Jul. 21, 2017, pp. 6924-6932.

Um, et al., "Solver-in-theloop: Learning from differentiable physics to interact with iterative PDE solvers", In Journal of Advances in Neural Information Processing Systems, vol. 33, Dec. 6, 2020, 12 Pages.

Vreugdenhil, Cornelis Boudewijn, "Numerical Methods for Shallow-Water Flow", In publication of Water Science and Technology Library (WSTL), vol. 13, Oct. 31, 1994, 273 Pages.

Wandel, et al., "Learning Incompressible Fluid Dynamics from Scratch—Towards Fast, Differentiable Fluid Models that Generalize", In repository of arXiv:2006.08762v3, Mar. 2, 2021, pp. 1-15.

Wandel, et al., "Spline-PINN: Approaching PDEs without data using fast, physics-informed Hermite-Spline CNNs", In Proceedings of the AAAI Conference on Artificial Intelligence, vol. 36, Issue 8, Jun. 28, 2022, pp. 8529-8538.

Wang, et al., "Incorporating symmetry into deep dynamics models for improved generalization", In repository of arXiv:2002.03061v4, Mar. 15, 2021, pp. 1-20.

Wang, et al., "Learning the solution operator of parametric partial differential equations with physics-informed DeepONets", In Journal of Science advances, vol. 7, Issue 40, Sep. 29, 2021, 10 Pages.

Wang, et al., "Towards physicsinformed deep learning for turbulent flow prediction", In Proceedings of the 26th ACM SIGKDD International Conference on Knowledge Discovery & Data Mining, Aug. 23, 2020, pp. 1457-1466.

Weiler, et al., "3D steerable CNNs: Learning rotationally equivariant features in volumetric data", In Proceedings of 32nd Conference on Neural Information Processing Systems, Dec. 3, 2018, pp. 1-12.

Weiler, et al., "General E(2)-Equivariant Steerable CNNs", In proceedings of 33rd Conference on Neural Information Processing Systems, Dec. 8, 2019, pp. 1-12.

Wen, et al., "UFNOAn enhanced Fourier neural operator-based deep-learning model for multiphase flow", In Journal of Advances in Water Resources, vol. 163, May 4, 2022, pp. 1-37.

Weyn, et al., "Improving data-driven global weather prediction using deep convolutional neural networks on a cubed sphere", In Journal of Advances in Modeling Earth Systems, vol. 12, Issue 9, Aug. 12, 2020, pp. 1-17.

Weyn, "Sub-seasonal forecasting with a large ensemble of deep-learning weather prediction models", In Journal of Advances in Modeling Earth Systems, vol. 13, Issue 7, Jun. 19, 2021, pp. 1-23.

Worrall, et al., "Harmonic networks: Deep translation and rotation equivariance", In Proceedings of the IEEE Conference on Computer Vision and Pattern Recognition, Jul. 21, 2017, pp. 5028-5037.

Wu, et al., "Group normalization", In European Conference on Computer Vision, Sep. 8, 2018, pp. 1-17.

Wu, et al., "Learning to Accelerate Partial Differential Equations via Latent Global Evolution", In repository of arXiv:2206.07681v2, Oct. 12, 2022, pp. 1-30.

Xie, et al., "Neural Fields in Visual Computing and Beyond", In Journal of Computer Graphics Forum, vol. 41, Issue 2, May 24, 2022, pp. 641-676.

Yang, et al., "Seismic wave propagation and inversion with Neural Operators", The Seismic Record, vol. 1, Issue 3, Oct. 2021, pp. 126-134.

Zhang, et al., "Shufflenet: An extremely efficient convolutional neural network for mobile devices", In Proceedings of the IEEE conference on computer vision and pattern recognition, Jun. 18, 2018, pp. 6848-6856.

Zhu, et al., "Bayesian deep convolutional encoder-decoder networks for surrogate modeling and uncertainty quantification", In Journal of Computational Physics, vol. 366, Jan. 21, 2018, pp. 1-52.

Zhu, et al., "Quaternion Convolutional Neural Networks", In Proceedings of the European Conference on Computer Vision, Sep. 8, 2018, pp. 1-17.

Zubov, et al., "NeuralPDE: Automating physics-informed neural networks (PINNs) with error approximations", In repository of arXiv:2107.09443, Jul. 19, 2021, pp. 1-77.

(56)         References Cited

PUBLICATIONS

Breuils, et al., "New Applications of Clifford's Geometric Algebra", Advances in Applied Clifford Algebras, vol. 32, Issue 2, Feb. 14, 2022, 39 pages.

Buchholz, et al., "On Clifford neurons and Clifford multi-layer perceptrons", Neural Networks Elsevier Science, vol. 21, Issue 7, Sep. 1, 2008, 11 pages.

International Search Report and Written Opinion received for PCT Application No. PCT/US23/030027, mailed on Nov. 9, 2023, 15 pages.

Jose, et al., "Geometric Neural Computing", IEEE Transactions on Neural Networks, vol. 12, Issue 5, Sep. 1, 2001, pp. 968-986.

Reich, et al., "Analyzing Real Vector Fields with Clifford Convolution and Clifford-Fourier Transform", ResearchGate, Jan. 1, 2010, 14 pages.

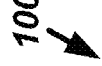
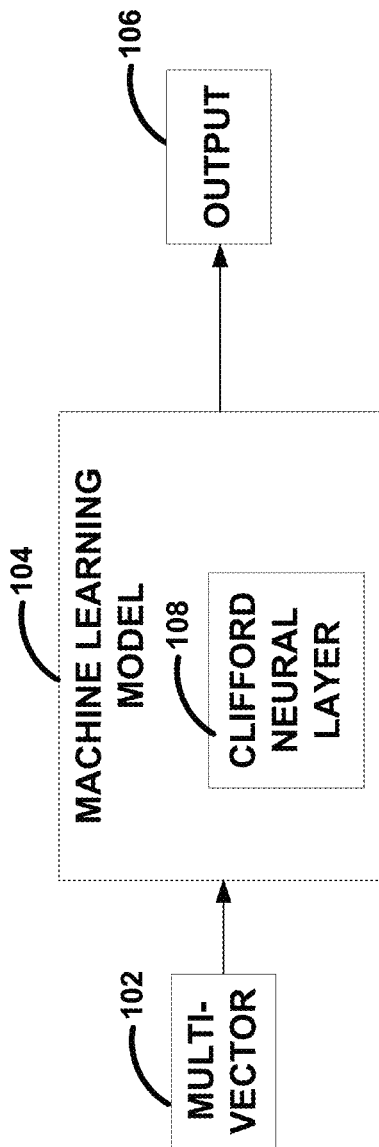
*FIG. 1*

400 y x

Figure 12:
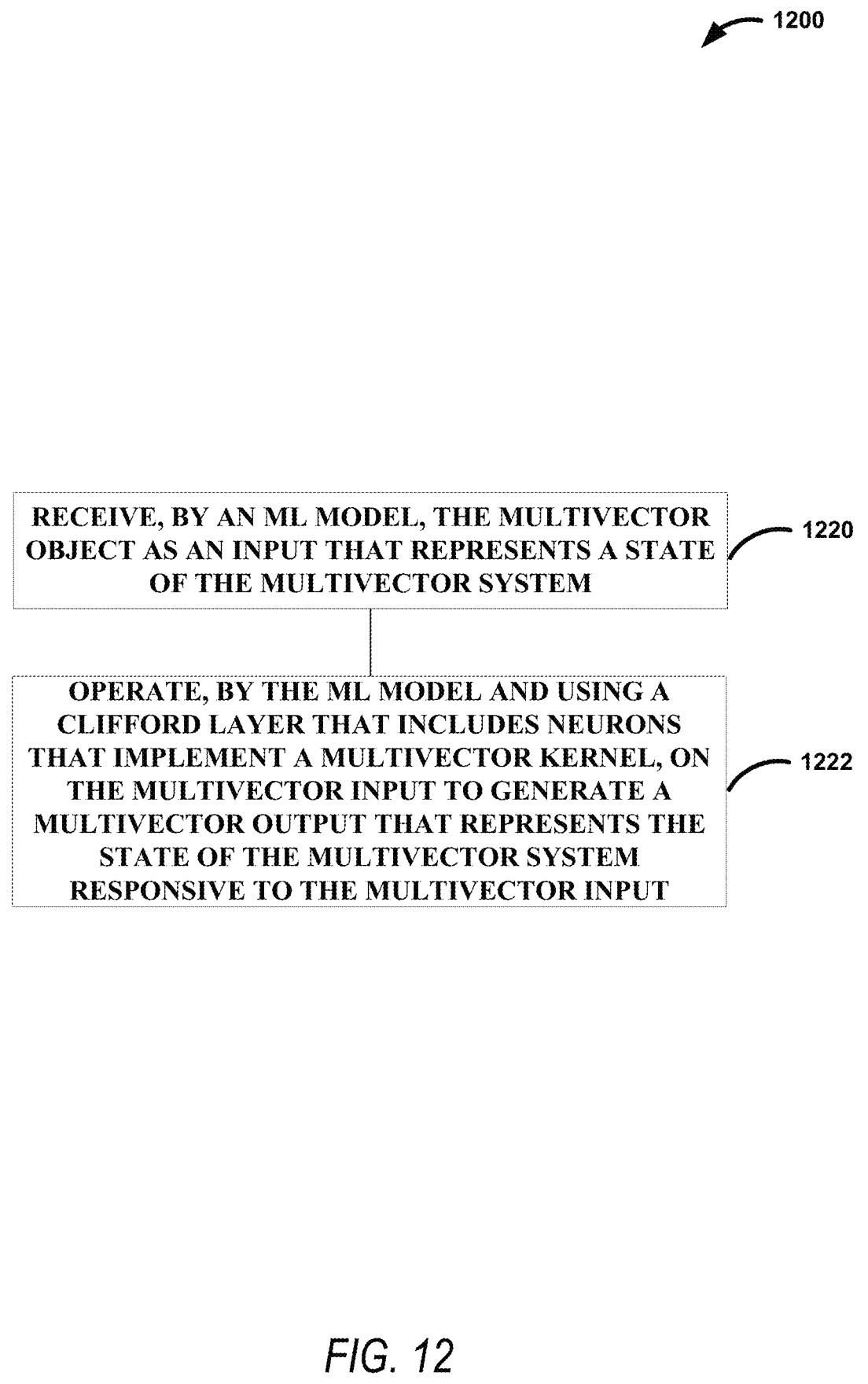

1200

RECEIVE, BY AN ML MODEL, THE MULTIVECTOR
OBJECT AS AN INPUT THAT REPRESENTS A STATE
OF THE MULTIVECTOR SYSTEM

1220

OPERATE, BY THE ML MODEL AND USING A
CLIFFORD LAYER THAT INCLUDES NEURONS
THAT IMPLEMENT A MULTIVECTOR KERNEL, ON
THE MULTIVECTOR INPUT TO GENERATE A
MULTIVECTOR OUTPUT THAT REPRESENTS THE
STATE OF THE MULTIVECTOR SYSTEM
RESPONSIVE TO THE MULTIVECTOR INPUT

CLIFFORD NEURAL LAYERS FOR MULTIVECTOR SYSTEM MODELING

RELATED APPLICATION

This application claims the benefit of priority under 35 U.S.C. § 119(e), to U.S. Provisional Patent Application Ser. No. 63/404,810, titled "CLIFFORD NEURAL LAYERS FOR MULTI-VECTOR SYSTEM MODEL" filed on Sep. 8, 2022, which is hereby incorporated by reference in its entirety.

BACKGROUND

Current machine learning (ML) models operate on a standard vector or scalar
input. A vector includes multiple scalar entries.

SUMMARY

A device, system, method, and computer-readable medium configured for implementing an ML model that operates on a multivector input are provided. The ML model can implement a multivector valued neural network (NN) which operates on multivector inputs. Clifford algebras are used to define how to operate on and between multivector objects. The output can be a multivector, classification, vector, or the like. One or more of a Clifford convolution layer, a Clifford Fourier transform layer, and an equivariant Clifford layer can be used to operate on the multivector input. Examples of systems that are modeled using multivectors include mechanical engineering, civil engineering, geophysics, or meteorology that use fluid dynamics (e.g., two-dimensional (2D) Navier-Stokes equations), electric, optical, or radio technologies that rely on solving three-dimensional (3D) Maxwell equations, and the modeling of other physical systems in general.

BRIEF DESCRIPTION OF DRAWINGS

FIG. 1 illustrates, by way of example, a diagram of an embodiment of an ML system 100 for operating on a multivector object input 102.

FIG. 12 illustrates, by way of example, a diagram of an embodiment of a method for multivector object system modeling.

DETAILED DESCRIPTION

Figure 2:
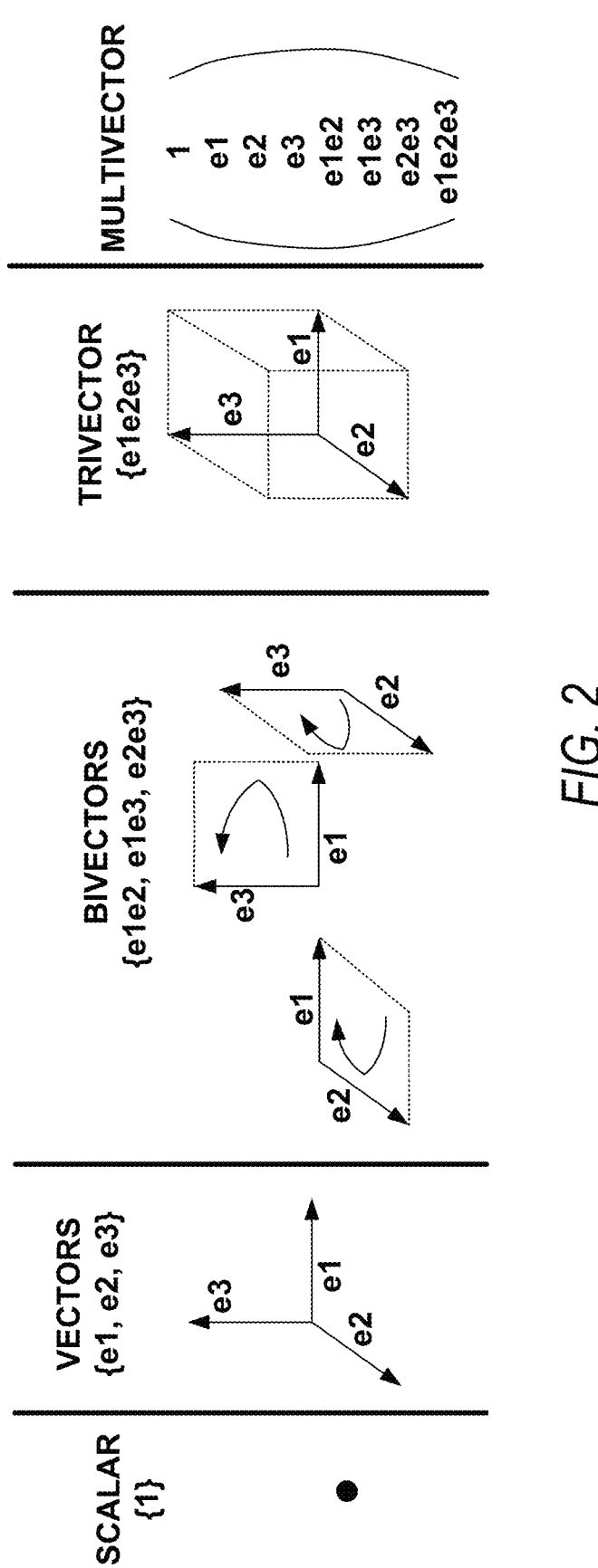
FIG. 2 illustrates, by way of example, a diagram of the spatial primitives of the multivector object and an example multivector object.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Some systems are classically modeled using standard vectors and scalars. These systems can benefit from modeling using multivector objects. The elements of a Clifford algebra are called multivectors or multivector objects. Multivector objects contain elements of subspaces (e.g., scalars, vectors, bivectors, trivectors, etc.). The geometric product is an operation which combines multivector objects such that the result is another multivector object. Embodiments can use multivector kernels to define convolutions over multivector object inputs. Embodiments can use the geometric product in the Fourier space to define Clifford Fourier layers over multivector objects.

The values of a given element of a multivector object are dependent on one or more values of other elements of the multivector object. No single, current ML model accounts for such diverse input elements or dependencies between the elements. Embodiments operate with neural network (NN) elements that operate using a Clifford algebra. This is in contrast to normal NN elements that operate on $wx+b$ using an activation function, where w is a learned weight, x is a vector or scalar input value (but not a combination thereof), and b is a bias.

An application of Clifford neural layers is modeling through solving partial differential equations (PDEs). PDEs have significant use in science and engineering. PDEs simulate physical processes as scalar and vector fields interacting and coevolving over time. Due to the computationally expensive nature of standard PDE solution methods, neural PDE surrogates have become an active research topic to accelerate these simulations. However, current methods do not explicitly take into account the relationship between different fields and their internal components, which are often correlated. Modeling the time evolution of such correlated fields using multivector fields accounts for the relationship between different fields and their internal components. Multivector fields can include scalar, vector, as well as higher-order components, such as bivectors and trivectors. Algebraic properties of multivector fields, such as multiplication, addition, and other arithmetic operations can be described by Clifford algebras. Embodiments present the first usage of such multivector representations together with Clifford convolutions and Clifford Fourier transforms in the context of deep learning (DL). Resulting Clifford neural layers are universally applicable and can be used in the areas of fluid dynamics, weather forecasting, and the modeling of physical systems in general. Empirical evaluation of the benefit of Clifford neural layers is explored by replacing convolution and Fourier operations in common neural PDE surrogates with their Clifford counterparts. The PDE surrogates analyzed include two-dimensional Navier-Stokes and weather modeling tasks, as well as three-dimensional Maxwell equations. Clifford neural layers consistently improve generalization capabilities of the tested neural PDE surrogates.

Most scientific phenomena are described by the evolution and interaction of physical quantities over space and time. The concept of fields is one widely used construct to continuously parameterize these quantities over chosen coordinates. Prominent examples include (i) fluid mechanics, which has applications in domains ranging from mechanical and civil engineering, to geophysics and meteorology, and (ii) electromagnetism, which provides mathematical models for electric, optical, or radio technologies. The underlying equations of these examples are described in various forms of the Navier-Stokes equations and Maxwell's equations. For the majority of these equations, solutions are analytically intractable, and obtaining accurate predictions necessitates falling back on numerical approximation schemes often with prohibitive computation costs. DL's success at overcoming the curse of dimensionality in many fields has led to a surge of interest in scientific applications, especially at augmenting and replacing numerical solving schemes in fluid dynamics with neural networks.

Weather simulations are used to ground further description. In weather simulations, two different kinds of fields emerge: scalar fields such as temperature or humidity, and vector fields such as wind velocity or pressure gradients. Current DL-based approaches treat different vector field components the same as scalar fields, and stack all scalar fields along the channel dimension, thereby omitting the geometric relations between different components, both within vector fields as well as between individual vector and scalar fields. This practice leaves out important inductive bias information present in the input data. For example, wind velocities in the x- and y-directions are strongly related, such that they form a vector field. Additionally, the wind vector field and the scalar pressure field are related since the gradient of the pressure field causes air movement and subsequently influences the wind components. In this work, neural PDE surrogates are built which not only model local and global relationships, as current methods do, but also the relation between different fields (e.g., wind and pressure field) and field components (e.g. x- and y-component of the wind velocities).

| $e_1, e_2, e_3$ | Basis vectors of the generating vector space of the Clifford algebra. |
| $e_i \wedge e_j$ | Wedge (outer) product of basis vectors $e_i$ and $e_j$. |
| $e_i \cdot e_j = <e_1, e_j>$ | Inner product of basis vectors $e_i$ and $e_j$. |
| $e_1e_2, e_3e_1,$ | Basis bivectors of the vector space of the Clifford |
| $e_2e_3$ | algebra. |

-continued

| $e_1e_2e_3$ | Basis trivector of the vector space of the Clifford algebra. |
| $i_2 = e_1e_2$ | Pseudoscalar for Clifford algebras of grade 2. |
| $i_3 = e_1e_2e_3$ | Pseudoscalar for Clifford algebras of grade 3. |
| x | Euclidean vector in $R^n$. |
| $x \wedge y$ | wedge (outer) product of Euclidean vectors x and y. |
| $x \cdot y = <x, y>$ | Inner product of vectors x and y. |
| a | Multivector. |
| ab | Geometric product of multivectors a and b. |
| $\hat{i}, \hat{j}, \hat{k}$ | Base elements of quaternions. |

FIG. 1 illustrates, by way of example, a diagram of an embodiment of an ML system 100 for operating on a multivector object input 102. The ML system 100 as illustrated includes an ML model 104 that receives and operates on the multivector object input 102. The ML model 104 operates on the multivector object input 102 using one or more Clifford neural layers 108 to generate an output 106. The output 106 is a representation of a state of a system, being modeled by the ML model 104, responsive to a stimulus represented by the multivector object input 102.

The multivector object input 102 includes a combination of entries comprising two or more of a scalar, vector, bi-vector, tri-vector, or other pseudo scalar. That is, the entries of the multivector object input 102 include two or more of a scalar, vector, bi-vector, tri-vector, or other higher-dimensional vector.

The ML model 104 models a system, such as a physical system, that includes a stimulus represented by the multivector object input 102. Examples of such physical systems includes that include 3D electromagnetic fields, dynamic fluids, and weather forecasting, among many others. The ML model 104 includes the Clifford neural layer 108 that operates on the input 102. The Clifford neural layer 108 can include a Clifford convolution layer, a Clifford Fourier layer, a Clifford equivariant layer, or a combination thereof, such as a Clifford Fourier Neural Operator (FNO) that includes a Clifford convolution layer and a Clifford Fourier layer. The Clifford neural layer 108 operates using a Clifford algebra on the multivector input 102. The output 106 is based on a result of the operations performed by the Clifford neural layer 108. More details on each of these layers can be found in the Appendix.

The output 106 can include a scalar, classification, a multivector object, a vector, a combination thereof, or the like. The output 106, in general, represents the state of the system being modeled by the ML model 104 responsive to the input 102.

Clifford algebras are at the core intersection of geometry and algebra, introduced to simplify spatial and geometrical relations between many mathematical concepts. For example, Clifford algebras naturally unify real numbers, vectors, complex numbers, quaternions, exterior algebras, and many more. Most notably, in contrast to standard vector analysis where primitives are scalars and vectors, Clifford algebras have additional spatial primitives for representing plane and volume segments. An expository example is the cross-product of two vectors in 3 dimensions, which naturally translates to a plane segment spanned by these two vectors. The cross product is often represented as a vector because it has three independent components but has a sign flip under reflection that a true vector does not. In Clifford algebras, different spatial primitives can be summarized into objects called multivectors.

FIG. 2 illustrates, by way of example, a diagram of the spatial primitives of the multivector object and an example multivector object. As illustrated in FIG. 2, the spatial primitives include a scalar, which is a one-dimensional primitive, a vector, which is a point with a direction, a bivector, which is a combination of two vectors, and a trivector, which is a combination of three vectors. There are higher-dimensional primitives. The vector is a multivector of grade 1, the bivector is a multivector of grade 2, etc. and there are multivectors of grade 4, and so on. The multivector includes respective entries corresponding to each of the scalar, vector, bivector, and trivector. Note that a given entry can be zero if the corresponding primitive is not present. The multivector In embodiments, operations over feature fields in DL architectures are replaced by their Clifford algebra counterparts, which operate on multivector feature fields. For example, a convolutional kernel is endowed with multivector components, such that the kernel can convolve over multivector feature maps. Introducing Clifford neural layers yields at least two advantages: (i) scalar and vector components can be naturally grouped together into a single multivector object, with operations on, and mappings between multivectors defined by Clifford algebras; and (ii) higher order geometric information such as bivectors and trivectors arise, which match aforementioned higher order objects. For example, the curl of a vector field can be described via bivectors, and thus it is beneficial to have bivector filter components to match those.

Embodiments, more specifically, define Clifford convolution and Clifford Fourier transforms over multivector fields, building on connections between Clifford algebras, complex numbers, and quaternions. Based on these definitions, Clifford layers were implemented for different Clifford algebras, replacing convolution and Fourier operations in DL architectures. An evaluation of the effect of using Clifford based architectures on 2-dimensional problems of fluid mechanics and weather modeling, as well as on the 3-dimensional Maxwell's equations is provided to demonstrate that Clifford neural layers consistently improve generalization capabilities of the tested architectures.

Figure 3:
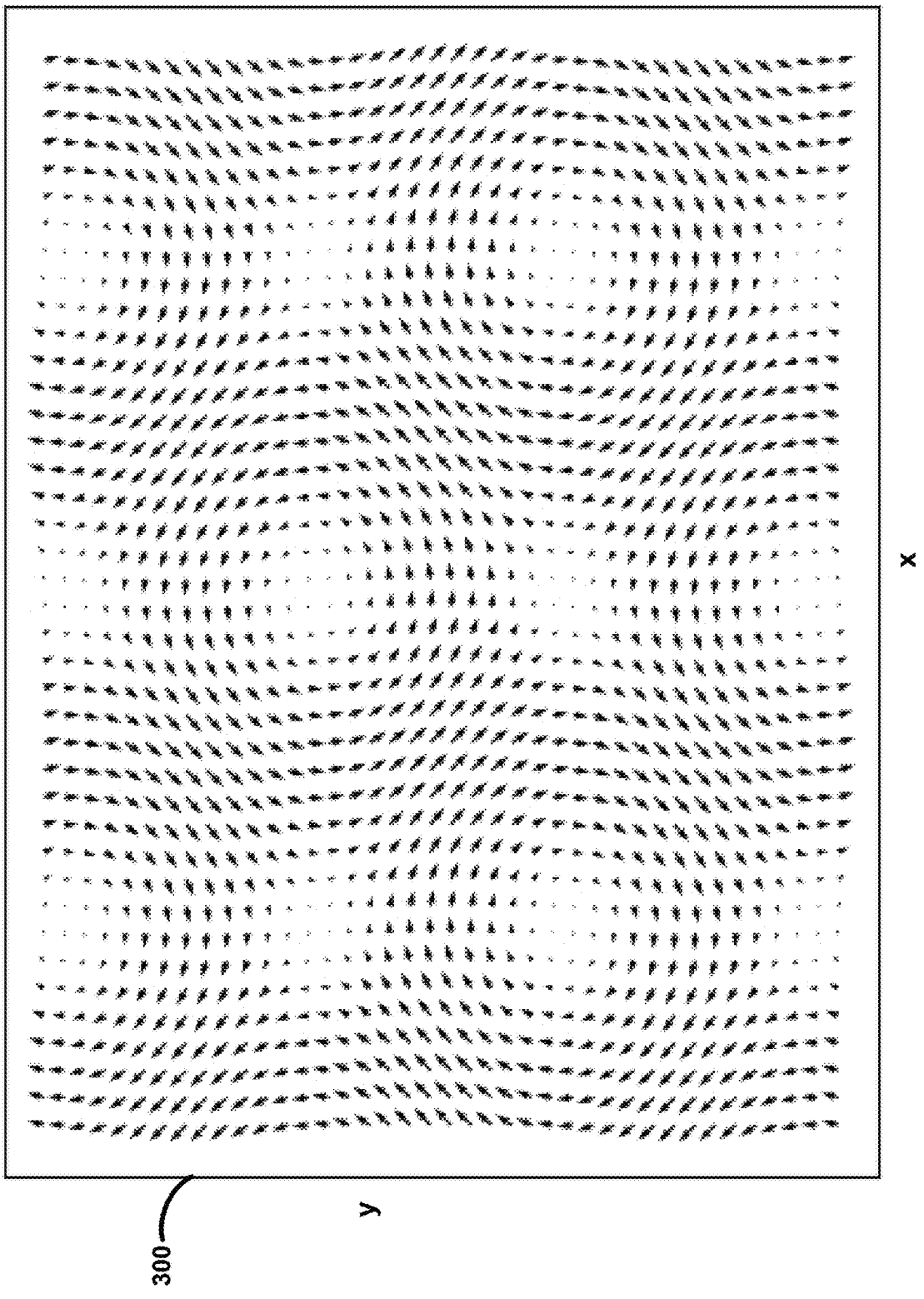
FIG. 3 illustrates a first vector field that represents some physical phenomena.
Figure 4:
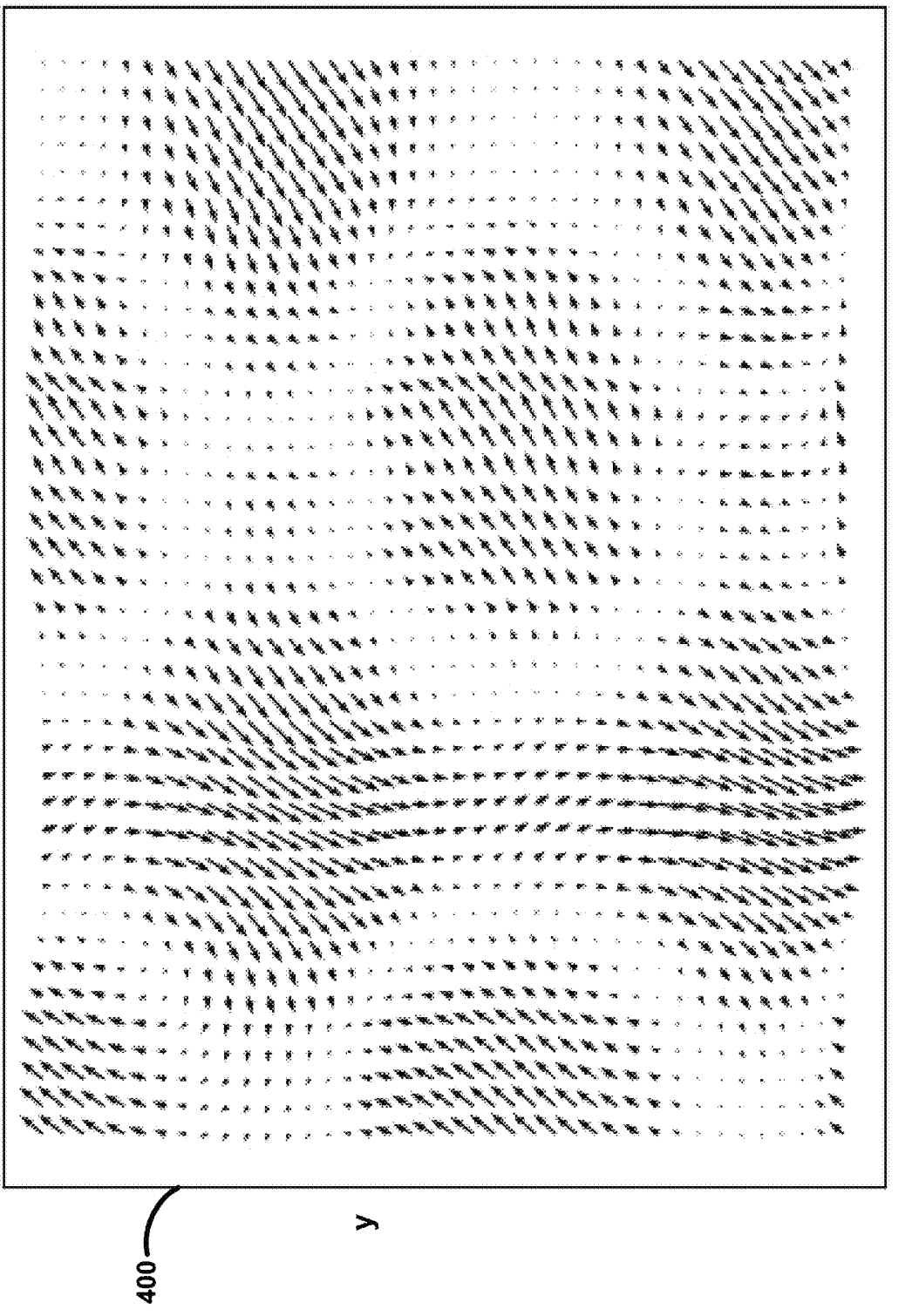
FIG. 4 illustrates, by way of example, a vector field generated by decomposing the vector field into respective x and y Fourier transforms and then attempting to reconstruct the vector field from the Fourier transforms.
Figure 5:
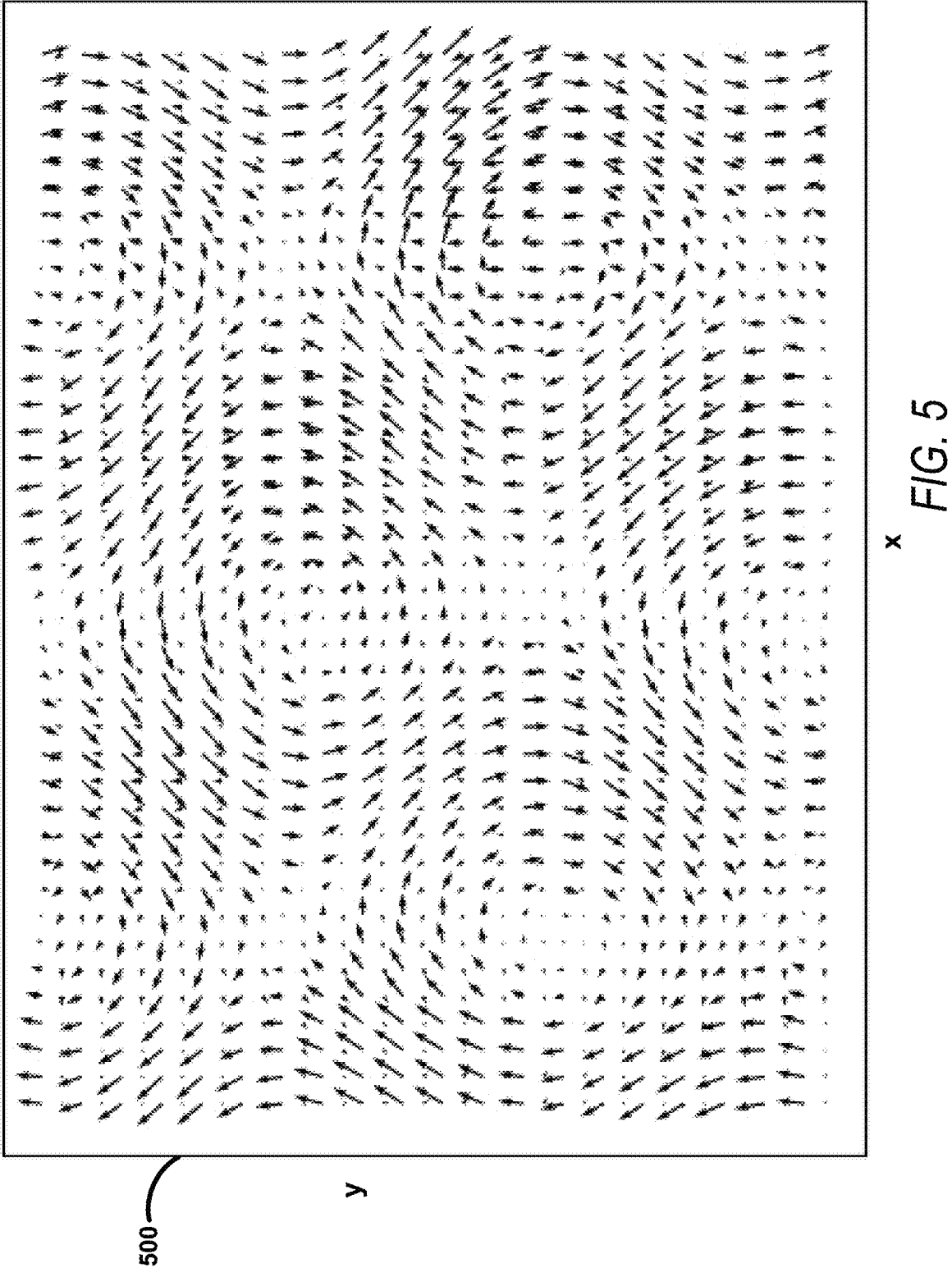
FIG. 5 illustrates, by way of example, a vector field generated by treating the vectors field as a multivector object, performing a Clifford Fourier transform, using a Clifford Fourier layer, on the multivector object, and then reconstructing the vector field from the Clifford Fourier transform.

FIGS. 3-5 illustrate, by way of example, respective vector fields that help explain differences between prior treatment of fields and treatment of fields using multivector objects. FIG. 3 illustrates a first vector field 300 that represents some physical phenomena. The vector field 300 includes a plurality of sinks and sources. A sink is a point to which vectors tend to settle (a point towards which vectors point). A sink is considered a point of stability. A source is a point from which vectors tend to point away or "originate" from. A source is considered a point of instability. In FIG. 3 there is a batch size of 1, there are two channels (x and y), and there are 32 samples of each of x and y in the batch.

FIG. 4 illustrates, by way of example, a vector field 400 generated by decomposing the vector field 300 into respective x and y Fourier transforms and then attempting to reconstruct the vector field 300 from the Fourier transforms. As can be seen, most, if not all, of the point source and sink structure from the vector field 300 has been lost in the vector field 400. In FIG. 4 there is a batch size of 1, there are two channels (x and y), and there are 32 samples of each of x and y in the batch.

FIG. 5 illustrates, by way of example, a vector field 500 generated by treating the vectors field 300 as a multivector object, performing a Clifford Fourier transform, using a Clifford Fourier layer, on the multivector object, and then reconstructing the vector field 300 from the Clifford Fourier transform. As can be seen, most, if not all, of the point source and sink structure from the vector field 300 has been retained in the vector field 500. In FIG. 5 there is a batch size of 1, there is a single, complex valued channel, and there are 32 samples of each of the single channel in the batch. The Fourier transform is taken over the single channel instead of multiple channels as is typically done.

The channel reduction is a way that the Clifford neural layers of embodiments provide improvements. The channel reduction simplifies the processing and retains more structure than breaking the problems into more channels, operating on the channels individually, and then recombining the outputs of the operations on the channels individually.

A reason the vector field 400 did not retain the structure is because the x and y components were treated independently, and the correlation between the x and y components is ignored or assumed to be negligible. But, in the vector field 500, the correlation between the x and y components is retained by treating the vector field as a multivector object.

What follows is a description of Clifford algebras that form the foundation for treating vector fields as multivector objects.

We introduce important mathematical concepts and discuss three prominent Clifford algebras, $Cl_{2,0}(R)$, $Cl_{0,2}(R)$, $Cl_{3,0}(R)$, which are directly related to the Clifford neural layers. A more detailed introduction as well as connections to complex numbers and quaternions is provided elsewhere. Consider the vector space $R^n$ with standard Euclidean product $<.,.>$, where n=p+q, and p and q are non-negative integers. A real Clifford algebra $Cl_{p,q}(R)$ is an associative algebra generated by p+q orthonormal basis elements $e_1, \ldots, e_{p+q}$ of the generating vector space $R^n$, such that the following quadratic relations hold:

$$e_i^2 = +1 \text{ for } 1 \leq i \leq p, \tag{1}$$

$$e_j^2 = -1 \text{ for } p < j \leq p+q, \tag{2}$$

$$e_i e_j = -e_j e_i \text{ for } i \neq j. \tag{3}$$

The pair (p, q) is called the signature and defines a Clifford algebra $Cl_{p,q}(R)$, together with the basis elements that span the vector space $G^{p+q}$ of $Cl_{p,q}(R)$. Vector spaces of Clifford algebras have scalar elements and vector elements but can also have elements consisting of multiple basis elements of the generating vector space $R^n$, which can be interpreted as plane and volume segments. Exemplary low-dimensional Clifford algebras are: (i) $Cl_{0,0}(R)$ which is a one-dimensional algebra that is spanned by the basis element {1} and is therefore isomorphic to R, the field of real numbers; (ii) $Cl_{0,1}(R)$ which is a two-dimensional algebra with vector space $G^1$ spanned by {1, $e_1$} where the basis vector $e_1$ squares to 1, and is therefore isomorphic to C, the field of complex numbers; (iii) $Cl_{0,2}(R)$ which is a 4-dimensional algebra with vector space $G^2$ spanned by {1, $e_1$, $e_2$, $e_1e_2$}, where {$e_1$, $e_2$, $e_1e_2$}all square to 1 and anti-commute. Thus, $Cl_{0,2}(R)$ is isomorphic to the quaternions H.

The grade of a Clifford algebra basis element is the dimension of the subspace it represents. For example, the basis elements {1, $e_1$, $e_2$, $e_1e_2$} of the vector space $G^2$ of the Clifford algebra $Cl_{0,2}(R)$ have the grades {0, 1, 1, 2}. Using the concept of grades, one can divide Clifford algebras into linear subspaces made up of elements of each grade. The grade subspace of smallest dimension is $M_0$, the subspace of all scalars (elements with 0 basis vectors of the generating vector space). Elements of $M_1$ are called vectors, elements of $M_2$ are bivectors, and so on. In general, a vector space $G^{p+q}$ of a Clifford algebra $Cl_{p,q}(R)$ can be written as the direct sum of all of these subspaces: $G^{p+q}=M_0 \oplus M_1 \oplus \ldots \oplus M_{p+q}$. The elements of a Clifford algebra are called multivectors, containing elements of subspaces, i.e. scalars, vectors, bivectors, . . . , k-vectors. The basis element with the highest grade is called the pseudoscalar, which in $R^2$ corresponds to the bivector $e_1 e_2$, and in $R^3$ to the trivector $e_1 e_2 e_3$.

The dual $a^*$ of a multivector a is defined as $a^*=a i_{p+q}$, where $i_{p+q}$ represents the respective pseudoscalar of the Clifford algebra. This definition allows one to relate different multivectors to each other, which is a useful property when defining Clifford Fourier transforms. For example, for Clifford algebras in $R^2$ the dual of the scalar is the bivector, and in $R^3$, the dual of the scalar is the trivector.

The geometric product is a bilinear operation on multivectors. For arbitrary multivectors a, b, $c \in G^{p+q}$, and scalar $\lambda$, the geometric product has the following properties: (i) closure, i.e. ab $G^{p+q}$, (ii) associativity, i.e. (ab)c=a(bc); (iii) commutative scalar multiplication, i.e. $\lambda R = a\lambda$; (iv) distributive over addition, i.e. a(b+c)=ab+ac. The geometric product is in general non-commutative, i.e. ab$\neq$ba. Note that Equations 1, 2, and 3 describe the geometric product specifically between basis elements of the generating vector space.

Clifford algebras $Cl_{2,0}(R)$ and $Cl_{0,2}(R)$ are now discussed. The 4-dimensional vector spaces of these Clifford algebras have the basis vectors $\{1, e_1, e_2, e_1 e_2\}$ where $e_1, e_2, e_1 e_2$ square to $+1$ for $Cl_{2,0}(R)$ and to $-1$ for $Cl_{0,2}(R)$. For $Cl_{2,0}(R)$, the geometric product of two multivectors $a=a_0+a_1 e_1+a_2 e_2+a_{12} e_1 e_2$ and $b=b_0+b_1 e_1+b_2 e_2+b_{12} e_1 e_2$ is given by:

$$ab = (a_0 b_0 + a_1 b_1 + a_2 b_2 - a_{12} b_{12})1 + (a_0 b_1 + a_1 b_0 - a_2 b_{12} + a_{12} b_2)e_1 + \quad (4)$$

$$(a_0 b_2 + a_1 b_{12} + a_2 b_0 - a_{12} b_1)e_2 + (a_0 b_{12} + a_1 b_2 - a_2 b_1 + a_{12} b_0)e_1 e_2$$

which can be derived by collecting terms that multiply the same basis elements. A vector $x=(x_1, x_2) \in R^2$ with standard Euclidean product $<., .<$ can be related to $x_1 e_1 + x_2 e_2 \in R^2 \subset G^2$. Clifford multiplication of two vectors x, $y \in R^2 \subset G^2$ yields the geometric product xy:

$$xy = (x_1 e_1 + x_2 e_2)(y_1 e_1 + y_2 e_2) = \quad (5)$$

$$x_1 y_1 e_1^2 + x_2 y_2 e_2^2 + x_1 y_2 e_1 e_2 + x_2 y_1 e_2 e_1 = \langle x, y \rangle + x \wedge y,$$

where $\wedge$ is the exterior or wedge product. The asymmetric quantity $x \wedge y = y \wedge x$ is associated with the bivector, which can be interpreted as an oriented plane segment.

A unit bivector $i_2$, spanned by the (orthonormal) basis vectors $e_1$ and $e_2$ is determined by the product:

$$i_2 = e_1 e_2 = \underbrace{\langle e_1, e_2 \rangle}_{=0} + e_1 \wedge e_2 = -e_2 \wedge e_1 = -e_2 e_1, \quad (6)$$

which if squared yields $$i_2^2 = -1.$$

Thus, $i_2$ represents a geometric $\sqrt{-1}$. From Equation 6, it follows that $e_2 = e_1 i_2 = -i_2 e_1$ and $e_1 = i_2 e_2 - e_2 i_2$.

Using the pseudoscalar $i_2$, the dual of a scalar is a bivector and the dual of a vector is again a vector. The dual pairs of the base vectors are $1 \leftrightarrow e_1 e_2$ and $e_1 \leftrightarrow e_2$. These dual pairs allow one to represent an arbitrary multivector a as $$a = a_0 + a_1 e_1 + a_2 e_2 + a_{12} e_1 e_2 = \underbrace{(a_0 + a_{12} i_2)}_{\text{spinor part}} + e_1 \underbrace{(a_1 + a_2 i_2)}_{\text{vector part}}$$

which can be regarded as two complex-valued parts: the spinor part, which commutes with the base element 1, i.e. $1 i_2 = i_2 1$, and the vector part, which anti-commutes with the respective base element $e_1$, i.e. $e_1 i_2 = e_1 e_1 e_2 = -e_1 e_2 e_1 = -i_2 e_1$. This decomposition will be the basis for Clifford Fourier transform layers which naturally act on dual pairs.

The Clifford algebra $Cl_{0,2}(R)$ is isomorphic to the quaternions H, which are an extension of complex numbers and are commonly written in the literature as $a + b\hat{i} + c\hat{j} + d\hat{k}$. Quaternions also form a 4-dimensional algebra spanned by $\{1, \hat{i}, \hat{j}, \hat{k}\}$, where $\hat{i}, \hat{j}, \hat{k}$ all square to $-1$. The algebra isomorphism to $Cl_{0,2}(R)$ is easy to verify since $e_1, e_2, e_1 e_2$ all square to $-1$ and anti-commute. The basis element 1 is often called the scalar part, and the basis elements $\hat{i}, \hat{j}, \hat{k}$ are called the vector part of a quaternion. Quaternions have practical uses in applied mathematics, particularly for calculations involving three-dimensional rotations, which is used to define the rotational Clifford convolution layer elsewhere.

Clifford algebra $Cl_{3,0}(R)$ is now discussed. The 8-dimensional vector space $G^3$ of the Clifford algebra $Cl_{3,0}(R)$ has the basis vectors $\{1, e_1, e_2, e_3, e_1 e_2, e_3 e_1, e_2 e_3, e_1 e_2 e_3\}$, i.e. it consists of one scalar, three vectors $\{e_1, e_2, e_3\}$, three bivectors $\{e_1 e_2, e_3 e_1, e_2 e_3\}$, and one trivector $e_1 e_2 e_3$. The trivector is the pseudoscalar $i_3$ of the algebra. The geometric product of two multivectors is defined analogously to the geometric product of $Cl_{2,0}(R)$. The dual pairs of $Cl_{3,0}(R)$ are: $1 \leftrightarrow e_1 e_2 e_3 = i_3$, $e_1 \leftrightarrow e_1 e_2$, $e_2 \leftrightarrow e_3 e_1$, and $e_3 \leftrightarrow e_1 e_2$.

An intriguing example of the duality of the multivectors of $Cl_{3,0}(R)$ emerges when writing the expression of the electromagnetic field F in terms of an electric vector field E and a magnetic vector field B, such that $F=E+B_3$, where $E=E_x e_1 + E_y e_2 + E_z e_3$ and $B=B_x e_1 + B_y e_2 + B_z e_3$. In this way the electromagnetic field F decomposes into electric vector and magnetic bivector parts via the pseudoscalar $i_3$. For example, for the base component $B_x e_1$ of B it holds that $B_x e_1 i_3 = B_x e_1 e_1 e_2 e_3 = B_x e_2 e_3$ which is a bivector and the dual to the base component $E_x e_1$ of E. Consequently, the multivector representing F consists of three vectors (the electric field components) and three bivectors (the magnetic field components multiplied by $i_3$). This viewpoint gives Clifford neural layers a natural advantage over their corresponding scalar DL counterparts.

Clifford convolution layers and Clifford Fourier transform layers for 2-dimensional problems are now described. Extensions to 3 dimensions are provided elsewhere, along with discussions about appropriate normalization and initialization procedures.

From regular to Clifford CNN layers. Regular convolutional neural network (CNN) layers take as input feature maps $f: Z^2 \rightarrow R^{c_{in}}$ and convolve them with a set of $c_{out}$ filters $$\{w^i\}_{i=1}^{c_{out}} \text{ with } w^i : Z^2 \rightarrow R^C \text{ in.} : [f \star w_i](x) = \sum_{y \in Z^2} < f(y), \quad (8)$$

-continued $$w^j(y-x)> = \sum_{y \in Z^2} \sum_{j=1}^{c_{in}} f^j(y) w^{i,j}(y-x).$$

Equation 8 can be interpreted as an inner product of input feature maps with the corresponding filters at every point $y \in Z^2$. By applying $c_{out}$ filters, the output feature maps can be interpreted as $c_{out}$ dimensional feature vectors at every point $y \in Z^2$. It is desired to extend convolution layers such that the element-wise product of scalars $f^j(y)w^{i,j}(y-x)$ is replaced by the geometric product of multivector inputs and multivector filters $f^j(y)w^{i,j}(y-x)$. Therefore, the feature maps $f: Z^2 \rightarrow R^c$in are replaced by multivector feature maps $f: Z^2 \rightarrow (G^2)^c$in and convolved with a set of $c_{out}$ multivector filters $$\{w^i\}_{i=1}^{c_{out}}: Z^2 \rightarrow (G^2)^c \text{in:}$$

$$[f \star w_i](x) = \underbrace{\sum_{y \in Z^2} \sum_{j=1}^{c_{in}} f^j(y) w^{i,j}(y-x)}_{f^j w^{i,j}: G^2 \times G^2 \rightarrow G^2} \qquad (9)$$

Note that each (geometric) product, indexed by $i \in \{1, \ldots, c_{out}\}$ and $j \in \{1, \ldots c_{in}\}$, now results in a new multivector rather than a scalar. Hence, the output of a layer is a grid of coat multivectors. One can implement a 2D Clifford CNN layer using Equation 4 where $$\{b_0, b_1, b_2, b_{12}\} \rightarrow \{w_0^{i,j}, w_1^{i,j}, w_2^{i,j}, w_{12}^{i,j}\}$$

correspond to 4 different kernels representing one 2D multivector kernel, i.e. 4 different convolution layers, and $$\{a_0, a_1, a_2, a_{12}\} \rightarrow \{f_0^j, f_1^j, f_2^j, f_{12}^j\}$$

correspond to the scalar, vector and bivector parts of the input multivector field. The channels of the different layers represent different stacks of scalars, vectors, and bivectors. Analogously, one can implement a 3D Clifford CNN layer using Equation 45. A schematic sketch of a Clifford convolution layer is shown in FIG. 6.

Figure 6:
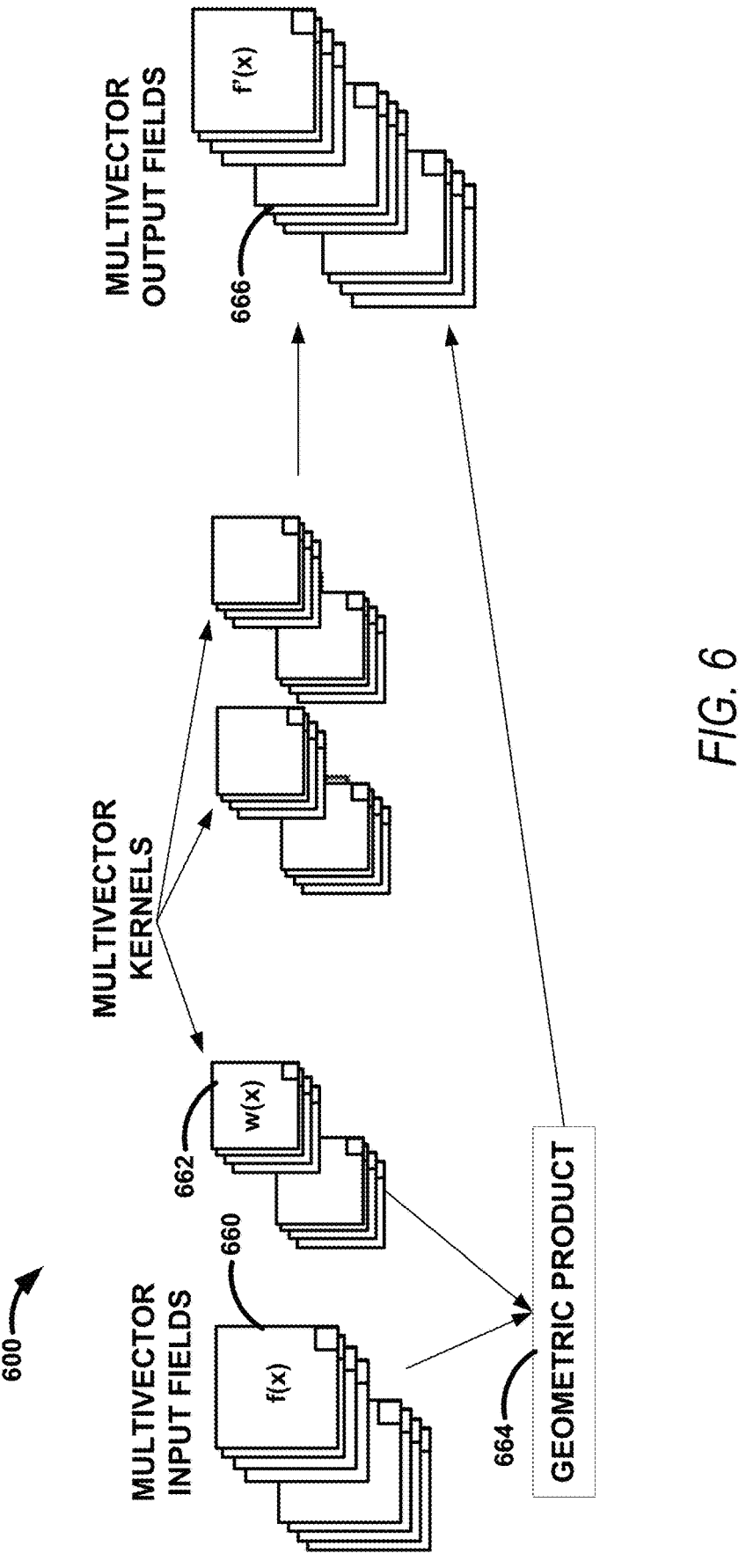
FIG. 6 illustrates, by way of example, a diagram of an embodiment of a Clifford convolution layer.

FIG. 6 illustrates, by way of example, a diagram of an embodiment of a Clifford neural layer 600. The Clifford neural layer 600 convolves a multivector input 660 with multivector kernels 662. The convolution can be performed using the geometric product 664. The result is an output that includes multivector output fields 666. The geometric product 664 is described elsewhere. For a standard convolution implementation consistent with a convolution of FIG. 6, there would be 8 individual channels, and 32 samples for each channel. In FIG. 6 in contrast, there are only two channels, each with four entry inputs (e.g., scalar, vector, bi-vector, etc. parts of the multivector). A geometric product multiplies the multivector kernel to the entries maintaining dependencies on entries of the multivector inputs.

What follows is pseudocode for a 2D Clifford kernel and a Clifford Convolution layer:

Function CLIFFORDKERNEL2D(W)

$$\text{KERNEL} \leftarrow \begin{bmatrix} W[0] & W[1] & W[2] & -W[3] \\ W[1] & W[0] & -W[3] & W[2] \\ W[2] & W[3] & W[0] & -W[1] \\ W[3] & W[2] & -W[1] & W[0] \end{bmatrix}$$

return KERNEL
Function CLIFFORDCONV2D(W, x)
  KERNEL ← CLIFFORDKERNEL2D(W)
  Input ← VIEW_AS_REALVECTOR(x)
  Output ← CLIFFORDCONV(KERNEL, Input)
  return VIEW_AS_MULTIVECTOR (Output)

An alternative parameterization to the Clifford CNN layer introduced in Equation 9, is called a rotational Clifford CNN layer, and can be realized by using the isomorphism of the Clifford algebra $Cl_{0,2}(R)$ to quaternions. Note that a quaternion rotation can be realized by a matrix multiplication. Using the isomorphism, one can represent the feature maps $f^j$ and filters $w^{i,j}$ as quaternions:

$$f^j = f_0^j + f_1^j \hat{\imath} + f_2^j \hat{\jmath} + f_3^j \hat{k} \text{ and } w^{i,j} = w_0^{i,j} + w_1^{i,j} \hat{\imath} + w_2^{i,j} \hat{\jmath} + w_3^{i,j} \hat{k}.$$

One can now devise an alternative parameterization of the product between the feature map $f^j$ and $w^{i,j}$. To be more precise, consider a composite operation that results in a scalar quantity and a quaternion rotation, where the latter acts on the vector part of the quaternion $f^j$ and only produces nonzero expansion coefficients for the vector part of the quaternion output. A quaternion rotation $w^{i,j} f^j (w^{i,j})^{-1}$ acts on the vector part $(\hat{\imath}, \hat{\jmath}, \hat{k})$ of $f^j$ and can be algebraically manipulated into a vector matrix operation $R^{i,j} f^j$, where $R^{i,j}$: $H \rightarrow H$ is built up from the elements of $w^{i,j}$. In other words, one can transform the vector part $(\hat{\imath}, \hat{\jmath}, \hat{k})$ of $f^j \in H$ via a rotation matrix $R^{i,j}$ that is built from the scalar and vector part $(1, \hat{\imath}, \hat{\jmath}, \hat{k})$ of $w^{i,j} \in H$. Altogether, a rotational multivector filter $$\{w_{rot}^i\}_{i=1}^{c_{out}}: Z^2 \rightarrow (G^2)^{c_{in}}$$

acts on the feature map $f^j$ through a rotational transformation $$R^{i,j}(w_{rot,0}^{i,j}, w_{rot,1}^{i,j}, w_{rot,2}^{i,j}, w_{rot,12}^{i,j})$$

acting on vector and bivector parts of the multivector feature map $f: Z^2$
  $(G^2)^c$in, and an additional scalar response of the multivector filters:

$$[f \star w_{rot}^i](x) = \sum_{y \in Z^2} \sum_{j=1}^{c_{in}} \underbrace{[f^j(y)w_{rot}^{i,j}(y-x))]_0}_{scalar\ output} + R^{i,j}(y-x) \cdot \begin{pmatrix} f_1^j(y) \\ f_2^j(y) \\ f_{12}^j(y) \end{pmatrix} \qquad (10)$$

Where $[f^j(y)w_{rot}^{i,j}(y-x))]_0 = f_0^j w_{rot,0}^{i,j} - f_1^j w_{rot,1}^{i,j} - f_2^j w_{rot,2}^{i,j} - f_{12}^j w_{rot,12}^{i,j}$ is the scalar output of Equation 4.

A detailed description of the rotational multivector filters $R^{i,j}(y\ x)$ is outlined elsewhere. While in principle the Clifford CNN layer in Equation 9 and the rotational Clifford CNN layer in Equation 10 are equally flexible, the experiments described below show that rotational Clifford CNN layers lead to better performance.

What follows is pseudocode for a 2D Rotational Clifford kernel and a Rotational Clifford Convolution layer: layer:

---

```
Function CLIFFORDKERNEL 2 D_ROT(W)
    sq_12 < W [1]^2 + W [2]^2
    sq_13 < W [1]^2 + W [3]^2
    sq_23 < W [2]^2 + W [3]^2
    sumsq < W [0]^2 + W [1]^2 + W [2]^2 + W [3]^2 + ε
    rot_12 ← W [0]W [1]/sumsq
    rot_13 ← W [0]W [2]/sumsq
    rot_14 ← W [0]W [3]/sumsq
    rot_23 ← W [1]W [2]/sumsq
    rot_24 ← W [1]W [3]/sumsq
    rot_34 ← W [2]W [3]/sumsq
```

$$
KERNEL \leftarrow \begin{bmatrix}
W[0] & -W[1] & -W[2] & -W[3] \\
W[5] & W[4](1-sq_{23}) & W[4](rot_{23}-rot_{14}) & W[4](rot_{24}+rot_{13}) \\
W[5] & W[4](rot_{23}+rot_{14}) & W[4](1-sq_{13}) & W[4](rot_{34}-rot_{12}) \\
W[5] & W[4](rot_{24}-rot_{13}) & W[4](rot_{34}+rot_{12}) & W[4](1-sq_{12})
\end{bmatrix}
$$

```
return KERNEL
Function CLIFFORDCONV2D_ROT(W, x)
    KERNEL ← CLIFFORDKERNEL2D_ROT(W)
    Input ← VIEW_AS_REALVECTOR(x)
    Output ← CLIFFORDCONV2D(KERNEL, Input)
return VIEW_AS_MULTIVECTOR (Output)
```

---

Clifford convolutions satisfy the property of equivariance under translation of the multivector inputs. Analogous to a Theorem presented below, translation equivariance can also be shown for rotational Clifford CNN layers. However, the current definition of Clifford convolutions is not equivariant under multivector rotations or reflections. A general kernel constraint for multivector kernels, which sketches a path towards generalized Clifford convolutions which are equivariant w.r.t rotations or reflections is provided below.

From Fourier Neural Operator (FNO) to Clifford Fourier layers. In arbitrary dimension n, the discrete Fourier transform of an n-dimensional complex signal $f(x)=f(x_1, \ldots, x_n): R^n \to C$ at $M_1 \times \ldots \times M_n$ grid points is defined as:

$$
\hat{f}(\zeta_1, \ldots, \zeta_n) = \mathcal{F}\{f\}(\zeta_1, \ldots, \zeta_n) = \sum_{m_1=0}^{M_1} \cdots \sum_{m_n=0}^{M_n} f(m_1, \ldots, m_n) \cdot e^{-2\pi i \cdot \left(\frac{m_1\zeta_1}{M_1}+\ldots+\frac{m_n\zeta_n}{M_n}\right)}, \tag{11}
$$

where $(\xi_1, \ldots, \xi_n) \in Z_M 1 \ldots \times \ldots Z_{Mn}$.

In Fourier Neural Operators (FNO), discrete Fourier transforms on real-valued input fields and respective back-transforms— implemented as Fast Fourier Transforms on real-valued inputs (RFFTs) are interleaved with a weight multiplication by a complex weight matrix of shape $c_{in} \times c_{out}$ for each mode, which results in a complex-valued weight tensor of the form $$
W \in C^{c_{in} \times c_{out} \times (\xi_1^{max} \times \ldots \times \xi_n^{max})},
$$

where Fourier modes above cut-off frequencies $$
(\xi_1^{max}, \ldots, \xi_n^{max})
$$

are set to zero. Additionally, a residual connection is applied, which is usually implemented as a convolution layer with kernel size 1.

Figure 7:
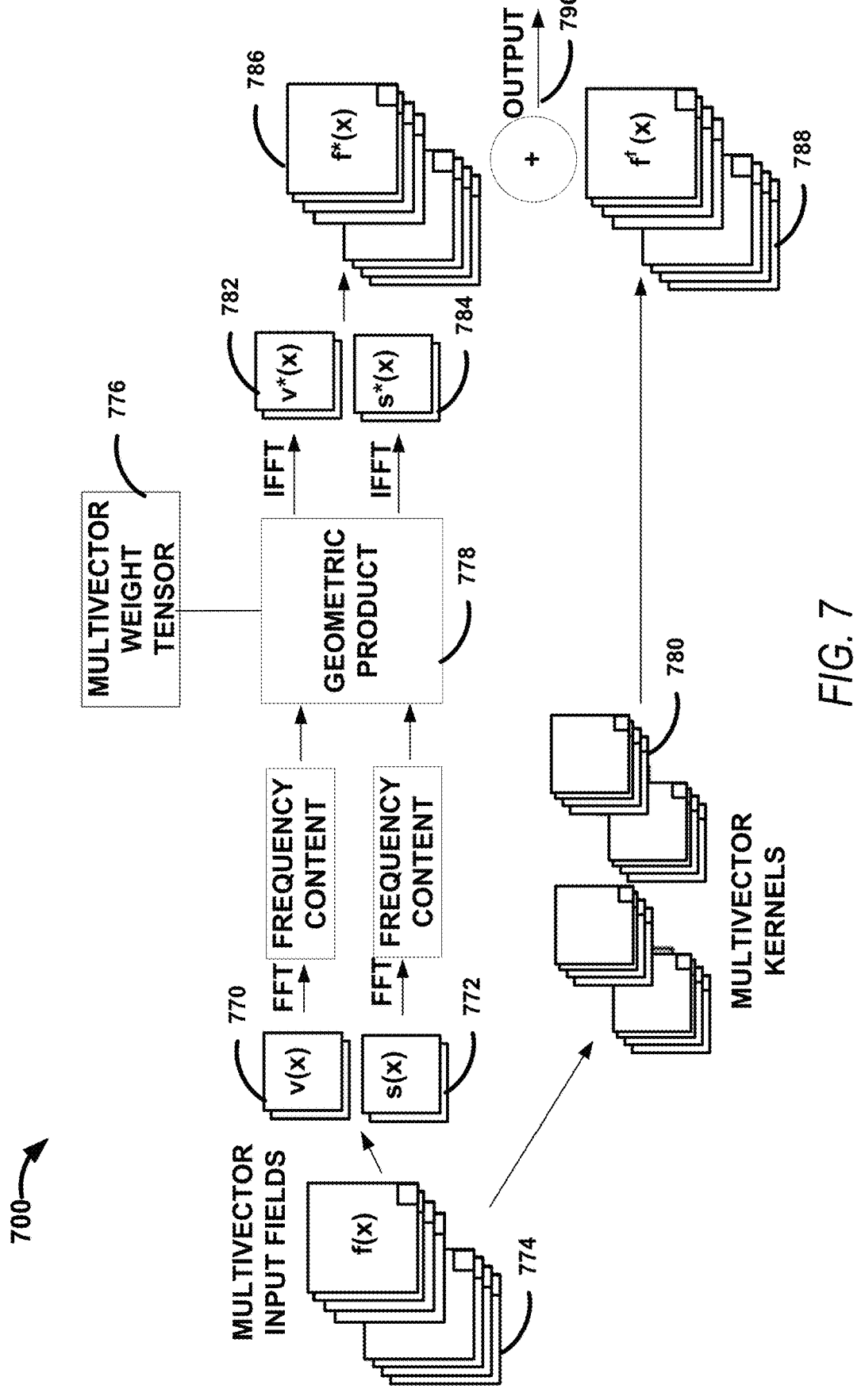
FIG. 7 illustrates, by way of example, a diagram of an embodiment of a Clifford Fourier Neural Operator (CFNO) layer.

FIG. 7 illustrates, by way of example, a diagram of an embodiment of a Clifford Fourier Neural Operator (CFNO) 700. In the CFNO 700, a real valued Fast Fourier transform (RFFT) over real valued scalar input fields $f$ (x) is replaced by a complex Fast Fourier transform (FFT) over complex valued dual parts v(x) 770 and s(x) 772 of multivector fields $f$ (x) 774. Pointwise multiplication in the Fourier space via complex weight tensor W is replaced by a geometric product 778 in the Clifford Fourier space via multivector weight tensor W 776. Additionally, the convolution path is replaced by Clifford convolutions with multivector kernels 780 w.

For a standard Fourier transform implementation consistent with a convolution of FIG. 7, there would be 8 individual channels, and 32×32 samples for each channel. Thus, 8 individual Fourier transforms would be performed and the results would be combined. In FIG. 7 in contrast, there are only two channels, each with four entry inputs (e.g., scalar, vector, bi-vector, etc. parts of the multivector). Four Fourier transforms are performed, two Fourier transforms per multivector input.

The 2-dimensional Clifford Fourier transform and the respective inverse transform for multivector valued functions $f$ (x): $R^2 \to G^2$ and vectors x, $\xi \in R^2$ are defined as:

$$
\hat{f}(\zeta) = \mathcal{F}\{f\}(\xi) = 1/2\pi \int_{R^2} f(x)e^{-2\pi i_2 <x,\xi>} dx, \forall \xi \in R^2, \tag{12}
$$

$$
f(x) = \mathcal{F}^{-1}\{\mathcal{F}\{f\}\}(x) = 1/2\pi \int_{R^2} f(\xi)e^{2\pi i_2 <x,\xi>} d\xi, \forall x \in R^2, \tag{13}
$$

provided that the integrals exist. In contrast to standard Fourier transforms, $f(x)$ 774 and $\hat{f}(\xi)$ represent multivector fields in the spatial and the frequency domain, respectively. Furthermore, $i_2 = e_1 e_2$ is used in the exponent. Inserting the definition of multivector fields, Equation 12 becomes:

$$
\mathcal{F}\{f\}(\zeta) = 1/2\pi \int_{R^2} f(x)e^{-2\pi i_2 <x,\xi>} dx =
$$

$$
1/2\pi \int_{R^2} \left[ 1 + \underbrace{(f_0(x) + f_{12}(x)i_2)}_{spinor\ part} + e_1 \underbrace{(f_1(x) + f_2(x)i_2)}_{vector\ part} \right] e^{-2\pi i_2 <x,\xi>} dx =
$$

$$
1/2\pi \int_{R^2} 1(f_0(x) + f_{12}(x)i_2) + e_1(f_1(x) + f_2(x)i_2)e^{-2\pi i_2 <x,\xi>} dx =
$$

$$
1/2\pi \int_{R^2} 1(f_0(x) + f_{12}(x)i_2)e^{-2\pi i_2 <x,\xi>} dx + 1/2\pi \int_{R^2} e_1(f_1(x) +
$$

$$
f_2(x)i_2)e^{-2\pi i_2 <x,\xi>} dx = 1[\mathcal{F}(f_0(x) + f_{12}(x)i_2)(\xi)] +
$$

$$
e_1 \mathcal{F}[(f_1(x) + f_2(x)i_2)(\xi)]. \tag{14}
$$

A Clifford Fourier transform is obtained by applying two standard Fourier transforms to the dual pairs $f_0 = f_0(x) + f_{12}(x)i_2$ and $f_1 = f_1(x) + f_2(x)i_2$, which both can be treated as a complex-valued signals $f_0, f_1: R^2 \to C$. Consequently, $f(x)$

774 can be understood as an element of $C^2$. The 2D Clifford Fourier transform is the linear combination of two classical Fourier transforms. Discrete versions of Equation 14 are obtained analogously to Equation 11. Similar to FNO, multivector weight tensors 776

$$W \in (G^2)^{c_{in} \times c_{out} \times (\xi_1^{max} \times \xi_2^{max})}$$

are applied, where again Fourier modes above cut-off frequencies $$(\xi_1^{max}, \xi_2^{max})$$

are set to zero. Thus, the Clifford Fourier modes are pointwise modified via the geometric product as follows:

$$\hat{f}(\xi) = \mathcal{F}\{f\}(\xi) = \hat{f}_0(\xi) + \hat{f}_1(\xi)e_1 + \hat{f}_2(\xi)e_2 + \hat{f}_{12}(\xi)e_{12} \quad (15)$$

The Clifford Fourier modes follow when combining spinor and vector parts of Equation 14. Finally, the residual connection of a prior FNO is replaced by a Clifford convolution with multivector kernel 780$k$, such as by a $Cl_{2,0}(R)$ convolution layer 600. A schematic sketch of a Clifford Fourier layer is shown in FIG. 7. 3D Clifford Fourier transforms follow a similar elegant construction, where four separate Fourier transforms to the complex fields as in Equation 16:

$$f_0(x) = f_0(x) + f_{123}(x)i_3, \; f_1(x) = f_1(x) + f_{23}(x)i_3$$

$$f_2(x) = f_2(x) + f_{31}(x)i_3, \; f_3(x) = f_3(x) + f_{12}(x)i_3$$

In Equation 16 scalar/trivector and vector/bivector components are combined into complex fields and then subjected to a Fourier transform. More details on 2D and 3D Fourier transforms and their properties can be found elsewhere. Spatial representations of $v(x)$ 770 and $s(x)$ 772 are recovered by an inverse FFT which provides $v^*(x)$ 782 and $s^*(x)$ 784 that are combined to form $f^*(x)$ 786. A result 788 of the Clifford convolution is combined with $f^*(x)$ 786 to from an output 790 of the Clifford FNO 700.

What follows is pseudocode for implementing a Clifford Spectral Convolution and a Clifford Fourier Layer:

```
Function CLIFFORDSPECTRALCONV2D(W, x, m₁, m₂)
  xᵥ, xₛ ← VIEW_AS_DUAL_PARTS(x)
  f(xᵥ) ← FFT2(xᵥ) - Complex 2D FFT of vector part
  f(xₛ) ← FFT2(xₛ) - Complex 2D FFT of scalar part
```

$$f^*(x_v) \leftarrow \begin{bmatrix} f(x_v)[\ldots , :m_1, :m_2] & f(x_v)[\ldots , :m_1, -m_2:] \\ f(x_v)[\ldots , -m_1:, :m_2] & f(x_v)[\ldots , -m_1:, -m_2:] \end{bmatrix} -$$

Vector modes $$f^*(x_s) \leftarrow \begin{bmatrix} f(x_s)[\ldots , :m_1, :m_2] & f(x_s)[\ldots , :m_1, -m_2:] \\ f(x_s)[\ldots , -m_1:, :m_2] & f(x_s)[\ldots , -m_1:, -m_2:] \end{bmatrix} -$$

Scalar modes $f^*(x) \leftarrow f^*(x_s) \cdot r + f^*(x_v) + f^*(x_v) \cdot i + f^*(x_s) \cdot i -$ Multivector -continued

```
Fourier modes
f*(x) ← f*(x)W − Geometric product in Fourier space
x̂ᵥ ← IFFT2(f̂*(x)[1] + f̂*(x)[2]) − Inverse 2D FFT of vector part
x̂ₛ ← IFFT2(f̂*(x)[0] + f̂*(x)[3]) − Inverse 2D FFT of scalar part
x̂ ← VIEW_AS_MULTIVECTOR(x̂ᵥ, x̂ₛ)
return x̂
Function CLIFFORDFOURIERLAYER(Wf, Wc, x)
  y₁ ← CLIFFORDSPECTRALCONV(Wf, x, m₁, m₂)
  x₂ ← VIEW_AS_REALVECTOR(x)
  y₂ ← CLIFFORDCONV(Wc, x₂)
  y₂ ← VIEW_AS_MULTIVECTOR(y₂)
  out ← ACTIVATION (y₁ + y₂)
return out
```

Figure 8:
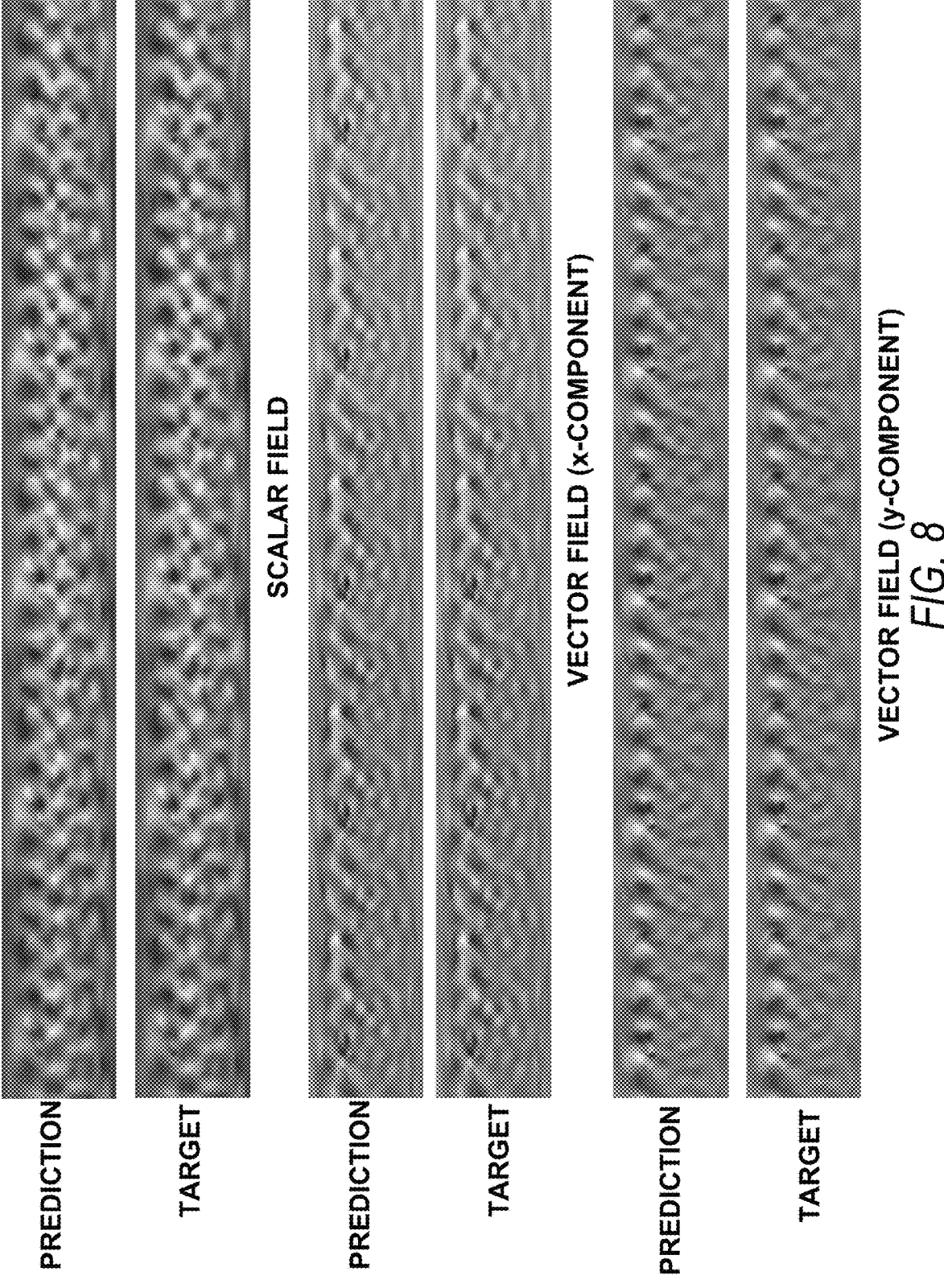
FIG. 8 shows example rollouts of the scalar and the vector field components obtained by Clifford Fourier PDE surrogates for a qualitative comparison.

An assessment of Clifford neural layers was performed for different architectures in three experimental settings: the incompressible Navier-Stokes equations, shallow water equations for weather modeling, and 3-dimensional Maxwell's equations in matter. Ablations were also performed for different dataset sizes. All datasets share the common trait of containing multiple input and output fields. More precisely, one scalar and one 2-dimensional vector field in case of the Navier-Stokes and the shallow water equations, and a 3-dimensional (electric) vector field and its dual (magnetic) bivector field in case of the Maxwell's equations. ResNet and Fourier Neural Operator (FNO) based architectures were replaced with their respective Clifford algebra neural layer counterparts. In doing so, every convolution and every Fourier transform was changed to a respective Clifford neural layer operation. Also, a substitution for normalization techniques and activation functions with appropriate counterparts was performed. Different training set sizes were evaluated, and losses for scalar and vector fields are reported. Inputs to the neural PDE surrogates are respective fields at previous t timesteps, where t varies between different PDEs. The one-step loss is the mean-squared error at the next timestep summed over fields. The rollout loss is the mean-squared error after applying the neural PDE surrogate 5 times, summing over fields and time dimension. More information on the datasets, implementation details of the tested architectures, loss functions, and more detailed results can be found elsewhere. FIG. 8 shows example rollouts of the scalar and the vector field components obtained by Clifford Fourier PDE surrogates for a qualitative comparison.

The summed MSE (SMSE) loss used in these experiments are defined as:

$$L_{SMSE} = 1/N_y \sum_{y \in Z^3 \text{ or } Z^2} \sum_{j=1}^{N_t} \sum_{i=1}^{N_{fields}} \|u_i(y, t_j) - \hat{u}_i(y, t_j)\|_2^2$$

where u is the target, û the model output, $N_{fields}$ comprises scalar fields as well as individual vector field components, and $N_y$ is the total number of spatial points. The $L_{SMSE}$ Equation is used for training with $N_t=1$, and four metrics:

One-step loss where $N_t=1$ and $N_{fields}$ comprises all scalar and vector components.

Vector loss where $N_t=1$ and $N_{fields}$ comp rises only vector components.

Scalar loss where $N_t=1$ and $N_{fields}$ comprises only the scalar field.

Rollout loss where $N_t=5$ and $N_{fields}$ comprises all scalar and vector components.

For Maxwell's equation, electric and magnetic loss are defined analogously to the vector and the scalar loss for Navier-Stokes and shallow water experiments.

Experiments are performed with two architecture families: ResNet models and Fourier Neural Operators (FNOs). All baseline models are fine-tuned for all individual experiments with respect to number of blocks, number of channels, number of modes (FNO), learning rates, normalization and initialization procedures, and activation functions. The best models are reported, and for reported Clifford results each convolution layer is substituted with a Clifford convolution, each Fourier layer with a Clifford Fourier layer, each normalization with a Clifford normalization and each non-linearity with a Clifford non-linearity. A Clifford non-linearity in this context is the application of the corresponding default linearity to the different multivector components.

For Navier-Stokes and shallow water experiments, ResNet architectures with 8 residual blocks, each consisting of two convolution layers with 3×3 kernels, shortcut connections, group normalization, and Gaussian Error Linear Unit (GeLU) activation functions were used. Two embedding and two output layers were used, i.e. the overall architectures could be classified as Res-20 networks. In contrast to standard residual networks for image classification, down-projection techniques were not used. Down projections are convolution layers with strides larger than 1 or via pooling layers. In contrast, the spatial resolution stays constant throughout the network. The same number of hidden channels throughout the network, that is 128 channels per layer were used. Overall this results in roughly 1.6 million parameters. Increasing the number of residual blocks or the number of channels did not increase the performance significantly.

For every ResNet-based experiment, the fine-tuned ResNet architectures were replaced with two Clifford counterparts: each CNN layer is replaced with a (i) Clifford CNN layer, and (ii) with a rotational Clifford CNN layer. To keep the number of weights similar, instead of 128 channels the resulting architectures have 64 multivector channels, resulting again in roughly 1.6 million floating point parameters. Additionally for both architectures, GeLU activation functions are replaced with Clifford GeLU activation functions, group normalization is replaced with Clifford group normalization. Using Clifford initialization techniques did not improve results.

For Navier-Stokes and shallow water experiments, 2-dimensional Fourier Neural Operators (FNOs) consisting of 8 FNO blocks, two embedding and two output layers were used. Each FNO block comprised a convolution path with a 1×1 kernel and an FFT path. 16 Fourier modes (for x and y components) for point-wise weight multiplication were used, and overall use 128 hidden channels. GeLU activation functions were used. Additional shortcut connections or normalization techniques, such as batchnorm or group were used. Note norm did not improve performance, neither did larger numbers of hidden channels, nor more FNO blocks. Overall this resulted in roughly 140 million parameters for FNO based architectures.

For 3-dimensional Maxwell experiments, 3-dimensional Fourier Neural Operators (FNOs) consisting of 4 FNO blocks, two embedding and two output layers were used. Each FNO block comprised a 3D convolution path with a 1×1 kernel and an FFT path. 6 Fourier modes (for x, y, and z components) for point-wise weight multiplication were used, and overall used 96 hidden channels. Interestingly, using more layers or more Fourier modes degraded performances. Similar to the 2D experiments, GeLU activation functions were used, and did not apply shortcut connections nor normalization techniques, such as batchnorm or groupnorms. Overall this resulted in roughly 65 million floating point parameters for FNO based architectures.

For every FNO-based experiment, the fine-tuned FNO architectures were replaces with respective Clifford counterparts: each FNO layer was replaced by its Clifford counterpart. To keep the number of weights similar, instead of 128 channels the resulting architectures have 48 multivector channels, resulting in roughly the same number of parameters. Additionally, GeLU activation functions are replaced with Clifford GeLU activation functions. Using Clifford initialization techniques did not improve results.

For 3-dimensional Maxwell experiments, each 3D Fourier transform layer was replaced with a 3D Clifford Fourier layer and each 3D convolution with a respective Clifford convolution. 6 Fourier modes (for x, y, and z components) for point-wise weight multiplication were used, and overall used 32 hidden multivector channels, which results in roughly the same number of parameters (55 million). In contrast to 2-dimensional implementations, Clifford initialization techniques proved important for 3-dimensional architectures. Most notably, too large initial values of the weights of Clifford convolution layers hindered gradient flows through the Clifford Fourier operations.

Models were optimized using the Adam optimizer with learning rates $[10^{-4}, 2 \cdot 10^{-4}, 5 \ 10^{-4}]$ for 50 epochs and minimized the summed mean squared error (SMSE) which is outlined in $L_{SMSE}$ Equation. Cosine annealing was used as a learning rate scheduler with a linear warmup. For baseline ResNet models, the number of layers, number of channels, and normalization procedures were optimized. Different activation functions were tested. For baseline FNO models, number of layers, number of channels, and number of Fourier modes were optimized. Larger numbers of layers or channels did not improve the performances for both ResNet and FNO models. For the respective Clifford counterparts, convolution and Fourier layers were replaced by Clifford convolution and Clifford Fourier layers, respectively. Clifford normalization schemes were used. The number of layers was adjusted to obtain similar numbers of parameters. Clifford architectures could have been optimized slightly more by, for example, using different numbers of hidden layers than the baseline models did. However, this would (i) slightly be against the argument of having "plug- and play" replace layers, and (ii) would have added quite some computational overhead.

All FNO and CFNO experiments used 4×16 GB NVIDIA V100 machines for training. All ResNet and Clifford ResNet experiments used 8×32 GB NVIDIA V100 machines. Average training times varied between 3 h and 48 h, depending on task and number of trajectories. Clifford runs on average took twice as long to train for equivalent architectures and epochs.

Figure 9:
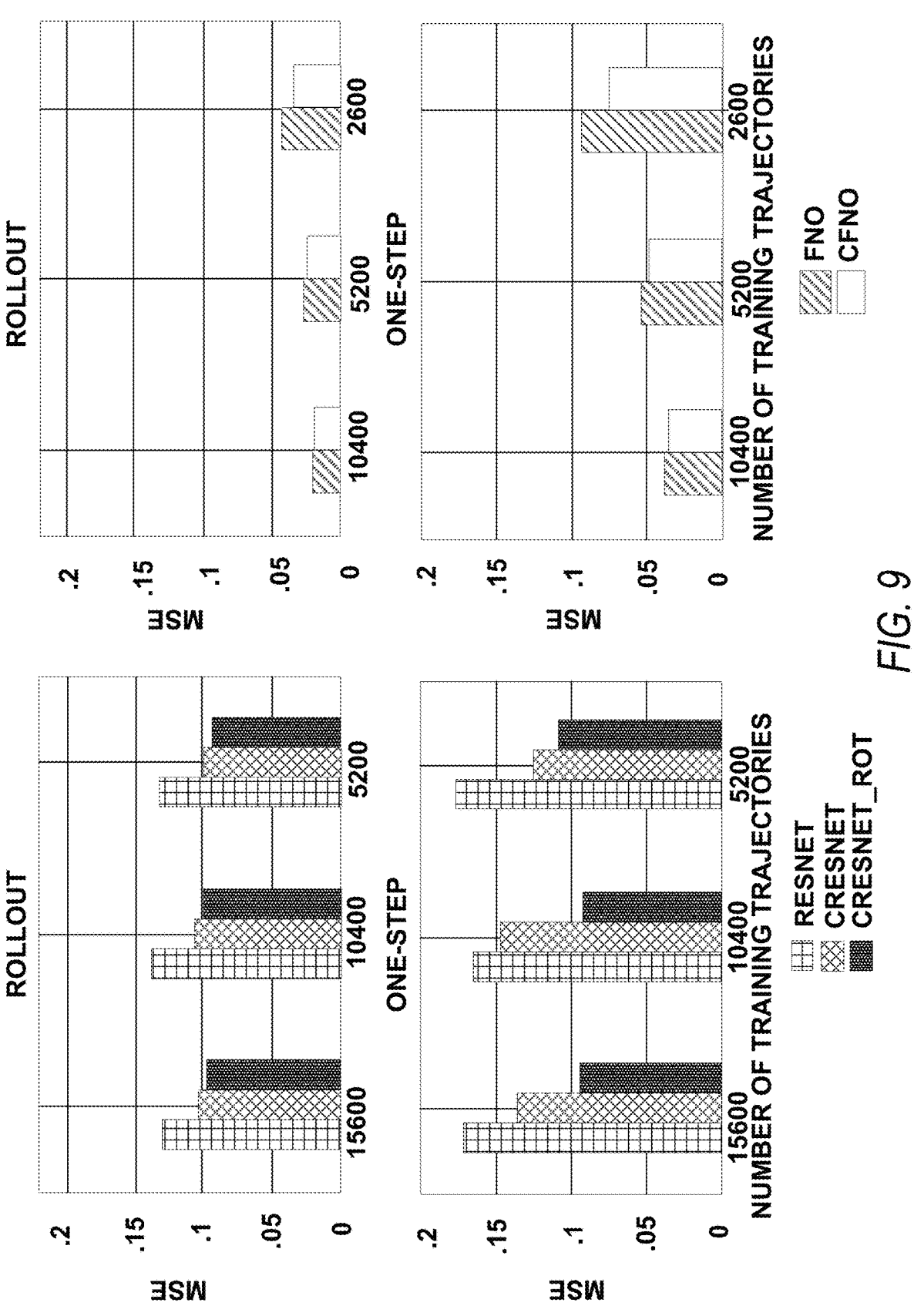
FIG. 9 illustrates, by way of example, graphs of one-step loss and rollout loss for a variety of NN PDE modeling architectures implementing Navier-Stokes equation.

The incompressible Navier-Stokes equations are built upon momentum and mass conservation of fluids expressed for the velocity flow field v:

$$\frac{\partial v}{\partial t} = -v \cdot \nabla v + \mu \nabla^2 v - \nabla p + f, \ \nabla \cdot v = 0 \qquad (17)$$

where $v \cdot \nabla v$ is the convection, $\mu \nabla^2 v$ the viscosity, $\nabla p$ the internal pressure and $f$ an external force. In addition to the velocity field $v(x)$, a scalar field $s(x)$ can be introduced that represents a scalar quantity, for example, smoke, that is being transported via the velocity field. The scalar field is advected by the vector field, as the vector field changes, the scalar field is transported along with it, whereas the scalar field influences the vector field only via the external force term $f$. This is called a weak coupling between vector and scalar fields. The 2D Navier-Stokes equation can be modeled using ΦFlow, obtaining data on a grid with spatial resolution of 128×128 ($\Delta x$=0.25, $\Delta y$=0.25), and temporal resolution of $\Delta t$=1.5 s. Results for one-step loss and rollout loss on the test set are shown in FIG. 9.

Convection is the rate of change of a vector field along a vector field (in this case along itself), viscosity is the diffusion of a vector field, i.e. the net movement form higher valued regions to lower concentration regions, $\mu$ is the viscosity coefficient. The incompressibility constrained yields mass conservation via $\nabla \cdot v = 0$. For example, v might ResNet with layers replaced with rotational Clifford neural layers) improve upon the ResNet baseline. Additionally, observe that rollout losses are also lower for the two Clifford based architectures, which can be attributed to better and more stable models that do not overfit to one-step predictions so easily. Lastly, while in principle CResNet and CResNet$_{rot}$ based architectures are equally flexible, CResNet$_{rot}$ in general performs better than CResNet in this scenario. For FNO and respective Clifford Fourier based (CFNO) architectures, the loss is in general much lower than for ResNet based architectures. CFNO architectures improve upon FNO architectures for all dataset sizes, and for one-step as well as rollout losses.

TABLE 1

Model comparison on four different metrics for neural PDE surrogates which are trained on Navier-Stokes training datasets of varying size. Error bars are obtained by running experiments with three different initial seeds.

| Method | Trajs. | SMSE | | | |
| --- | --- | --- | --- | --- | --- |
| | | scalar | vector | onestep | rollout |
| ResNet | | 0.00300 ± 0.00003 | 0.01255 ± 0.00008 | 0.01553 ± 0.00011 | 0.11362 ± 0.00048 |
| CResNet | 2080 | 0.00566 ± 0.00062 | 0.02252 ± 0.00284 | 0.02806 ± 0.00346 | 0.15844 ± 0.02677 |
| CResNet$_{rot}$ | | 0.00376 ± 0.00028 | 0.01413 ± 0.00116 | 0.01780 ± 0.00143 | 0.10681 ± 0.00476 |
| ResNet | | 0.00341 ± 0.00028 | 0.01431 ± 0.00102 | 0.01767 ± 0.00138 | 0.13234 ± 0.00020 |
| CResNet | 5200 | 0.00265 ± 0.00004 | 0.00988 ± 0.00024 | 0.01250 ± 0.00022 | 0.09975 ± 0.00060 |
| CResNet$_{rot}$ | | 0.00234 ± 0.00014 | 0.00857 ± 0.00066 | 0.01087 ± 0.00074 | 0.09427 ± 0.00071 |
| ResNet | | 0.00321 ± 0.00004 | 0.01337 ± 0.00044 | 0.01653 ± 0.00048 | 0.13802 ± 0.00223 |
| CResNet | 10400 | 0.00315 ± 0.00006 | 0.01162 ± 0.00019 | 0.01473 ± 0.00018 | 0.10671 ± 0.00246 |
| CResNet$_{rot}$ | | 0.00201 ± 0.00020 | 0.00719 ± 0.00074 | 0.00917 ± 0.00090 | 0.10005 ± 0.00229 |
| ResNet | | 0.00342 ± 0.00003 | 0.01379 ± 0.00079 | 0.01716 ± 0.00091 | 0.13030 ± 0.00379 |
| CResNet | 15600 | 0.00285 ± 0.00019 | 0.01076 ± 0.00051 | 0.01357 ± 0.00063 | 0.10372 ± 0.00269 |
| CResNet$_{rot}$ | | 0.00204 ± 0.00014 | 0.00736 ± 0.00069 | 0.00938 ± 0.00087 | 0.09799 ± 0.00139 |
| FNO | 2080 | 0.00318 ± 0.00021 | 0.00613 ± 0.00044 | 0.00931 ± 0.00064 | 0.04281 ± 0.00300 |
| CFNO | | 0.00266 ± 0.00002 | 0.00484 ± 0.00006 | 0.00749 ± 0.00008 | 0.03461 ± 0.00031 |
| FNO | 5200 | 0.00204 ± 0.00004 | 0.00332 ± 0.00011 | 0.00536 ± 0.00015 | 0.02684 ± 0.00067 |
| CFNO | | 0.00189 ± 0.00001 | 0.00293 ± 0.00002 | 0.00482 ± 0.00003 | 0.02430 ± 0.00012 |
| FNO | 10400 | 0.00156 ± 0.00003 | 0.00220 ± 0.00007 | 0.00375 ± 0.00010 | 0.02005 ± 0.00042 |
| CFNO | | 0.00148 ± 0.00001 | 0.00205 ± 0.00001 | 0.00353 ± 0.00002 | 0.01886 ± 0.00006 | represent velocity of air inside a room, and s might represent concentration of smoke. Similar to convection, advection is the transport of a scalar field along a vector field $$\frac{ds}{dt} = -v \cdot \nabla s.$$

The 2D Navier-Stokes equation can be implemented using ΦFlow. Solutions are propagated in which one can solve for the pressure field and subtract its spatial gradients afterwards. Semi-Lagrangian advection (convection) is used for v, and McCormack advection for s. Additionally, express the external buoyancy force $f$ in Equation 17 as force acting on the scalar field. Solutions are obtained using Boussinesq approximation, which ignores density differences except where they appear in terms multiplied by the acceleration due to gravity. The essence of the Boussinesq approximation is that the difference in inertia is negligible but gravity is sufficiently strong to make the specific weight appreciably different between the two fluids.

FIG. 9 illustrates, by way of example, graphs of one-step loss and rollout loss for a variety of NN PDE modeling architectures implementing Navier-Stokes equation. For ResNet-like architectures, observe that both CResNet (Clifford ResNet or ResNet with layers replaced with Clifford neural layers) and CResNetrot (rotational Clifford ResNet or The shallow water equations describe a thin layer of fluid of constant density in hydrostatic balance, bounded from below by the bottom topography and from above by a free surface. For example, the deep water propagation of a tsunami can be described by the shallow water equations. For simplified weather modeling, the shallow water equations express the velocity in x-direction, or zonal velocity $v_x$, the velocity in the y-direction, or meridional velocity $v_y$, the acceleration due to gravity g, and the vertical displacement of free surface $\eta(x,y)$, which subsequently is used to derive pressure fields:

$$\frac{\partial v_x}{\partial t} + v_x \frac{\partial v_x}{\partial x} + v_y \frac{\partial v_x}{\partial y} + \frac{g \partial \eta}{\partial x} = 0 \tag{18}$$

$$\frac{\partial v_y}{\partial t} + v_x \frac{\partial v_y}{\partial x} + v_y \frac{\partial v_y}{\partial y} + \frac{g \partial \eta}{\partial y} = 0$$

$$\frac{\partial \eta}{\partial t} + \frac{\partial}{\partial x}[(\eta + h)v_x] + \frac{\partial}{\partial y}[(\eta + h)v_y] = 0$$

Figure 10:
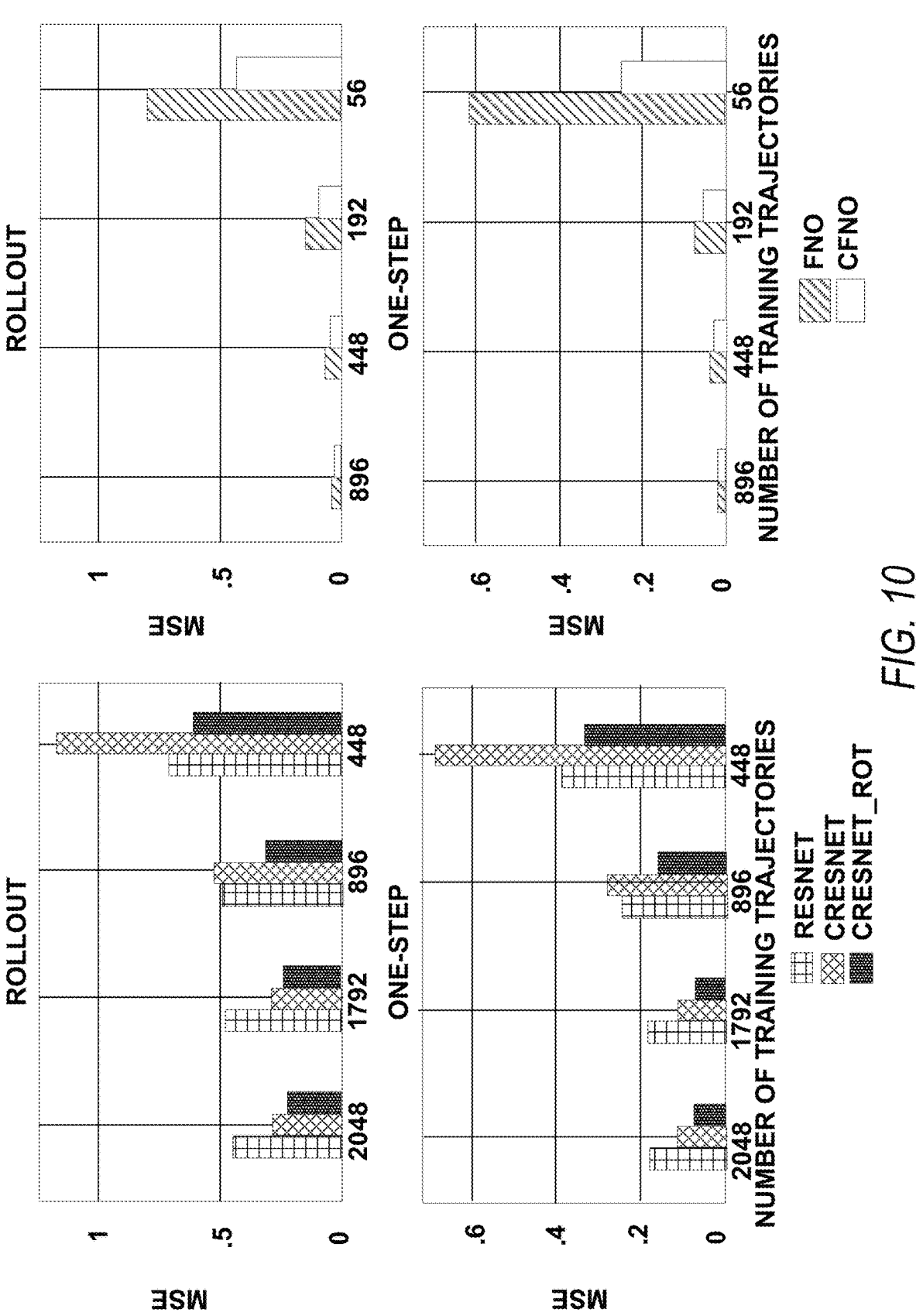
FIG. 10 illustrates, by way of example, MSE loss for one-step and rollout for various NN architectures implementing Navier-Stokes equations.

The topography of the earth is modeled by h(x, y). The relation between vector and scalar components is relatively strong (strong coupling between vector and scalar fields due to the 3-coupled PDEs of Equation 18). One can modify the implementation in SpeedyWeather.jl, obtaining data on a grid with spatial resolution of 192×96 ($\Delta x$=1.875°, $\Delta y=3.75°$), and temporal resolution of $\Delta t=6$ h. Results for one-step loss and rollout loss on the test set are shown in FIG. 10. The equation is solved on a closed domain with periodic boundary conditions. The simulation was rolled out for 20 days and sample every 6 h. Here 20 days is of course not the actual simulation time but rather the simulated time. Trajectories contain scalar pressure and wind vector fields at 84 different time points.

SpeedyWeather.jl combines the shallow water equations with spherical harmonics for the linear terms and Gaussian grid for the non-linear terms with the appropriate spectral transforms. It internally uses a leapfrog time scheme with a Robert and William's filter to dampen the computational modes and achieve 3rd order accuracy. SpeedyWeather.jl is based on the atmospheric general circulation model SPEEDY in Fortran.

FIG. 10 illustrates, by way of example, MSE loss for one-step and rollout for various NN architectures imple-menting Navier-Stokes equations. Observe similar perfor-mance properties as for the Navier-Stokes experiments discussed previously. However, performance differences between baseline and Clifford architectures are even more pronounced, which can be attributed to the stronger coupling of the scalar and the vector fields. For ResNet-like archi-tectures, CResNet and CResNet$_{rot}$ improve upon the ResNet baseline, rollout losses are much lower for the two Clifford based architectures, and CResNet$_{rot}$ based architectures in general perform better than CResNet based ones. For Fou-rier based architectures, the loss is in general much lower than for ResNet based architectures (a training set size of 56 trajectories yields similar (C)FNO test set performance than a training set size of 896 trajectories for ResNet based architectures). CFNO architectures improve upon FNO architectures for all dataset sizes, and for one-step as well as rollout losses, which is especially pronounced for low num-ber of training trajectories.

TABLE 2

Model comparison on four different metrics for neural PDE surrogates which are trained on the shallow water equations training datasets of varying size. Results are obtained by using a two timestep history input. Error bars are obtained by running experiments with three different initial seeds.

| | | SMSE | | | |
|---|---|---|---|---|---|
| Method | Trajs. | scalar | vector | onestep | rollout |
| ResNet | | 0.0240 ± 0.0002 | 0.0421 ± 0.0010 | 0.0661 ± 0.0011 | 1.1195 ± 0.0197 |
| CResNet | 192 | 0.0617 ± 0.0016 | 0.0823 ± 0.0027 | 0.1440 ± 0.0042 | 2.0423 ± 0.0494 |
| CResNet$_{rot}$ | | 0.0319 ± 0.0003 | 0.0576 ± 0.0005 | 0.0894 ± 0.0007 | 1.4756 ± 0.0044 |
| ResNet | | 0.0140 ± 0.0003 | 0.0245 ± 0.0007 | 0.0385 ± 0.0010 | 0.7083 ± 0.0119 |
| CResNet | 448 | 0.0238 ± 0.0007 | 0.0448 ± 0.0023 | 0.0685 ± 0.0030 | 1.1727 ± 0.0483 |
| CResNet$_{rot}$ | | 0.0114 ± 0.0001 | 0.0221 ± 0.0001 | 0.0335 ± 0.0002 | 0.6127 ± 0.0018 |
| ResNet | | 0.0086 ± 0.0000 | 0.0156 ± 0.0003 | 0.0242 ± 0.0003 | 0.4904 ± 0.0080 |
| CResNet | 896 | 0.0095 ± 0.0000 | 0.0183 ± 0.0004 | 0.0278 ± 0.0006 | 0.5247 ± 0.0101 |
| CResNet$_{rot}$ | | 0.0055 ± 0.0000 | 0.0106 ± 0.0001 | 0.0161 ± 0.0001 | 0.3096 ± 0.0010 |
| ResNet | | 0.0061 ± 0.0002 | 0.0123 ± 0.0009 | 0.0184 ± 0.0010 | 0.4780 ± 0.0062 |
| CResNet | 1792 | 0.0039 ± 0.0000 | 0.0071 ± 0.0000 | 0.0111 ± 0.0001 | 0.2842 ± 0.0067 |
| CResNet$_{rot}$ | | 0.0025 ± 0.0000 | 0.0044 ± 0.0000 | 0.0069 ± 0.0000 | 0.2370 ± 0.0000 |
| ResNet | | 0.0060 ± 0.0002 | 0.0121 ± 0.0003 | 0.0181 ± 0.0005 | 0.4480 ± 0.0058 |
| CResNet | 2048 | 0.0039 ± 0.0001 | 0.0072 ± 0.0002 | 0.0111 ± 0.0003 | 0.2816 ± 0.0065 |
| CResNet$_{rot}$ | | 0.0028 ± 0.0005 | 0.0480 ± 0.0006 | 0.0075 ± 0.0011 | 0.2164 ± 0.0070 |
| FNO | 56 | 0.0271 ± 0.0016 | 0.0345 ± 0.0007 | 0.0616 ± 0.0022 | 0.8032 ± 0.0043 |
| CFNO | | 0.0071 ± 0.0003 | 0.0177 ± 0.0004 | 0.0250 ± 0.0007 | 0.4323 ± 0.0046 |
| FNO | 192 | 0.0021 ± 0.0002 | 0.0057 ± 0.0001 | 0.0077 ± 0.0003 | 0.1444 ± 0.0026 |
| CFNO | | 0.0012 ± 0.0000 | 0.0040 ± 0.0001 | 0.0053 ± 0.0001 | 0.0941 ± 0.0021 |
| FNO | 448 | 0.0007 ± 0.0001 | 0.0026 ± 0.0000 | 0.0034 ± 0.0001 | 0.0651 ± 0.0014 |
| CFNO | | 0.0005 ± 0.0000 | 0.0020 ± 0.0000 | 0.0026 ± 0.0001 | 0.0455 ± 0.0009 |
| FNO | 896 | 0.0004 ± 0.0000 | 0.0016 ± 0.0000 | 0.0020 ± 0.0001 | 0.0404 ± 0.0005 |
| CFNO | | 0.0003 ± 0.0000 | 0.0013 ± 0.0000 | 0.0017 ± 0.0001 | 0.0315 ± 0.0004 |

TABLE 3

Model comparison on four different metrics for neural PDE surrogates which are trained on the shallow water equations training datasets of varying size. Results are obtained by using a four timestep history input. Error bars are obtained by running experiments with three different initial seeds.

| | | SMSE | | | |
|---|---|---|---|---|---|
| Method | Trajs. | scalar | vector | onestep | rollout |
| FNO | 56 | 0.0276 ± 0.0017 | 0.0388 ± 0.0023 | 0.0663 ± 0.0038 | 0.6821 ± 0.0379 |
| CFNO | | 0.0093 ± 0.0003 | 0.0252 ± 0.0005 | 0.0345 ± 0.0009 | 0.4357 ± 0.0056 |
| FNO | 192 | 0.0033 ± 0.0007 | 0.0069 ± 0.0009 | 0.0102 ± 0.0015 | 0.1612 ± 0.0057 |
| CFNO | | 0.0015 ± 0.0001 | 0.0050 ± 0.0003 | 0.0065 ± 0.0003 | 0.1023 ± 0.0026 |
| FNO | 448 | 0.0009 ± 0.0001 | 0.0023 ± 0.0002 | 0.0032 ± 0.0003 | 0.0687 ± 0.0023 |
| CFNO | | 0.0010 ± 0.0006 | 0.0039 ± 0.0027 | 0.0050 ± 0.0033 | 0.1156 ± 0.0913 |

TABLE 3-continued

Model comparison on four different metrics for neural PDE surrogates which
are trained on the shallow water equations training datasets of varying size.
Results are obtained by using a four timestep history input. Error bars are
obtained by running experiments with three different initial seeds.

| | | SMSE | | | |
|---|---|---|---|---|---|
| Method | Trajs. | scalar | vector | onestep | rollout |
| FNO | 896 | $0.0004 \pm 0.0001$ | $0.0012 \pm 0.0001$ | $0.0016 \pm 0.0001$ | $0.0436 \pm 0.0011$ |
| CFNO | | $0.0003 \pm 0.0000$ | $0.0012 \pm 0.0001$ | $0.0015 \pm 0.0001$ | $0.0353 \pm 0.0010$ |

Electromagnetic simulations play a critical role in understanding light-matter interaction and designing optical elements. Neural networks have been already successful applied in inverse-designing photonic structures.

Maxwell's equations in matter are:

$$\nabla \cdot D = \rho \qquad \text{Gauss's law}$$

$$\nabla \cdot B = 0 \qquad \text{Gauss's law for magnetism}$$

$$\nabla \times E = -\partial B / \partial t \quad \text{Faraday's law of induction}$$

$$\nabla \times H = \frac{\partial D}{\partial t} + j \quad \text{Ampère's circuital law}$$

In isotropic media, Maxwell's equations in matter propagate solutions of the displacement field D, which is related to the electrical field via $D = \epsilon_0 \epsilon_R E$, where $\epsilon_0$ is the permittivity of free space and $\epsilon_r$ is the permittivity of the medium, and the magnetization field H, which is related to the magnetic field B via $H = \mu_0 \mu_r B$, where $\mu_0$ is the permeability of free space and $\mu_r$ is the permeability of the medium. Lastly, j is the electric current density and $\rho$ the total electric charge density.

The electromagnetic field F has the intriguing property that the electric field E and the magnetic field B are dual pairs, thus $F = E + Bi_3$. There is a strong coupling between the electric field and its dual (bivector) magnetic field. This duality also holds for D and H. The solution of Maxwell's equation in matter can be propagated using a finite-difference time-domain method, where the discretized Maxwell's equations are solved in a leapfrog manner. First, the electric field vector components in a volume of space are solved at a given instant in time. Second, the magnetic field vector components in the same spatial volume are solved at the next instant in time.

For the experiment, randomly place 18 (6 in the x-y plane, 6 in the x-z plane, 6 in the y-z plane) different light sources outside a cube which emit light with different amplitudes and different phase shifts, causing the resulting D and H fields to interfere with each other. Data was obtained on a grid with spatial resolution of 32×32×32 ($\Delta x = \Delta y = \Delta z = 5 \ 10^{-7}$ m), and temporal resolution of $\Delta t = 50$ s. FNO-based architectures were tested along with respective Clifford counterparts (CFNO). Note that Maxwell's equations are in general relatively simple due to the wave-like propagation of electric and magnetic fields. It is however a good playground to demonstrate the inductive bias advantages of Clifford based architectures, which leverage the vector-bivector character of electric and magnetic field components. Results for one-step loss and rollout loss on the test set are shown in FIG. 11.

The two fields are strongly coupled, e.g. temporal changes of electric fields induce magnetic fields and vice versa. Probably the most illustrative co-occurrence of electric and magnetic fields is when describing the propagation of light. In standard vector algebra, E is a vector while B is a pseudovector, i.e. the two kinds of fields are distinguished by a difference in sign under space inversion. $F = E + Bi_3$ naturally decomposes the electromagnetic field into vector and bivector parts via the pseudoscalar $i_3$. For example, for the base component $B_x e_1$ of B it holds that $B_x e_1 i_3 = B_x e_1 e_2 e_3 = B_x e_2 e_3$, which is a bivector and the dual to the base component $e_1$ of E. Geometric algebra reveals that a pseudovector is nothing else than a bivector represented by its dual, so the magnetic field B in $F = E + Bi_3$ is fully represented by the complete bivector $Bi_3$, rather than B alone. Consequently, the multivector representing F consists of three vectors (the electric field components) and three bivectors $e_1 i_3 = e_2 e_3$, $e_2 i_3 = e_3 e_1$, $e_3 i_3 = e_1 e_2$ (the magnetic field components multiplied by $i_3$).

Figure 11:
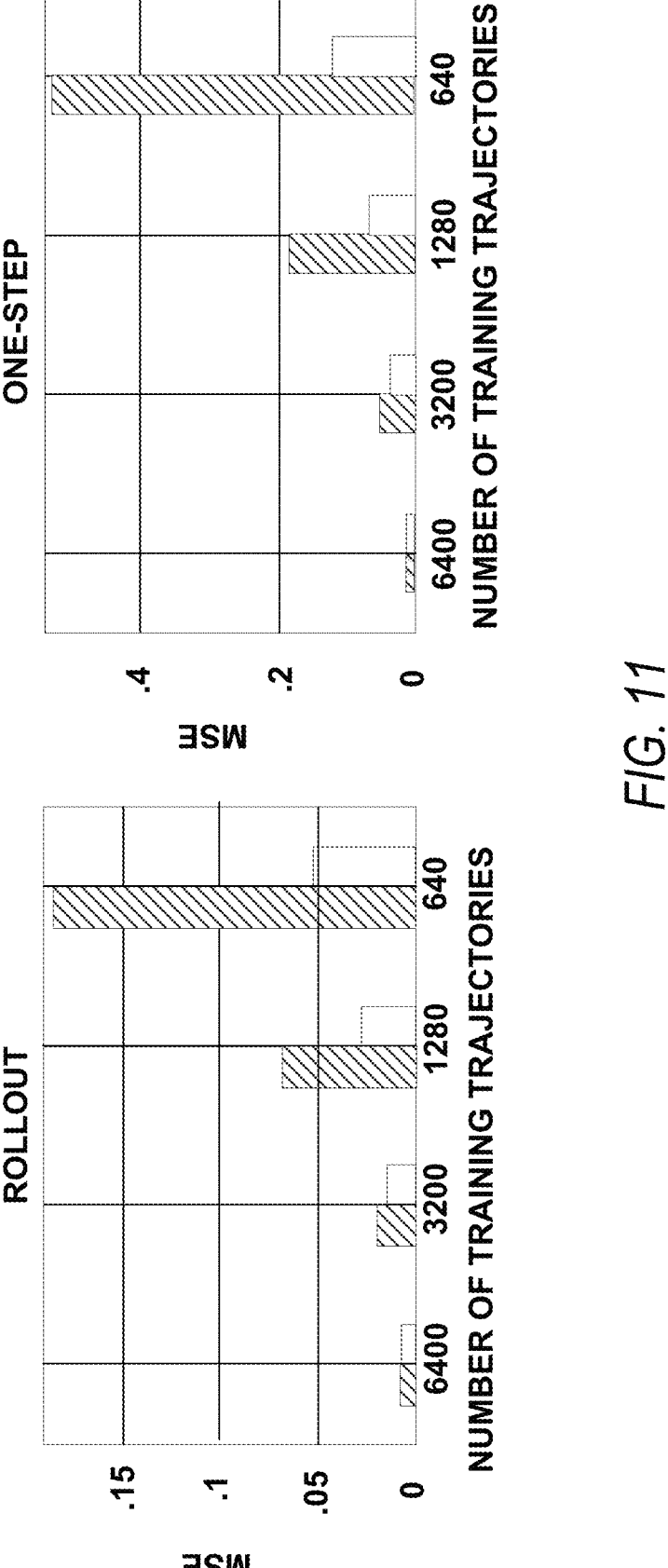
FIG. 11 illustrates, by way of example, graphs of MSE versus number of training trajectories for FNO and CFNO NN architectures for Maxwell's Equations simulations.

FIG. 11 illustrates, by way of example, graphs of MSE versus number of training trajectories for FNO and CFNO NN architectures for Maxwell's Equations simulations. Note that CFNO architectures improve upon FNO architectures, especially for low numbers of trajectories. Results demonstrate the much stronger inductive bias of Clifford based 3-dimensional Fourier layers, and their general applicability to 3-dimensional problems, which are structurally even more interesting than 2-dimensional ones.

TABLE 4

Model comparison on four different metrics for neural PDE surrogates which
are trained on the Maxwell equations training datasets of varying size.
Results are obtained by using a two timestep history input. Error bars
are obtained by running experiments with three different initial seeds.

| | | SMSE | | | |
|---|---|---|---|---|---|
| Method | Trajs. | D | H | onestep | rollout |
| FNO | 640 | $0.0030 \pm 0.0006$ | $0.00233 \pm 0.00050$ | $0.0054 \pm 0.0011$ | $0.0186 \pm 0.0083$ |
| CFNO | | $0.0006 \pm 0.0001$ | $0.00072 \pm 0.00010$ | $0.0013 \pm 0.0002$ | $0.0054 \pm 0.0023$ |
| FNO | 1280 | $0.0010 \pm 0.0002$ | $0.00085 \pm 0.00020$ | $0.0019 \pm 0.0004$ | $0.0068 \pm 0.0036$ |
| CFNO | | $0.0003 \pm 0.0001$ | $0.00041 \pm 0.00010$ | $0.0007 \pm 0.0002$ | $0.0029 \pm 0.0016$ |

TABLE 4-continued

Model comparison on four different metrics for neural PDE surrogates which
are trained on the Maxwell equations training datasets of varying size.
Results are obtained by using a two timestep history input. Error bars
are obtained by running experiments with three different initial seeds.

| | | SMSE | | | |
|---|---|---|---|---|---|
| Method | Trajs. | D | H | onestep | rollout |
| FNO | 3200 | 0.0003 ± 0.0001 | 0.00025 ± 0.00010 | 0.0005 ± 0.0001 | 0.0020 ± 0.0011 |
| CFNO | | 0.0002 ± 0.0000 | 0.00020 ± 0.00010 | 0.0004 ± 0.0001 | 0.0015 ± 0.0009 |
| FNO | 6400 | 0.0001 ± 0.0000 | 0.00009 ± 0.00000 | 0.0002 ± 0.0000 | 0.0008 ± 0.0004 |
| CFNO | | 0.0001 ± 0.0000 | 0.00009 ± 0.00000 | 0.0002 ± 0.0000 | 0.0007 ± 0.0004 |

Embodiments introduce Clifford neural layers. A convolutional Clifford layer, Fourier Clifford layer, rotational Clifford convolutional layer, and an equivariant Clifford layer are provided. The Clifford neural layers handle the various scalar (e.g., charge density), vector (e.g. electric field), bivector (magnetic field) and higher order fields as proper geometric objects organized as multivectors. This geometric algebra perspective, provide for a natural generalizable convolution and Fourier transformation to their Clifford counterparts. Embodiments provide an elegant and natural rule to design new neural network layers. The multivector viewpoint of the Clifford neural layers led to better representation of the relationship between different fields and their individual components, allowing for significant outperformance of equivalent standard architectures for neural PDE surrogates. The performance gap increased with less data availability across all settings, denoting better inductive bias of the Clifford neural layers.

One limitation is the current speed of Fast Fourier Transform (FFT) operations on machine learning accelerators like graphics processing units (GPUs). While an active area of research, current available versions of cuFFT kernels wrapped in PyTorch are not yet as heavily optimized, especially for the gradient pass. Furthermore, FFTs of real-valued signals are Hermitian-symmetric, and outputs contain only positive frequencies below the Nyquist frequency. Such real-valued FFTs are used for Fourier Neural Operator (FNO) layers. Clifford Fourier layers on the other hand use complex-valued FFT operations where the backward pass is approximately twice as slow. For similar parameter counts, inference times of FNO and CFNO networks are similar. The speed of geometric convolution layers was already investigated. On the one hand, Clifford convolutions are more parameter efficient than the standard convolutions since they share parameters among filters, on the other hand, the net number of operations is larger for the same number of parameters resulting in increased training times by a factor of about 2. Finally, from a PDE point of view, the presented approaches to obtain PDE surrogates are limited since the NN have to be retrained for different equation parameters or e.g., different $\Delta t$. Custom multivector GPU kernels can overcome many of the speed issues as the compute density of Clifford operations is much higher which is better for hardware accelerators Besides PDE modeling, weather predictions, electro-magnetic field interactions, and fluid dynamics, applications of multivector representations and Clifford layers can be found in neural implicit representations.

A closer look at $Cl_{2,0}(R)$, $Cl_{0,2}(R)$, and $Cl_{3,0}(R)$ is now provided. A vector space over a field F is a set V together with two binary operations that satisfy the axioms for vector addition and scalar multiplication. The axioms of addition ensure that if two elements of V get added together, another element of V is provided as a result. The elements of F are called scalars. Examples of a field F are the real numbers R and the complex numbers C. Although it is common practice to refer to the elements of a general vector space V as vectors, to avoid confusion this discussion reserves the usage of this term to the more specific case of elements of $R^n$. As shown below, general vector spaces can consist of more complicated, higher-order objects than scalars, vectors or matrices.

An algebra over a field consists of a vector space V over a field F together with an additional bilinear law of composition of elements of the vector space, $V \times V \rightarrow V$, that is, if a and b are any two elements of V, then ab: $V \times V \rightarrow V$ is an element of V, satisfying a pair of distribution laws: $a(\lambda_1 b + \lambda_2 c) = \lambda_1 ab + \lambda_2 ac$ and $(\lambda_1 a + \lambda_2 b)c = \lambda_1 ac + \lambda_2 bc$ for $\lambda_1, \lambda_2 \in F$ and a, b, c∈ V. Note that general vector spaces do not have bilinear operations defined on their elements.

Focus is now on Clifford algebras over R. A real Clifford algebra is generated by the n-dimensional vector space $R^n$ through a set of relations that hold for the basis elements of the vector space $R^n$. Denote the basis elements of $R^n$ with $e_1, \ldots, e_n$, and without loss of generality choose these basis elements to be mutually orthonormal. Take two non-negative integers p and q, such that p+q=n, then a real Clifford algebra $Cl_{p,q}(R)$ with the "signature" (p, q), is generated through the following relations that define how the bilinear product of the algebra operates on the basis elements of $R^n$:

$$e_i^2 = +1 \text{ for } 1 \le i \le p, \tag{19}$$

$$e_j^2 = -1 \text{ for } p < j \le p+q, \tag{20}$$

$$e_i e_j = -e_j e_i \text{ for } i \neq j. \tag{21}$$

Through these relations one can generate a basis for the vector space of the Clifford algebra, which we is denoted by G. Equations 19 and 20 show that the product between two vectors yields a scalar. According to the aforementioned definition of an algebra over a field, a Clifford algebra with a vector space G is equipped with a bilinear product $G \times G \rightarrow G$, that combines two elements from the vector space G and yields another element of the same space G. Therefore, both scalars and vectors are elements of the vector space G. Equation 21 shows that besides scalar and vector elements, higher order elements including a combination of two basis elements, such as $e_i e_j$ and $e_j e_i$, are also part of the vector space G. By combining Equations 19, 20, 21 one can create even higher order elements such as $e_i e_j e_k$ for i≠j≠k, or $e_1 e_2 \ldots e_{p+q}$, which all must be part of the vector space G.

To determine the basis elements that span the vector space G of $\text{Cl}_{p,q}(\text{R})$, note that elements $e_{\sigma(1)}e_{\sigma(2)} \cdots e_{\sigma(k)}$ and $e_1 e_2 \cdots e_k$ are related through a simple scalar multiplicative factor of plus or minus one, depending on the sign of the permutation $\sigma$. Therefore, it suffices to consider the unordered combinations of basis elements of $\text{R}^n$: the basis of the vector space G is given by $\{1, e_1, e_2, \ldots e_{p+q}, e_1 e_2, \ldots, e_{p+q-1}e_{p+q}, \ldots, e_1 e_2 \cdots e_{p+q}\}$.

In summary, two different vector spaces have been introduced. First, the vector space $\text{R}^n$ which generates the Clifford algebra, and second the vector space G, which is the vector space spanned by the basis elements of the Clifford algebra $\text{Cl}_{p,q}(\text{R})$. Convention is to denote the vector space of a real Clifford algebra with a superscript n of the dimension of the generating vector space, yielding $\text{G}^n$ for a generating vector space $\text{R}^n$. Note that the dimension of the vector space $\text{G}^n$ is $2^n = 2^{p+q}$.

Common examples of low-dimensional Clifford algebras are: (i) $\text{Cl}_{0,0}(\text{R})$ which is a one-dimensional algebra that is spanned by the vector $\{1\}$ and is therefore isomorphic to R, the field of real numbers; (ii) $\text{Cl}_{0,1}(\text{R})$ which is a two-dimensional algebra with vector space $\text{G}^1$ spanned by $\{1, e_1\}$ where the basis vector $e_1$ squares to $-1$, and is therefore isomorphic to C, the field of complex numbers; (iii) $\text{Cl}_{0,2}(\text{R})$ which is a 4-dimensional algebra with vector space $\text{G}^2$ spanned by $\{1, e_1, e_2, e_1 e_2\}$, where $e_1, e_2, e_1 e_2$ all square to $-1$ and anti-commute. Thus, $\text{Cl}_{0,2}(\text{R})$ is isomorphic to the quaternions H.

The grade of a Clifford algebra basis element is the dimension of the subspace it represents. For example, the basis elements $\{1, e_1, e_2, e_1 e_2\}$ of the Clifford algebras $\text{Cl}_{0,2}(\text{R})$ and $\text{Cl}_{2,0}(\text{R})$ have the grades $\{0, 1, 1, 2\}$. Using the concept of grades, one can divide the vector spaces of Clifford algebras into linear subspaces made up of elements of each grade. The grade subspace of smallest dimension is $M_0$, the subspace of all scalars (elements with 0 basis vectors). Elements of $M_1$ are called vectors, elements of $M_2$ are bivectors, and so on. In general, the vector space $\text{G}^{p+q}$ of a Clifford algebra $\text{Cl}_{p,q}$ can be written as the direct sum of all of these subspaces:

$$G^{p+q} = M_0 \oplus M_1 \oplus \ldots \oplus M_{p+q}. \tag{22}$$

The elements of a Clifford algebra are called multivectors, containing elements of subspaces (e.g., scalars, vectors, bivectors, trivectors, etc.). The basis element with the highest grade is called the pseudoscalar, which in $\text{R}^2$ corresponds to the bivector $e_1 e_2$, and in $\text{R}^3$ to the trivector $e_1 e_2 e_3$. The pseudoscalar is often denoted with the symbol $i_{p+q}$.

Using Equations 19, 20, 21, it is seen how basis elements of the vector space $\text{G}^{p+q}$ of the Clifford algebra are formed using basis elements of the generating vector space V. Note how elements of $\text{G}^{p+q}$ are combined, in other words, how multivectors are bilinearly operated on. The geometric product is the bilinear operation on multivectors in Clifford algebras. For arbitrary multivectors a, b, $c \in \text{G}^{p+q}$, and scalar $\lambda$ the geometric product has the following properties:

$$ab \in G^{p+q} \quad \text{closure} \tag{23}$$

$$(ab)c = a(bc) \quad \text{associativity} \tag{24}$$

$$\lambda a = a\lambda \quad \text{commutative scalar multiplication} \tag{25}$$

$$a(b+c) = ab + ac \quad \text{distributive over addition} \tag{26}$$

The geometric product is in general non-commutative, i.e. $ab \neq ba$. The geometric product is made up of two things: an inner product (that captures similarity) and exterior (wedge) product that captures difference.

The dual $a^*$ of a multivector a is defined as:

$$a^* = a i_{p+q}, \tag{27}$$

where $i_{p+q}$ represents the respective pseudoscalar of the Clifford algebra.

This definition allows one to relate different multivectors to each other, which is a useful property when defining Clifford Fourier transforms. For example, for Clifford algebras in $\text{R}^2$ the dual of a scalar is a bivector, and for the Clifford algebra $\text{R}^3$ the dual of a scalar is a trivector.

The Clifford algebra $\text{Cl}_{0,1}(\text{R})$ is a two-dimensional algebra with vector space $\text{G}^1$ spanned by $\{1, e_1\}$, and where the basis vector $e_1$ squares to $-1$. $\text{Cl}_{0,1}(\text{R})$ is thus algebra-isomorphic to C, the field of complex numbers. This becomes more obvious by identifying that the basis element with the highest grade, i.e. $e_1$, as the pseudoscalar $i_1$ which is the imaginary part of the complex numbers. The geometric product between two multivectors $a = a_0 + a_1 e_1$ and $b = b_0 + b_1 e_1$ is therefore also isomorphic to the product of two complex numbers:

$$ab = \tag{28}$$

$$a_0 b_0 + a_0 b_1 e_1 + a_1 b_0 e_1 + a_1 b_1 e_1 e_1 = (a_0 b_0 - a_1 b_1) + (a_0 b_1 + a_1 b_0)e_1$$

The Clifford algebra $\text{Cl}_{2,0}(\text{R})$ is a 4-dimensional algebra with vector space $\text{G}^2$ spanned by the basis vectors $\{1, e_1, e_2, e_1 e_2\}$ where $e_1, e_2, e_1 e_2$ all square to $+1$. The geometric product of two multivectors $a = a_0 + a_1 e_1 + a_2 e_2 + a_{12} e_1 e_2$ and $b = b_0 + b_1 e_1 + b_2 e_2 + b_{12} e_1 e_2$ is defined as:

$$ab = a_0 b_0 + a_0 b_1 e_1 + a_0 b_2 e_2 + a_0 b_{12} e_1 e_2 + a_1 b_0 e_1 + a_1 b_1 e_1 e_1 + \tag{29}$$

$$a_1 b_2 e_1 e_2 + a_1 b_{12} e_1 e_1 e_2 + a_2 b_0 e_2 + a_2 b_1 e_2 e_1 + a_2 b_2 e_2 e_2 +$$

$$a_2 b_{12} e_2 e_1 e_2 + a_{12} b_0 e_1 e_2 + a_{12} b_1 e_1 e_2 e_1 + a_{12} b_2 e_1 e_2 e_2 + a_{12} b_{12} e_1 e_2 e_1 e_2.$$

Using the relations $e_1 e_1 = 1$, $e_2 e_2 = 1$, and $e_i e_j = -e_j e_i$, for $i \neq j \neq \{e_1, e_2\}$, from which it follows that $e_1 e_2 e_1 e_2 = -1$, and:

$$ab = a_0 b_0 + a_1 b_1 + a_2 b_2 - a_{12} b_{12} + (a_0 b_1 + a_1 b_0 - a_2 b_{12} + a_{12} b_2)e_1 + \tag{30}$$

$$(a_0 b_2 + a_1 b_{12} + a_2 b_0 - a_{12} b_1)e_2 + (a_0 b_{12} + a_1 b_2 - a_2 b_1 + a_{12} b_0)e_1 e_2.$$

A vector $x \in R^2 \subset G^2$ is identified with $x_1 e_1 + x_2 e_2 \in R^2 \subset G^2$. Clifford multiplication of two vectors x, $y \in R^2 \subset G^2$ yields the geometric product xy:

$$xy = \tag{31}$$

$$(x_1 e_1 + x_2 e_2)(y_1 e_1 + y_2 e_2) = \underbrace{x_1 y_1 e_1^2 + x_2 y_2 e_2^2}_{\text{inner product}\langle x,y\rangle} + \underbrace{x_1 y_2 e_1 e_2 + x_2 y_1 e_2 e_1}_{\text{outer/wedge product } x \wedge y}$$

The asymmetric quantity $x \wedge y = -y \wedge x$ is associated with the bivector, which can be interpreted as an oriented plane segment.

Equation 31 can be rewritten to express the (symmetric) inner product and the (anti-symmetric) outer product in terms of the geometric product:

$$x \wedge y = 1/2(xy - yx) \tag{32}$$

$$\langle x, y \rangle = 1/2(x + yx) \tag{33}$$

From the basis vectors of the vector space $G^2$ of the Clifford algebra $Cl_{2,0}(R)$, i.e. $\{1, e_1, e_2, e_1 e_2\}$, probably the most interesting is $e_1 e_2$. A closer look at the unit bivector $i_2 = e_1 e_2$ which is the plane spanned by $e_1$ and $e_2$ and determined by the geometric product is provided:

$$i_2 = e_1 e_2 = \underbrace{\langle e_1, e_2 \rangle}_{=0} + e_1 \wedge e_2 = -e_1 \wedge e_2 = -e_2 e_1 \tag{34}$$

where the inner product $\langle e_1, e_2 \rangle$ is zero due to the orthogonality of the base vectors. The bivector $i_2$, if squared yields $$i_2^2 = -1,$$

and thus $i_2$ represents a true geometric $\sqrt{-1}$. From Equation 34, it follows that $$e_2 = e_1 i_2 = -i_2 e_1 \tag{35}$$

$$e_1 = i_2 e_2 = -e_2 i_2.$$

The dual of a multivector $a \in G^2$ is defined via the bivector as $i_2 a$. Thus, the dual of a scalar is a bivector and the dual of a vector is again a vector. The dual pairs of the base vectors are $1 \leftrightarrow e_1 e_2$ and $e_1 \leftrightarrow e_2$. These dual pairs allow one to write an arbitrary multivector a as $$a = a_0 + a_1 e_1 + a_2 e_2 + a_{12} e_{12}, \tag{36}$$

$$a = 1\underbrace{(a_0 + a_{12} i_2)}_{\text{spinor part}} + e_1\underbrace{(a_1 + a_2 i_2)}_{\text{vector part}}$$

which can be regarded as two complex-valued parts: the spinor part, which commutes with $i_2$ and the vector part, which anti-commutes with $i_2$.

The Clifford algebra $Cl_{0,2}(R)$ is a 4-dimensional algebra with vector space $G^2$ spanned by the basis vectors $\{1, e_1, e_2, e_1 e_2\}$ where $e_1, e_2, e_1 e_2$ all square to $-1$. The Clifford algebra $Cl_{0,2}(R)$ is algebra-isomorphic to the quaternions H, which are commonly written as $a + b\hat{i} + c\hat{j} + d\hat{k}$, where the (imaginary) base elements $\hat{i}, \hat{j}, \hat{k}$ fulfill the relations:

$$\hat{i}^2 = \hat{j}^2 = -1 \tag{37}$$

$$\hat{i}\hat{j} = \hat{k}$$

$$\hat{j}\hat{i} = -\hat{k}$$

$$\hat{k}^2 = \hat{i}\hat{j}\hat{i}\hat{j} = -\hat{i}\hat{j}\hat{j}\hat{i} = \hat{i}\hat{i} = -1.$$

Quaternions also form a 4-dimensional algebra spanned by $\{1, \hat{i}, \hat{j}, \hat{k}\}$, where $\hat{i}, \hat{j}, \hat{k}$ all square to $-1$. The basis element 1 is often called the scalar part, and the basis elements $\hat{i}, \hat{j}, \hat{k}$ are called the vector part of a quaternion. The geometric product of two multivectors in $Cl_{0,2}(R)$ is shown in Equations (29) and (30).

The Clifford algebra is an 8-dimensional algebra with vector space $G^3$ spanned by the basis vectors $\{1, e_1, e_2, e_3, e_1 e_2, e_1 e_3, e_2 e_3, e_1 e_2 e_3\}$ i.e. one scalar, three vectors $\{e_1, e_2, e_3\}$, three bivectors $\{e_1 e_2, e_1 e_3, e_2 e_3\}$, and one trivector $e_1 e_2 e_3$. The trivector is the pseudoscalar $i_3$ of the algebra. The geometric product of two multivectors is defined analogously to the geometric product of $Cl_{2,0}(R)$, following the associative and bilinear multiplication of multivectors follows:

$$e_i^2 = 1 \quad \text{for } i = 1, 2, 3 \tag{38}$$

$$e_i e_j = -e_i e_j \quad \text{for } i, j = 1, 2, 3, i \neq j \tag{39}$$

Using Definition 2, the dual pairs of $Cl_{3,0}$ are:

$$1 \leftrightarrow e_1 e_2 e_3 = i_3 \tag{40}$$

$$e_1 \leftrightarrow e_2 e_3 \tag{41}$$

$$e_2 \leftrightarrow e_3 e_1 \tag{42}$$

$$e_3 \leftrightarrow e_1 e_2. \tag{43}$$

The geometric product for $Cl_{3,0}(R)$ is defined analogously to the geometric product of $Cl2,0(R)$ via:

$$ab = a_0 b_0 + a_0 b_1 e_1 + a_0 b_2 e_2 + a_0 b_3 e_3 + a_0 b_{12} e_1 e_2 + a_0 b_{13} e_1 e_3 + \tag{44}$$
$$a_0 b_{23} e_2 e_3 + a_0 b_{123} e_1 e_2 e_3 + a_1 b_0 e_1 + a_1 b_1 e_1 e_1 + a_1 b_2 e_1 e_2 +$$
$$a_1 b_3 e_1 e_3 + a_1 b_{12} e_1 e_1 e_2 + a_1 b_{13} e_1 e_1 e_3 + a_1 b_{23} e_1 e_2 e_3 +$$
$$a_1 b_{123} e_1 e_1 e_2 e_3 + a_2 b_0 e_2 + a_2 b_1 e_2 e_1 + a_2 b_2 e_2 e_2 + a_2 b_3 e_2 e_3 +$$
$$a_2 b_{12} e_2 e_1 e_2 + a_2 b_{13} e_2 e_1 e_3 e_2 + a_2 b_{23} e_2 e_2 e_3 - a_2 b_{123} e_2 e_2 e_1 e_3 + a_3 b_0 e_3 +$$
$$a_3 b_1 e_3 e_1 + a_3 b_2 e_3 e_2 + a_3 b_3 e_3 e_3 + a_3 b_{12} e_1 e_3 e_2 - a_3 b_{13} e_1 e_3 e_3 -$$
$$a_3 b_{23} e_2 e_3 e_3 + a_3 b_{123} e_1 e_2 e_3 e_3 + a_{12} b_0 e_1 e_2 - a_{12} b_1 e_2 e_1 e_1 +$$
$$a_{12} b_2 e_1 e_2 e_2 + a_{12} b_3 e_1 e_2 e_3 + a_{12} b_{12} e_1 e_2 e_1 e_2 - a_{12} b_{13} e_1 e_1 e_2 e_3 +$$
$$a_{12} b_{23} e_2 e_2 e_1 e_3 + a_{12} b_{123} e_1 e_2 e_1 e_2 e_3 + a_{13} b_0 e_1 e_3 - a_{13} b_1 e_3 e_1 e_1 +$$
$$a_{13} b_2 e_1 e_3 e_2 + a_{13} b_3 e_1 e_3 e_3 - a_{13} b_{12} e_1 e_1 e_1 e_3 e_2 + a_{13} b_{13} e_1 e_3 e_1 e_3 -$$
$$a_{13} b_{23} e_1 e_2 e_3 e_3 + a_{13} b_{123} e_1 e_3 e_1 e_2 e_3 + a_{23} b_0 e_2 e_3 + a_{23} b_1 e_1 e_3 e_2 +$$
$$a_{23} b_2 e_2 e_3 e_2 + a_{23} b_3 e_2 e_3 e_3 + a_{23} b_{12} e_2 e_3 e_1 e_2 - a_{23} b_{13} e_2 e_1 e_3 e_3 +$$

-continued $$a_{23}b_{23}e_2e_3e_2e_3 + a_{23}b_{123}e_2e_3e_1e_2e_3 + a_{123}b_0e_1e_2e_3 + a_{123}b_1e_1e_2e_3e_1 -$$

$$a_{123}b_2e_1e_3e_1e_2 + a_{123}b_3e_1e_2e_3e_3 + a_{123}b_{12}e_1e_2e_2e_1e_2 +$$

$$a_{123}b_{13}e_1e_2e_3e_1e_3 + a_{123}b_{23}e_1e_2e_3e_2e_3 + a_{123}b_{123}e_1e_2e_3e_1e_2e_3$$

Where minus signs appear due to reordering of basis elements. Equation 44 simplifies to:

$$ab = a0b0 + a1b1 + a2b2 + \tag{45}$$

$$a3b3 - a12b12 - a13b13 - a23b23 - a123b123 +$$

$$(a0b1 + a1b0 - a2b12 - a3b13 + a12b2 + a13b3 - a23b123 - a123b23)$$

$$e1 + (a0b2 + a1b12 + a2b0 - a3b23 -$$

$$a12b1 + a13b123 + a23b3 + a123b13)e2 +$$

$$(a0b3 + a1b13 + a2b23 + a3b0 - a12b123 - a13b1 - a23b2 - a123b12)$$

$$e3 + (a0b12 + a1b2 - a2b1 + a3b123 +$$

$$a12b0 - a13b23 + a23b13 + a123b3)e1e2 +$$

$$(a0b13 + a1b3 - a2b123 - a3b1 + a12b23 + a13b0 - a23b12 - a123b2)$$

$$e1e3 + (a0b23 + a1b123 + a2b3 - a3b2 -$$

$$a12b13 - a13b12 + a23b0 + a123b1)e2e3 +$$

$$(a_0b_{123} + a_1b_{23} - a_2b_{13} + a_3b_{12} + a_{12}b_3 - a_{13}b_2 + a_{23}b_1 + a_{123}b_0)$$

$$e_1e_2e_3.$$

A derivation of the implementation of translation equivariant Clifford convolution layers for multivectors in $G^2$, multivectors of Clifford algebras generated by the 2-dimensional vector space $R^2$, is now provided. Refer to Equations (8)-(10) for details regarding a Clifford Convolution layer. Then an extension to Clifford algebras generated by the 3-dimensional vector space $R^3$ is described.

Let $f:Z^2 \to (G^2)^{cin}$ be a multivector feature map and let $w:Z^2 \to (G^2)^{Cin}$ be a multivector kernel, then $[[L_tf] \star w](x) = [L_t[f \star w]](x)$.

Proof.

$$[[L_tf] \star w](x) = \tag{46}$$

$$\sum_{y \in Z^2} \sum_{j=1}^{c_{in}} f(y-t)w(y-x) = \sum_{y \in Z^2} \sum_{j=1}^{c_{in}} f_0(y-t)w_0(y-x) +$$

$$f_1(y-t)w_1(y-x) + f_2(y-t)w_2(y-x) - f_{12}(y-t)w_{12}(y-x) +$$

$$(f_0(y-t)w_1(y-x) + f_1(y-t)w_0(y-x) - f_2(y-t)w_{12}(y-x) +$$

$$f_{12}(y-t)w_2(y-x))e_1 + (f_0(y-t)w_2(y-x) +$$

$$f_1(y-t)w_{12}(y-x) + f_2(y-t)w_0(y-x) - f_{12}(y-t)w_1(y-x))e_2 +$$

$$(f_0(y-t)w_{12}(y-x) + f_1(y-t)w_2(y-x) - f_2(f-t)w_1(y-x) +$$

$$f_{12}(y-t)w_0(y-x))e_1e_2 + f_0(y-t)w_{12}(y-x) +$$

$$f_1(y-t)w_2(y-x) - f_2(f-t)w_1(y-x) + f_{12}(y-t)w_0(y-x)$$

$$(\text{using } y \to y-t) = \sum_{y \in Z^2} \sum_{j=1}^{c_{in}} f_0(y)w_0(y-(x-t)) +$$

$$f_1(y)w_1(y-(x-t)) + f_2(y)w_2(y-(x-t)) - f_{12}(y)w_{12}(y-(x-t)) +$$

$$(f_0(y)w_1(y-(x-t)) + f_1(y)w_0(y-(x-t)) -$$

$$f_2(y)w_{12}(y-(x-t)) + f_{12}(y)w_2(y-(x-t)))e_1 +$$

$$(f_0(y)w_2(y-(x-t)) + f_1(y)w_{12}(y-(x-t)) + f_2(y)w_0(y-(x-t)) -$$

-continued $$f_{12}(y)w_1(y-(x-t)))e_2 + (f_0(y)w_{12}(y-(x-t)) + f_1(y)w_2(y-(x-t)) -$$

$$f_2(y)w_1(y-(x-t)) + f_{12}(y)w_0(y-(x-t)))e_1e_2 = [L_t[f \star w]](x).$$

Implementation of $Cl_{2,0}(R)$ layers is now discussed in more detail. One can implement a 2D Clifford CNN layer using Equation 30 where $$\{b_0, b_1, b_2, b_{12}\} \to \{w_0^{i,j}, w_1^{i,j}, w_2^{i,j}, w_{12}^{i,j}\}$$

correspond to 4 different kernels representing one 2D multivector kernel, i.e. 4 different convolution layers, and $$\{a_0, a_1, a_2, a_{12}\} \to \{f_0^j, f_1^j, f_2^j, f_{12}^j\}$$

correspond to the scalar, vector and bivector parts of the input multivector field. The channels of the different layers represent different stacks of scalars, vectors, and bivectors. All kernels have the same number of input and output channels (number of input and output multivectors), and thus the channels mixing occurs for the different terms of Equations 30, 45 individually. Lastly, usually not all parts of the multivectors are present in the input vector fields. This can easily be accounted for by just omitting the respective parts of Equations 30, 45. A similar reasoning applies to the output vector fields.

An alternative parameterization to the Clifford CNN layer introduced in Equation 9 can be realized by using the isomorphism of the Clifford algebra $Cl_{0,2}(R)$ to quaternions. This alternative parameterization takes advantage of the fact that a quaternion rotation can be realized by a matrix multiplication. Using the isomorphism, one can represent the feature maps $f^j$ and filters $w^{i,j}$ as quaternions:

$$f^j = f_0^j + f_1^j\hat{i} + f_2^j\hat{j} + f_3^j\hat{k} \text{ and } w^{i,j} = w_0^{i,j} + w_1^{i,j}\hat{i} + w_2^{i,j}\hat{j} + w_3^j\hat{k}.$$

Leveraging this quaternion representation, the alternative parameterization of a product between the feature map $f^j$ and $w^{i,j}$ can be realized. To be more precise, consider a composite operation that results in a scalar quantity and a quaternion rotation, where the latter acts on the vector part of the quaternion $f^j$ and only produces nonzero expansion coefficients for the vector part of the quaternion output. A quaternion rotation $w^{i,j}f^j(w^{i,j})^{-1}$ acts on the vector part $(\hat{i}, \hat{j}, \hat{k})$ of $f^j$, and can be algebraically manipulated into a vector-matrix operation $R^{i,j}f^j$, where $R^{i,j}: H \to H$ is built up from the elements of $w^{i,j}$. In other words, one can transform the vector part $(\hat{i}, \hat{j}, \hat{k})$ of $f^j \in H$ via a rotation matrix $R^{i,j}$ that is built from the scalar and vector part $(1, (\hat{i}, \hat{j}, \hat{k})$ of $w^{i,j} \in H$. Altogether, a rotational multivector filter $$\{w_{rot}^j\}_{i=1}^{c_{out}}:Z^2 \to (G^2)$$

acts on the feature map $f^j$ through a rotational transformation $$R^{i,j}\left(w_{rot0}^{i,j}, w_{rot1}^{i,j}, w_{rot2}^{i,j}, w_{rot12}^{i,j}\right) \qquad 5$$

acting on vector and bivector parts of the multivector feature map $f: Z^2 \to (G^2)^c$in, and an additional scalar response of the multivector filters:

$$\left[f \star w_{rot}^j\right](x) = \sum_{y \in Z^2} \sum_{j=1}^{c_{in}} f^j(y) w_{rot}^{i,j}(y-x) =$$

$$\sum_{y \in Z^2} \sum_{j=1}^{c_{in}} \underbrace{\left[f^j(y) w_{rot}^{i,j}(y-x)\right]_0}_{\text{scalar output}} + R^{i,j}(y-x). \quad 15$$

$$\begin{pmatrix} f_1^j(y) \\ f_2^j(y) \\ f_{12}^j(y) \end{pmatrix}$$

$$20$$

Where $\left[f^j(y) w_{rot}^{i,j}(y-x)\right]_0 = f_0^j w_{rot,0}^{i,j} - f_1^j w_{rot,1}^{i,j} - f_2^j w_{rot,2}^{i,j} - f_{12}^j w_{rot,12}^{i,j}$, which is the scalar output of Equation 30. The rotational matrix $R^{i,j}(y-x)$ in written form is:

$$R^{i,j} = \begin{pmatrix} 1 - 2\left((\hat{w}_{rot,2}^{i,j})^2 + (\hat{w}_{rot,12}^{i,j})^2\right) & 2\left(\hat{w}_{rot,1}^{i,j}\hat{w}_{rot,2}^{i,j} - \hat{w}_{rot,0}^{i,j}\hat{w}_{rot,12}^{i,j}\right) & 2\left(\hat{w}_{rot,1}^{i,j}\hat{w}_{rot,12}^{i,j} - \hat{w}_{rot,0}^{i,j}\hat{w}_{rot,2}^{i,j}\right) \\ 2\left(\hat{w}_{rot,1}^{i,j}\hat{w}_{rot,2}^{i,j} - \hat{w}_{rot,0}^{i,j}\hat{w}_{rot,12}^{i,j}\right) & 1 - 2\left((\hat{w}_{rot,1}^{i,j})^2 + (\hat{w}_{rot,12}^{i,j})^2\right) & 2\left(\hat{w}_{rot,2}^{i,j}\hat{w}_{rot,12}^{i,j} - \hat{w}_{rot,0}^{i,j}\hat{w}_{rot,1}^{i,j}\right) \\ 2\left(\hat{w}_{rot,1}^{i,j}\hat{w}_{rot,12}^{i,j} - \hat{w}_{rot,0}^{i,j}\hat{w}_{rot,2}^{i,j}\right) & 2\left(\hat{w}_{rot,2}^{i,j}\hat{w}_{rot,12}^{i,j} - \hat{w}_{rot,0}^{i,j}\hat{w}_{rot,12}^{i,j}\right) & 1 - 2\left((\hat{w}_{rot,1}^{i,j})^2 + (\hat{w}_{rot,2}^{i,j})^2\right) \end{pmatrix}$$

Where $\hat{w}_{rot}^{i,j}(y-x) = \hat{w}_{rot,0}^{i,j}(y-x) + \hat{w}_{rot,1}^{i,j}(y-x)e_i + \hat{w}_{rot,2}^{i,j}(y-x)e_2 + \hat{w}_{rot,12}^{i,j}(y-x)e_{12}$ is the normalized filter with $$\left\|\hat{w}_{rot}^{i,j}\right\| = 1.$$

The dependency $(y-x)$ is omitted inside the rotation matrix $R^{i,j}$ for clarity.

Analogous to the 2-dimensional case, one can implement a 3D Clifford CNN layer using Equation 45, where $\{b_0, b_1, b_2, b_{12}, b_{13}, b_{23}, b_{123}\}$ correspond to 8 different kernels representing one 3D multivector kernel, i.e. 8 different convolution layers, and $\{a_0, a_1, a_2, a_{12}, a_{13}, a_{23}, a_{123}\}$ correspond to the scalar, vector, bivector, and trivector parts of the input multivector field.

Different normalization schemes have been proposed to stabilize and accelerate training DNNs. Their standard formulations apply only to real values. Simply translating and scaling multivectors such that their mean is 0 and their variance is 1 is insufficient because it does not ensure equal variance across all components.

A batch normalization formulation can be applied to complex values. Build on the same principles can provide an appropriate batch normalization scheme for multivectors. For 2D multivectors of the form $a = a_0 + a_1 e_1 + a_2 e_2 + a_{12} e_1 e_2$, one can formulate the problem of batch normalization as that of whitening 4D vectors:

$$\tilde{a} = (V)^{-\frac{1}{2}}(a - E[a]) \qquad (47)$$

where the covariance matrix V is $$V = \begin{pmatrix} V_{a_0 a_0} & V_{a_0 a_1} & V_{a_0 a_2} & V_{a_0 a_{12}} \\ V_{a_1 a_0} & V_{a_1 a_1} & V_{a_1 a_2} & V_{a_1 a_{12}} \\ V_{a_2 a_0} & V_{a_2 a_1} & V_{a_2 a_2} & V_{a_2 a_{12}} \\ V_{a_{12} a_0} & V_{a_{12} a_1} & V_{a_{12} a_2} & V_{a_{12} a_{12}} \end{pmatrix}$$

The shift parameter $\beta$ is a multivector parameter with 4 learnable components and the scaling parameter y is 4×4 positive semi-definite matrix. The multivector batch normalization is defined as:

$$BN(a) = \gamma a + \beta \qquad (48)$$

When the batch sizes are small, it can be more appropriate to use Group Normalization or Layer Normalization. These can be derived with appropriate application of Equation 47 along appropriate tensor dimensions.

Similar to Clifford normalization, quaternion initialization schemes can be adapted to Clifford layers. Effectively, tighter bounds are required for the uniform distribution form which Clifford weights are sampled. However, despite intensive studies no performance gains were observed over default PyTorch initialization schemes for 2-dimensional experiments. However, 3-dimensional implementations necessitate much smaller initialization values (e.g., about a factor of about ⅛).

Clifford convolutions satisfy the property of equivariance under translation of the multivector inputs, as shown. However, the current definition of Clifford convolutions is not equivariant under multivector rotations or reflections. Here, a general kernel constraint is derived which allows building generalized Clifford convolutions which are equivariant with respect to rotations or reflections of the multivectors. That is, equivariance of a Clifford layer under rotations and reflections (i.e. orthogonal transformations) is proved if the multivector kernel multivector filters $$\{w^i\}_{i=1}^{c_{out}}: Z^2 \to (G)^c in$$

satisfies the constraint:

$$w^{i,j}(Tx) = Tw^{i,j}(x),$$

for $0 \le j < c_{in}$. First define an orthogonal transformation on a multivector by, $$Tf = \pm u f u^\dagger, u^\dagger u = 1 \qquad (49)$$

where u and $f$ are multivectors which are multiplied using the geometric product. The minus sign is picked up from reflections but not by rotations, i.e. it depends on the parity of the transformation. This construction is called a "versor" product. The above construction makes it immediately clear that $T(fg)=(Tf)(Tg)$. $Tx$ means an orthogonal transformation of a Euclidean vector (which can in principle also be defined using versors). To show equivariance, prove for multivectors $f: Z^2 \to (G)^c$in and a set of $c_{out}$ multivector filters $$\{w^i\}_{i=1}^{c_{out}} : Z^2 \to (G)^c in$$

that:

$$f'(Tx) = Tf(x), \text{ And} \tag{50}$$

$$w^i(Tx) = Tw^i(x), \text{ Equations 50, 51 yield:} \tag{51}$$

$$\Rightarrow [f * w^i]'(Tx) = T[f * w^i](x) \tag{52}$$

That is, if the input multivector field transforms as a multivector, and the kernel satisfies the stated equivariance constraint, then the output multivector field also transforms properly as a multivector. Note that T might act differently on the various components (scalars, vectors, pseudoscalars, pseudovectors) under rotations and/or reflections.

Now, $$[f \star w^i]'(Tx) = \sum_{y \in Z^2} \sum_{j=1}^{c_{in}} f'^j(y) w^{i,j}(y - Tx)$$

$$= \sum_{y \in Z^2} \sum_{j=1}^{c_{in}} f'^j(y) w^{i,j}(T(T^{-1}y - x))$$

$$= \sum_{Ty' \in Z^2} \sum_{j=1}^{c_{in}} f'^j(Ty') w^{i,j}(T(y' - x)), \ y' = T^{-1}y,$$

$$= \sum_{y' \in Z^2} \sum_{j=1}^{c_{in}} f'^j(Ty') w^{i,j}(T(y' - x))$$

$$= \sum_{y' \in Z^2} \sum_{j=1}^{c_{in}} Tf^j(y') Tw^{i,j}(y' - x)$$

$$= \sum_{y' \in Z^2} \sum_{j=1}^{c_{in}} Tf^j(y') Tw^{i,j}(y' - x)$$

$$= T \sum_{y' \in Z^2} \sum_{j=1}^{c_{in}} (f^j(y') w^{i,j}(y' - x))$$

$$= T[f \star w^i](x)$$

where in the fourth line variables are transformed as $y \to y'$, in the fifth line the invariance of the summation "measure" under T is used, in the sixth line the transformation property of $f$ and equivariance for $w^i$ is used, in the seventh line the property of multivectors is used, and in the eighth line linearity of T is used.

An implementation of Clifford Fourier layers for multivectors in $G^2$ and $G^3$, i.e. multivectors of Clifford algebras generated by the 2-dimensional vector space $R^2$ and the 3-dimensional vector space $R^3$ is now derived. In arbitrary dimension n, the Fourier transform $\hat{f}(\xi) = \mathcal{F}\{f\}(\xi)$ for a continuous n-dimensional complex-valued signal $f(x) = f(x_1, \ldots, x_n):R^n \to C$ is defined as:

$$\hat{f}(\xi) = \mathcal{F}\{f\}(\xi) = 1 / (2\pi)^{\frac{n}{2}} \int_{R^n} f(x) e^{-2\pi i \langle x, \xi \rangle} dx, \ \forall \ \xi \in R^n \tag{53}$$

provided that the integral exists, where x and $\xi$ are n-dimensional vectors and $\langle x, \xi \rangle$ is the contraction of x and $\xi$. Usually, $\langle x, \xi \rangle$ is the inner product, and $\xi$ is an element of the dual vector space $R^{n\star}$. The inversion theorem states the back-transform from the frequency domain into the spatial domain:

$$f(x) = \mathcal{F}^{-1}\{\mathcal{F}\{f\}\}(x) = 1 / (2\pi)^{\frac{n}{2}} \int_{R^n} \hat{f}(\xi) e^{2\pi i \langle x, \xi \rangle} d\xi, \ \forall \ x \in R^n \tag{54}$$

One can rewrite the Fourier transform of Equation 53 in coordinates:

$$\hat{f}(\xi_1, \ldots, \xi_n) = \mathcal{F}\{f\}(\xi_1, \ldots, \xi_n) = \tag{55}$$

$$1 / (2\pi)^{\frac{n}{2}} \int_{R^n} f(x_1, \ldots, x_n) e^{-2\pi i (x_1 \xi_1 + \ldots + x_n \xi_n)} dx_1 \ldots dx_n$$

The discrete counterpart of Equation 53 transforms an n-dimensional complex signal $f(x) = f(x_1, \ldots, x_n):R^n \to C$ at $M_1 \times \ldots \times M_n$ grid points into its complex Fourier modes via:

$$\hat{f}(\xi_1, \ldots, \xi_n) = \mathcal{F}\{f\}(\xi_1, \ldots, \xi_n) = \tag{56}$$

$$\sum_{m_1=0}^{M_1} \ldots \sum_{m_n=0}^{M_n} f(m_1, \ldots, m_n) \cdot e^{-2\pi i \cdot (m_1 \xi_1 / M_1 + \ldots + m_n \xi_n / M_n)}$$

where $(\xi_1, \ldots, \xi_n) \in Z_{M1} \ldots Z_{Mn}$. Fast Fourier transforms (FFTs) immensely accelerate the computation of the transformations of Equation 56 by factorizing the discrete Fourier transform matrix into a product of sparse (mostly zero) factors.

Analogous to Equation 53, the Clifford Fourier transform and the respective inverse transform for multivector valued functions $f(x):R^2 \to G^2$ and vectors x, $\xi \in R^2$ are defined as:

$$f(\xi) = \mathcal{F}(f)(\xi) = 1 / (2\omega) \int_{R^n} f(x) e^{-2\pi i_2 \langle x, \xi \rangle}, \ dx \forall \ \xi \in R^2 \tag{67}$$

$$f(x) = \mathcal{F}^{-1}\{\mathcal{F}\{f\}\}(x) = 1 / (2\pi) \int_{R^n} \hat{f}(\xi) e^{2\pi i_2 \langle x, \xi \rangle} d\xi, \ \forall \ x \in R^2 \tag{68}$$

provided that the integrals exist. The differences to Equations 53 and 54 are that $f(x)$ and $\hat{f}(\xi)$ represent multivector fields in the spatial and the frequency domain, respectively, and that the pseudoscalar $i2=e1e2$ is used in the exponent. Inserting the definition of multivector fields, one can rewrite Equation 57 as Equation 14.

The discretized versions of the spinor/vector part $(\hat{f}_{s/v})$ reads analogously to Equation 56:

$$\hat{f}_{s/v}(\xi_1, \xi_2) = \mathcal{F}\{f_{s/v}\}(\xi_1, \xi_2) = \tag{60}$$

$$\sum_{m_1=0}^{M_1} \ldots \sum_{m_n=0}^{M_n} f_{s/v}(m_1, m_2) \cdot e^{-2\pi i \cdot (m_1 \xi_1 / M_1 + m_2 \xi_2 / M_2)}$$

where again $(\xi_1, \xi_2) \in Z_{M1} \times Z_{Mn}$. Similar to Fourier Neural Operators (FNOs) where weight tensors are applied point-wise in the Fourier space, one can apply multivector weight tensors $$W \in \left(G^2\right)^{c_{in} \times c_{out} \times (\xi_1^{max} \times \xi_2^{max})}$$

point-wise. Fourier modes above cut-off frequencies $$(\xi_1^{max}, \xi_2^{max})$$

are set to zero. In doing so, one modifies the Clifford Fourier modes $$\hat{f}(\xi) = F\{f\}(\xi) = \hat{f}_0(\xi) + \hat{f}_1(\xi)e_1 + \hat{f}_2(\xi)e_2 + \hat{f}_{12}(\xi)e_{12} \quad (61)$$

via the geometric product. The Clifford Fourier modes follow naturally when combining spinor and vector parts of Equation 59. Analogously to FNOs, higher order modes are cut off. Finally, the residual connections used in FNO layers is replaced by a multivector weight matrix realized as Clifford convolution, ideally a $Cl_{2,0}(R)$ convolution layer.

What follows is proof of the 2D Clifford convolution theorem for multivector valued filters applied from the right, such that filter operations are consistent with Clifford convolution layers. First, it is shown that the Clifford kernel commutes with the spinor and anti-commutes with the vector part of multivectors. Write the product $ae^{i2s}$ for every scalar $s \in R$ and multivector $a \in G^2$ as $$ae^{i2s} = a(\cos(s) + i_2\sin(s)) \quad (62)$$

For the basis of the spinor part, note $1i_2 = i_2 1$, and for the basis of the vector part $e_1 i_2 = e_1 e_1 e_2 = -e_1 e_2 e_1 = -i_2 e_1$. Thus, the Fourier kernel $$e^{-2\pi i 2\langle x, \xi \rangle}$$

commutes with the spinor part, and anti-commutes with the vector part of a. What follows is a proof of the convolution theorem for the commuting spinor and the anti-commuting vector part of a.

Let the field $f:R^2 \to G^2$ be multivector valued, the filter $k_s:R^2 \to G^2$ be spinor valued, and the filter $k_v:R^2 \to G^2$ be vector valued, and let $\mathcal{F}\{f\}$, $\mathcal{F}\{k_s\}$, $\mathcal{F}\{k_v\}$ exist, then $$\mathcal{F}\{f \star k_s\}(\xi) = \mathcal{F}\{f\}(\xi) \cdot \mathcal{F}^\dagger\{k_s\}(\xi), \quad (63)$$

$$\mathcal{F}\{f \star k_v\}(\xi) = \mathcal{F}\{f\}(\xi) \cdot \mathcal{F}\{k_v\}(\xi),$$

where $\mathcal{F}^\dagger\{k_s\}(\xi) = \mathcal{F}\{k_s\}(-\xi)$ and $\mathcal{F}\{k_v\}(\zeta) = \mathcal{F}\{k_v\}(-\xi)$.

Proof: $F\{f \star k_s\}(\xi) = 1/(2\pi)^2 \int_{R^2}\left[\int_{R^2} f(y)k_s(y-x)dy\right]e^{-2\pi i 2\langle x, \xi \rangle}dx =$ $$1/(2\pi)^2 \int_{R^2} f(y)\left[\int_{R^2} k_s(y-x)e^{-2\pi i 2\langle y-x, \xi \rangle}dx\right]dy =$$

-continued $$1/(2\pi)^2 \int_{R^2} f(y)[\underbrace{\int_{R^2} k_2(y-x)e^{-2\pi i 2\langle x, \xi \rangle}dx}_{F^\dagger\{k_s\}(\xi)e^{-2\pi i 2\langle y, \xi \rangle} = e^{-2\pi i 2\langle y, \xi \rangle}F^\dagger\{k_s\}(\xi)}]dy =$$

$$1/(2\pi)\left[\int_{R^2} f(y)e^{-2\pi i 2\langle y, \xi \rangle}dy\right]\mathcal{F}^\dagger\{k_s\}(\xi) = \mathcal{F}\{f\}(\xi) \cdot F^\dagger\{k_s\}(\xi)$$

$$\mathcal{F}\{f \star k_v\}(\xi) = 1/(2\pi)^2 \int_{R^2}\left[\int_{R^2} f(y)k_v(y-x)dy\right]e^{-2\pi i 2\langle x, \xi \rangle}dx = \quad (64)$$

$$1/(2\pi)^2 \int_{R^2} f(y)\left[\int_{R^2} k_v(y-x)e^{-2\pi i 2\langle y-x, \xi \rangle}dx\right]dy =$$

$$1/(2\pi)^2 \int_{R^2} f(y)[\underbrace{\int_{R^2} k_v(y-x)e^{-2\pi i 2\langle x, \xi \rangle}dx}_{F^\dagger\{k_v\}(\xi)e^{-2\pi i 2\langle y, \xi \rangle} = e^{-2\pi i 2\langle y, \xi \rangle}F^\dagger\{k_v\}(\xi)}]dy =$$

$$1/(2\pi)\left[\int_{R^2} f(y)e^{-2\pi i 2\langle y, \xi \rangle}dy\right]\mathcal{F}\{k_v\}(\xi) = \mathcal{F}\{f\}(\xi) \cdot \mathcal{F}\{k_v\}(\xi)$$

Analogous to Equation 53, the Clifford Fourier transform and the respective inverse transform for multivector valued functions $f:R^3 \to G^3$ and vectors x, $\xi \in R^3$ are defined as:

$$\hat{f}(\xi) = \mathcal{F}\{f\}(\xi) = 1/(2\pi)^{3/2}\int_{R^3} f(x)e^{-2\pi i_3 \langle x, \xi \rangle}dx, \forall \xi \in R^3 \quad (65)$$

$$\hat{f}(\xi) = \mathcal{F}^{-1}\{\mathcal{F}\{f\}\}(x) = 1/(2\pi)^{3/2}\int_{R^3} \hat{f}(x)e^{2\pi i_3 \langle x, \xi \rangle}d\xi, \forall x \in R^3 \quad (66)$$

provided that the integrals exist. A multivector valued function $f:R^3 \to G^3$, $$f = f_0 + f_1e_1 + f_2e_2 + f_3e_3 + f_{12}e_{12} + f_{13}e_{13} + f_{23}e_{23} + f_{123}e_{123} \quad (67)$$

can be expressed via the pseudoscalar $i_3 = e_1e_2e_3$ as:

$$f = (f_0 + f_{123}i_3)1 + (f_1 + f_{23}i_3)e_1 + (f_2 + f_{31}i_3)e_2 + (f_3 + f_{12}i_3)e_3, \quad (68)$$

One can obtain a 3-dimensional Clifford Fourier transform by applying four standard Fourier transforms for the four dual pairs $f_0 = f_0(x) + f_{123}(x)i_3$, $f_1 = f_1(x) + f_{23}(x)i_3$, $f_2 = f_2(x) + f_{31}(x)i_3$, and $f_3 = f_3(x) + f_{12}(x)i_3$, which all can be treated as a complex-valued signal $f_0$, $f_1$, $f_2$, $f_3:R^3 \to C$. Consequently, $f(x)$ can be understood as an element of $C^4$. The 3D Clifford Fourier transform is the linear combination of four classical Fourier transforms:

$$\mathcal{F}\{f\}(\xi) = 1/(2\pi)^{3/2}\int_{R^3} f(x)e^{-2\pi i_3 \langle x, \xi \rangle}dx = \quad (69)$$

$$1/(2\pi)^{\frac{3}{2}}\int_{R^3} [1(f_0(x) + f_{123}(x)i_3) + e_1(f_1(x) + f_{23}(x)i_3) +$$

$$e_2(f_2(x) + f_{31}(x)i_3) + e_3(f_3(x) + f_{12}(x)i_3)]e^{-2\pi i_3 \langle x, \xi \rangle}dx =$$

$$1/(2\pi)^{\frac{3}{2}}\int_{R^3} 1(f_0(x) + f_{123}(x)i_3)e^{-2\pi i_3 \langle x, \xi \rangle}dx +$$

$$1/(2\pi)^{\frac{3}{2}}\int_{R^3} e_1(f_1(x) + f_{23}(x)i_3)e^{-2\pi i_3 \langle x, \xi \rangle}dx +$$

$$1/(2\pi)^{\frac{3}{2}}\int_{R^3} e_2(f_2(x) + f_{31}(x)i_3)e^{-2\pi i_3 \langle x, \xi \rangle}dx +$$

-continued $$1\Big/(2\pi)^{\frac{3}{2}} \int_{R^3} e_3(f_3(x) + f_{12}(x)i_3)e^{-2\pi i_3\langle x,\xi\rangle} dx =$$

$$1[\mathcal{F}(f_0(x) + f_{123}(x)i_3)(\xi)] + e_1[\mathcal{F}(f_1(x) + f_{23}(x)i_3)] +$$

$$e_2[\mathcal{F}(f_2(x) + f_{31}(x)i_3)] + e_3[F(f_3(x) + f_{12}(x)i_3)]$$

Analogous to the 2-dimensional Clifford Fourier transform, one can apply multivector weight tensors $$W \in (G^2)^{c_{in} \times c_{out} \times (\xi_1^{max} \times \xi_2^{max} \times \xi_3^{max})}$$

point-wise. Fourier modes above cut-off frequencies $$(\xi_1^{max}, \xi_2^{max}, \xi_3^{max})$$

are set to zero. In doing so, one modifies the Clifford Fourier modes $$\hat{f}(\xi) = F\{f\}(\xi) = \hat{f}_0(\xi) + \hat{f}_1(\xi)e_1 + \hat{f}_2(\xi)e_2 + \tag{70}$$

$$\hat{f}_3(\xi)e_3 + \hat{f}_{12}(\xi)e_{12} + \hat{f}_{31}(\xi)e_{31} + \hat{f}_{23}(\xi)e_{23} + \hat{f}_{123}(\xi)e_{123}$$

via the geometric product. The Clifford Fourier modes follow naturally when combining the four parts of Equation 69. Finally, the residual connections used in FNO layers is replaced by a multivector weight matrix realized as Clifford convolution, such as a $Cl_{3,0}(R)$ convolution layer.

First, it is shown that the Clifford kernel commutes with the spinor and anti-commutes with the vector part of multivectors. Write the product $ae^{i_3 s}$ for every scalar $s \in R$ and multivector $a \in G^3$ as $$ae^{i_3 s} = a(\cos(s) + i_3\sin(s)) \tag{71}$$

In contrast to the 2-dimensional Clifford Fourier transform, now all four parts of the multivector of Equation 68 commute with $i_3$:

$$1i_3 = i_3 1 \tag{72}$$

$$e_1 i_3 = e_1 e_1 e_2 e_3 = -e_1 e_2 e_1 e_3 = e_1 e_2 e_3 e_1 = i_3 e_1$$

$$e_2 i_3 = e_2 e_1 e_2 e_3 = -e_1 e_2 e_2 e_3 = e_1 e_2 e_3 e_2 = i_3 e_2$$

$$e_3 i_3 = e_3 e_1 e_2 e_3 = -e_1 e_3 e_2 e_3 = e_1 e_2 e_3 e_3 = i_3 e_3.$$

Let the field $f:R^3 \to G^3$ be multivector valued, the filter $k_a:R^3 \to G^3$ be multivector valued, and let $\mathcal{F}\{f\}$, $\mathcal{F}\{k_a\}$ exist, then $$\mathcal{F}\{f \star k_a\}(\xi) = \mathcal{F}\{f\}(\xi) \cdot \mathcal{F}\{k_a\}(\xi) \text{ where } \mathcal{F}^\dagger\{k_a\}(\xi) = \mathcal{F}\{k_a\}(-\xi). \tag{73}$$

Proof: $F\{f \star k_a\}(\xi) = 1\Big/(2\pi)^3 \int_{R^3} \Big[\int_{R^3} f(y)k_a(y-x)dy\Big]e^{-2\pi i_3\langle x,\xi\rangle} dx =$ $$1\Big/(2\pi)^3 \int_{R^3} f(y)\Big[\int_{R^3} k_a(y-x)e^{-2\pi i_3\langle y-x,\xi\rangle} dx\Big]dy =$$

-continued $$1/(2\pi)^3 \int_{R^3} f(y)[\underbrace{\int_{R^3} k_a(y-x)e^{-2\pi i_3\langle x,\xi\rangle} dx}_{F^\dagger\{k_a\}(\xi)e^{-2\pi i_3\langle y,\xi\rangle} = e^{-2\pi i_3\langle y,\xi\rangle} F^\dagger\{k_a\}(\xi)}]dy =$$

$$1/(2\pi)^{3/2}\Big[\int_{R^3} f(y)e^{-2\pi i_3\langle y,\xi\rangle} dy\Big]\mathcal{F}^\dagger\{k_a\}(\xi) = \mathcal{F}\{f\}(\xi)\cdot F^\dagger\{k_a\}(\xi)$$

One can implement a 2D Clifford Fourier layer by applying two standard Fourier transforms on the dual pairs of Equation 14. These dual pairs can be treated as complex valued inputs. Similarly, one implement a 3D Clifford Fourier layer by applying four standard Fourier transforms on the dual pairs of, for example, $Cl_{3,0}$ Equations 40-Equation 43). Since Clifford convolution theorems hold both for the vector and the spinor parts and for the four dual pairs for $Cl_{2,0}$ and $Cl_{3,0}$, respectively, we multiply the modes in the Fourier space using the geometric product. Finally, we apply an inverse Fourier transformation and resemble the multivectors in the spatial domain.

FIG. 12 illustrates, by way of example, a diagram of an embodiment of a method 1200 for machine learning (ML) modeling of a multivector system that operates on a multivector object. The method 1200 as illustrated includes receiving, by an ML model, the multivector object as an input that represents a state of the multivector system, at operation 1220; and operating, by the ML model and using a Clifford layer that includes neurons that implement a multivector kernel, on the multivector input to generate a multivector output that represents the state of the multivector system responsive to the multivector input, at operation 1222. The multivector input represents a change in state (e.g., stimulus) in the multivector system.

The method 1200 can further include, wherein the Clifford layer is a Clifford Fourier layer, a Clifford convolution layer, or an equivariant Clifford convolution layer. The method 1200 can further include, wherein the Clifford layer is a Clifford Fourier Neural Operator (FNO) that includes a Clifford Fourier layer and a Clifford convolution layer. The method 1200 can further include, wherein the multivector system is an electromagnetic field or a dynamic fluid. The method 1200 can further include, wherein the Clifford layer is a Clifford convolution and the method further comprises constraining a kernel for a Clifford convolution layer such that the Clifford convolution layer is equivariant.

The method 1200 can further include, wherein the multivector object includes two or more of a scalar, a vector, a bi-vector, or a tri-vector. The method 1200 can further include, wherein the multivector object includes the vector. The method 1200 can further include, wherein the multivector object includes the bi-vector. The method 1200 can further include, wherein the multivector object includes the tri-vector.

Artificial Intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as object or condition recognition, device behavior modeling or the like. The ML model 102 or a portion thereof, such as the Clifford neural layer 108, can include or be implemented using one or more NNs.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights.

In some examples, initial weights may be randomly selected. Training data is fed into the NN, and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 13:
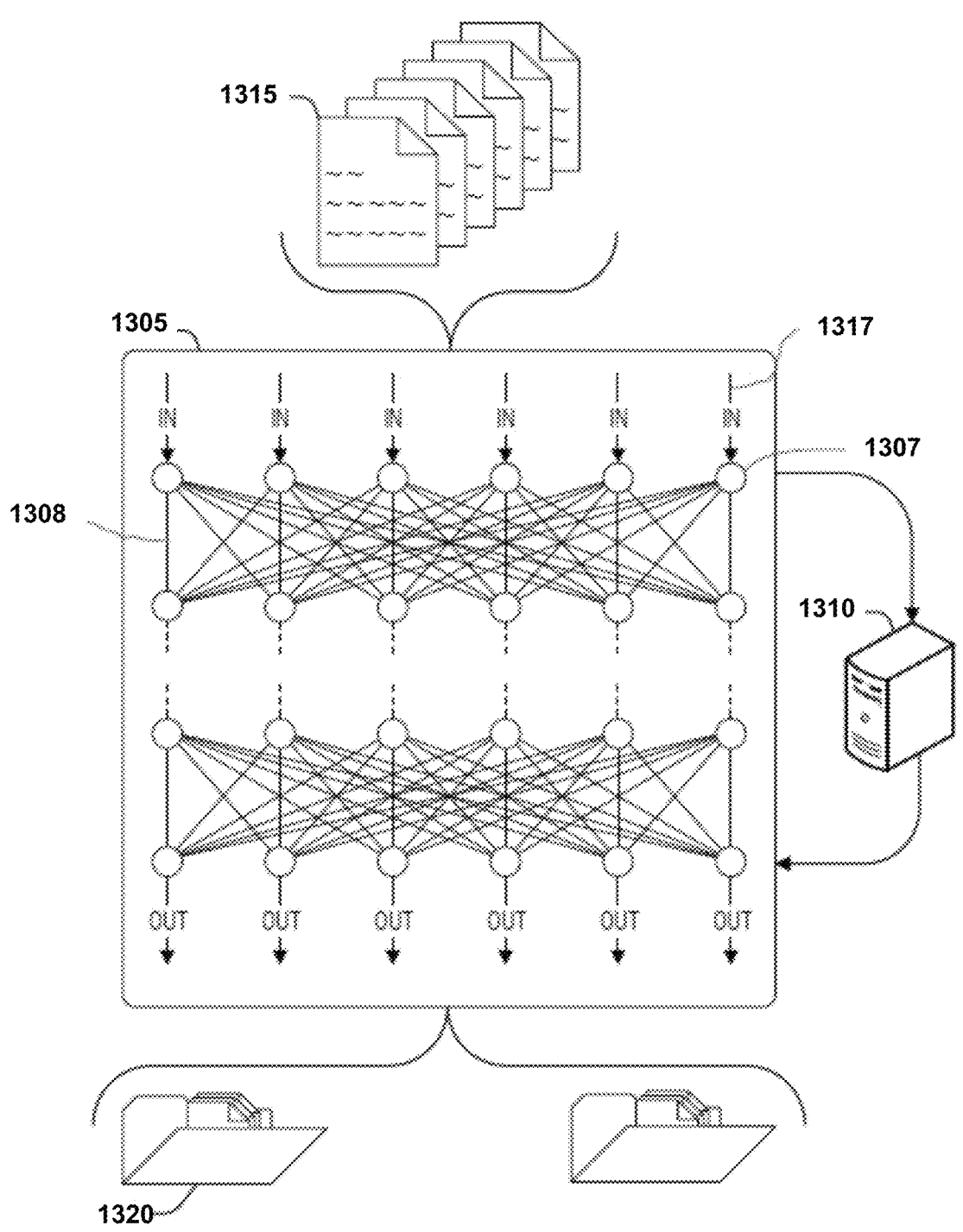
FIG. 13 is a block diagram of an example of an environment including a system for neural network training.

FIG. 13 is a block diagram of an example of an environment including a system for neural network training. One or more Clifford neural layers and other parts of an ML model discussed herein can be at least partially implemented using the system of FIG. 13. The system includes an artificial NN (ANN) 1305 that is trained using a processing node 1310. The processing node 1310 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 1305, or even different nodes 1307 within layers. Thus, a set of processing nodes 1310 is arranged to perform the training of the ANN 1305.

The set of processing nodes 1310 is arranged to receive a training set 1315 for the ANN 1305. The ANN 1305 comprises a set of nodes 1307 arranged in layers (illustrated as rows of nodes 1307) and a set of inter-node weights 1308 (e.g., parameters) between nodes in the set of nodes. In an example, the training set 1315 is a subset of a complete training set. Here, the subset may enable processing nodes with limited storage resources to participate in training the ANN 1305.

The training data may include multiple numerical values representative of a domain, such as an image feature, or the like. Each value of the training or input 1317 to be classified after ANN 1305 is trained, is provided to a corresponding node 1307 in the first layer or input layer of ANN 1305. The values propagate through the layers and are changed by the objective function.

As noted, the set of processing nodes is arranged to train the neural network to create a trained neural network. After the ANN is trained, data input into the ANN will produce valid classifications 1320 (e.g., the input data 1317 will be assigned into categories), for example. The training performed by the set of processing nodes 1307 is iterative. In an example, each iteration of the training the ANN 1305 is performed independently between layers of the ANN 1305. Thus, two distinct layers may be processed in parallel by different members of the set of processing nodes. In an example, different layers of the ANN 1305 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 1307 (e.g., neurons) are trained independently. In an example, the nodes are trained on different hardware.

Figure 14:
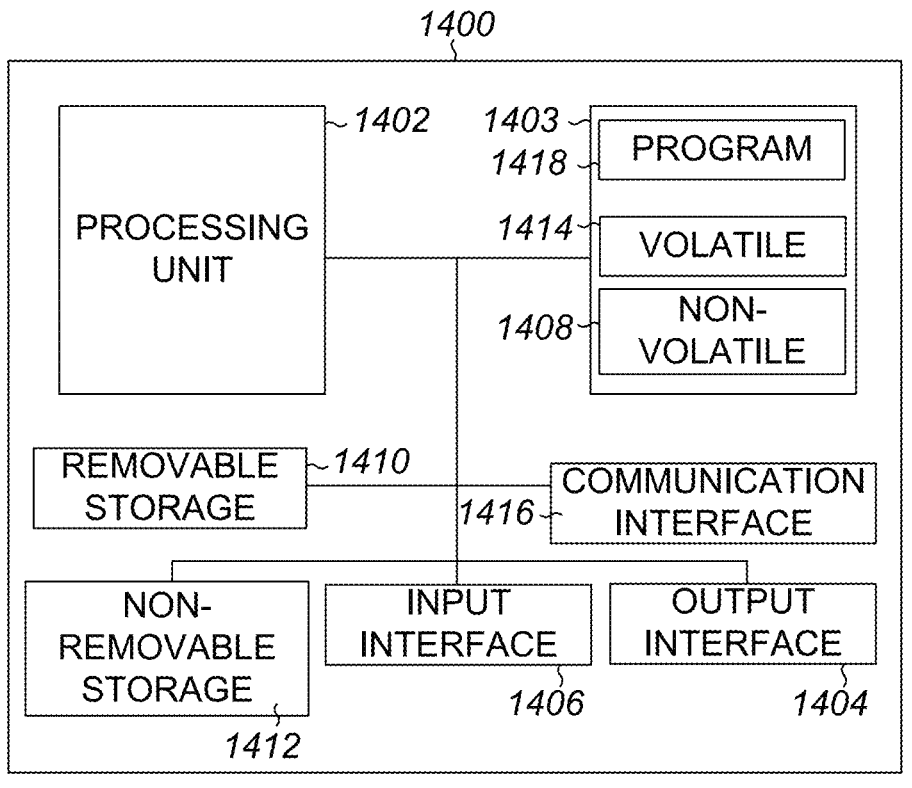
FIG. 14 illustrates, by way of example, a block diagram of an embodiment of a machine (e.g., a computer system) to implement one or more embodiments.

FIG. 14 illustrates, by way of example, a block diagram of an embodiment of a machine 1400 (e.g., a computer system) to implement one or more embodiments. One or more of the ML model 102, Clifford neural layer 108, Clifford convolution layer 600, Clifford FNO layer 700, the method 1200, the training system of FIG. 13, or a component or operations thereof can be implemented, at least in part, using a component of the machine 1400. One example machine 1400 (in the form of a computer), may include a processing unit 1402, memory 1403, removable storage 1410, and non-removable storage 1412. Although the example computing device is illustrated and described as machine 1400, the computing device may be in different forms in different embodiments. For example, the computing device may instead be a smartphone, a tablet, smartwatch, or other computing device including the same or similar elements as illustrated and described regarding FIG. 14. Further, although the various data storage elements are illustrated as part of the machine 1400, the storage may also or alternatively include cloud-based storage accessible via a network, such as the Internet.

Memory 1403 may include volatile memory 1414 and non-volatile memory 1408. The machine 1400 may include—or have access to a computing environment that includes—a variety of computer-readable media, such as volatile memory 1414 and non-volatile memory 1408, removable storage 1410 and non-removable storage 1412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1400 may include or have access to a computing environment that includes input 1406, output 1404, and a communication connection 1416. Output 1404 may include a display device, such as a touchscreen, that also may serve as an input component. The input 1406 may include one or more of a touchscreen, touchpad, mouse, keyboard, camera, one or more device-specific buttons, one or more sensors integrated within or coupled via wired or wireless data connections to the machine 1400, and other input components. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1402 (sometimes called processing circuitry) of the machine 1400. A hard drive, CD-ROM, and RANI are some examples of articles including a non-transitory computer-readable medium such as a storage device. For example, a computer program 1418 may be used to cause processing unit 1402 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

ADDITIONAL NOTES AND EXAMPLES

Example 1 includes a method for machine learning (ML) modeling of a multivector system that operates on a multivector object, the method comprising receiving, by an ML model, the multivector object as an input that represents a state of the multivector system, and operating, by the ML model and using a Clifford layer that includes neurons that implement a multivector kernel, on the multivector input to generate a multivector output that represents the state of the multivector system responsive to the multivector input.

In Example 2, Example 1 further includes, wherein the Clifford layer is a Clifford Fourier layer, a Clifford convolution layer, or an equivariant Clifford convolution layer.

In Example 3, at least one of Examples 1-2 further includes, wherein the Clifford layer is a Clifford Fourier Neural Operator (FNO) that includes a Clifford Fourier layer and a Clifford convolution layer.

In Example 4, at least one of Examples 1-3 further includes, wherein the multivector system is an electromagnetic field or a dynamic fluid.

In Example 5, at least one of Examples 1-4 further includes, wherein the multivector object includes two or more of a scalar, a vector, a bi-vector, or a tri-vector.

In Example 6, Example 5 further includes, wherein the multivector object includes the vector.

In Example 7, at least one of Examples 5-6 further includes, wherein the multivector object includes the bi-vector.

In Example 8, at least one of Examples 5-7 further includes, wherein the multivector object includes the tri-vector.

In Example 9, at least one of Examples 1-8 further includes, wherein the Clifford layer is a Clifford convolution and the method further comprises constraining a kernel for a Clifford convolution layer such that the Clifford convolution layer is equivariant.

Example 10 includes a system comprising processing circuitry and one or more memories including parameters for neurons trained for machine learning (ML) modeling of a multivector system that operates on a multivector object and instructions that, when executed by the processing circuitry, cause the processing circuitry to perform operations for implementing an ML model using the method of one of Examples 1-9.

Example 11 includes a computer-readable medium including instructions that, when executed by a machine, cause the machine to perform the method of one of claims 1-9.

Although a few embodiments have been described in detail above, other modifications are possible. For example, the logic flows depicted in the figures do not require the order shown, or sequential order, to achieve desirable results. The desirable for embodiments can include the user having confidence in the state of their data, settings, controls, and secrets before, during, and after a migration to a new version of an application. Using multiple factors to check data state, integrity, presence, and absence before and after the migration can increase confidence. Other steps may be provided, or steps may be eliminated, from the described flows, and other components may be added to, or removed from, the described systems. Other embodiments may be within the scope of the following claims.

What is claimed is:

1. A method for machine learning (ML) modeling of a multivector system that operates on a multivector object, the method performed by an ML model, the method comprising:

receiving the multivector object that represents a state of the multivector system; and transforming, using a Clifford layer of the ML model that includes neurons that implement a multivector kernel, the multivector object to a multivector output that represents the state of the multivector system responsive to the multivector object, the Clifford layer is:

(i) a Clifford Fourier Neural Operator (FNO) that includes a Clifford Fourier layer and a first Clifford convolution layer; or (ii) a second Clifford convolution layer wherein a kernel for the second Clifford convolution layer is constrained such that the second Clifford convolution layer is equivariant.

2. The method of claim 1, wherein the Clifford layer is the Clifford FNO that includes the Clifford Fourier layer and the first Clifford convolution layer.

3. The method of claim 1, wherein the multivector system is an electromagnetic field or a dynamic fluid.

4. The method of claim 1, wherein the multivector object includes two or more of a scalar, a vector, a bi-vector, or a tri-vector.

5. The method of claim 4, wherein the multivector object includes the vector.

6. The method of claim 4, wherein the multivector object includes the bi-vector.

7. The method of claim 4, wherein the multivector object includes the tri-vector.

8. The method of claim 1, wherein the Clifford layer is the second Clifford convolution layer and the method further comprises constraining the kernel for the second Clifford convolution layer such that the second Clifford convolution layer is equivariant.

9. A system comprising:

processing circuitry; and one or more memories including parameters for neurons trained for machine learning (ML) modeling of a multivector system that operates on a multivector object and instructions that, when executed by the processing circuitry, cause the processing circuitry to perform operations for transforming, by an ML model, a multivector object, the operations comprising:

receiving the multivector object that represents a state of the multivector system; and transforming, by a Clifford layer of the ML model that includes neurons that implement a multivector kernel, the multivector object to a multivector output that represents the state of the multivector system responsive to the multivector object, the Clifford layer is:

(i) a Clifford Fourier Neural Operator (FNO) that includes a Clifford Fourier layer and a first Clifford convolution layer; or (ii) a second Clifford convolution layer wherein a kernel for the second Clifford convolution layer is constrained such that the second Clifford convolution layer is equivariant.

10. The system of claim 9, wherein the Clifford layer is the Clifford FNO that includes the Clifford Fourier layer and the first Clifford convolution layer.

11. The system of claim 9, wherein the multivector system is an electromagnetic field or a dynamic fluid.

12. The system of claim 9, wherein the multivector object includes two or more of a scalar, a vector, a bi-vector, or a tri-vector.

13. The system of claim 9, wherein the Clifford layer is the second Clifford convolution layer and the operations further include constraining the kernel for the second Clifford convolution layer such that the second Clifford convolution layer is equivariant.

14. A computer-readable medium including instructions that, when executed by a machine, cause the machine to perform operations for implementing a machine learning (ML) model that models a multivector system that operates on a multivector object, the operations comprising:

receiving the multivector object that represents a state of the multivector system; and operating, by a Clifford layer of the ML model that includes neurons that implement a multivector kernel, on the multivector object to generate a multivector output that represents the state of the multivector system responsive to the multivector object, the Clifford layer is:

(i) a Clifford Fourier Neural Operator (FNO) that includes a Clifford Fourier layer and a first Clifford convolution layer; or (ii) a second Clifford convolution layer wherein a kernel for the second Clifford convolution layer is constrained such that the second Clifford convolution layer is equivariant.

15. The computer-readable medium of claim 14, wherein the Clifford layer is the Clifford FNO that includes Clifford Fourier layer and the first Clifford convolution layer.

16. The computer-readable medium of claim 14, wherein the multivector system is an electromagnetic field or a dynamic fluid.

17. The computer-readable medium of claim 14, wherein the multivector object includes two or more of a scalar, a vector, a bi-vector, or a tri-vector.

* * * * *